United States Patent
Wang et al.

(10) Patent No.: US 11,862,174 B2
(45) Date of Patent: Jan. 2, 2024

(54) VOICE COMMAND PROCESSING FOR LOCKED DEVICES

(71) Applicant: Amazon Technologies, Inc., Seattle, WA (US)

(72) Inventors: Haitang Wang, Mountain View, CA (US); Ankur Narendra Bhai Vachhani, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 157 days.

(21) Appl. No.: 17/209,596

(22) Filed: Mar. 23, 2021

(65) Prior Publication Data
US 2021/0210100 A1  Jul. 8, 2021

Related U.S. Application Data

(63) Continuation of application No. 15/991,652, filed on May 29, 2018, now Pat. No. 10,991,373.

(51) Int. Cl.
| | |
|---|---|
| *G10L 17/00* | (2013.01) |
| *G10L 17/24* | (2013.01) |
| *G10L 15/22* | (2006.01) |
| *G06F 3/16* | (2006.01) |
| *G06F 21/31* | (2013.01) |
| *H04M 1/724* | (2021.01) |
| *H04M 1/72463* | (2021.01) |
| *G10L 17/22* | (2013.01) |

(52) U.S. Cl.
CPC .............. *G10L 17/00* (2013.01); *G06F 3/167* (2013.01); *G06F 21/31* (2013.01); *G10L 15/22* (2013.01); *G10L 17/22* (2013.01); *G10L 17/24* (2013.01); *H04M 1/724* (2021.01); *H04M 1/724631* (2022.02)

(58) Field of Classification Search
CPC ......... G06F 3/167; G06F 21/31; G10L 15/22; G10L 17/22; G10L 17/24
See application file for complete search history.

(56) References Cited

U.S. PATENT DOCUMENTS

| | | | |
|---|---|---|---|
| 8,543,834 B1 * | 9/2013 | Barra | ...................... G06F 21/32 726/16 |
| 10,991,373 B1 * | 4/2021 | Wang | ...................... G06F 21/52 |

(Continued)

*Primary Examiner* — Samuel G Neway
(74) *Attorney, Agent, or Firm* — Pierce Atwood LLP

(57) ABSTRACT

Techniques for processing voice commands from a locked device are described. A voice command received by a locked device is stored, a prompt requesting that the device be unlocked is generated, and the voice command is processed automatically after the device is unlocked. Thus, the system processes the voice command without the user repeating the voice command. In addition, the system may process certain voice commands even when the device is locked. For example, a whitelist filter compares an intent associated with the voice command to whitelisted intents from a whitelist database before the intent is dispatched to a speechlet, and intents included in the whitelist database are processed normally. Thus, the system performs certain voice commands while the device is locked, while other voice commands may be automatically processed after the device is unlocked without the user repeating the voice command.

14 Claims, 33 Drawing Sheets

(56) References Cited

U.S. PATENT DOCUMENTS

| | | | |
|---|---|---|---|
| 2011/0275348 A1* | 11/2011 | Clark | H04W 12/06 |
| | | | 455/411 |
| 2012/0036556 A1* | 2/2012 | LeBeau | G06F 21/36 |
| | | | 726/19 |
| 2013/0226591 A1* | 8/2013 | Ahn | H04W 52/027 |
| | | | 704/275 |
| 2013/0283199 A1* | 10/2013 | Selig | G06F 3/0482 |
| | | | 715/781 |
| 2015/0205342 A1* | 7/2015 | Ooi | G06F 21/00 |
| | | | 713/323 |
| 2015/0340025 A1* | 11/2015 | Shima | G06F 3/167 |
| | | | 704/246 |
| 2018/0247065 A1* | 8/2018 | Rhee | G06V 40/1365 |
| 2021/0210100 A1* | 7/2021 | Wang | G06F 21/31 |

\* cited by examiner

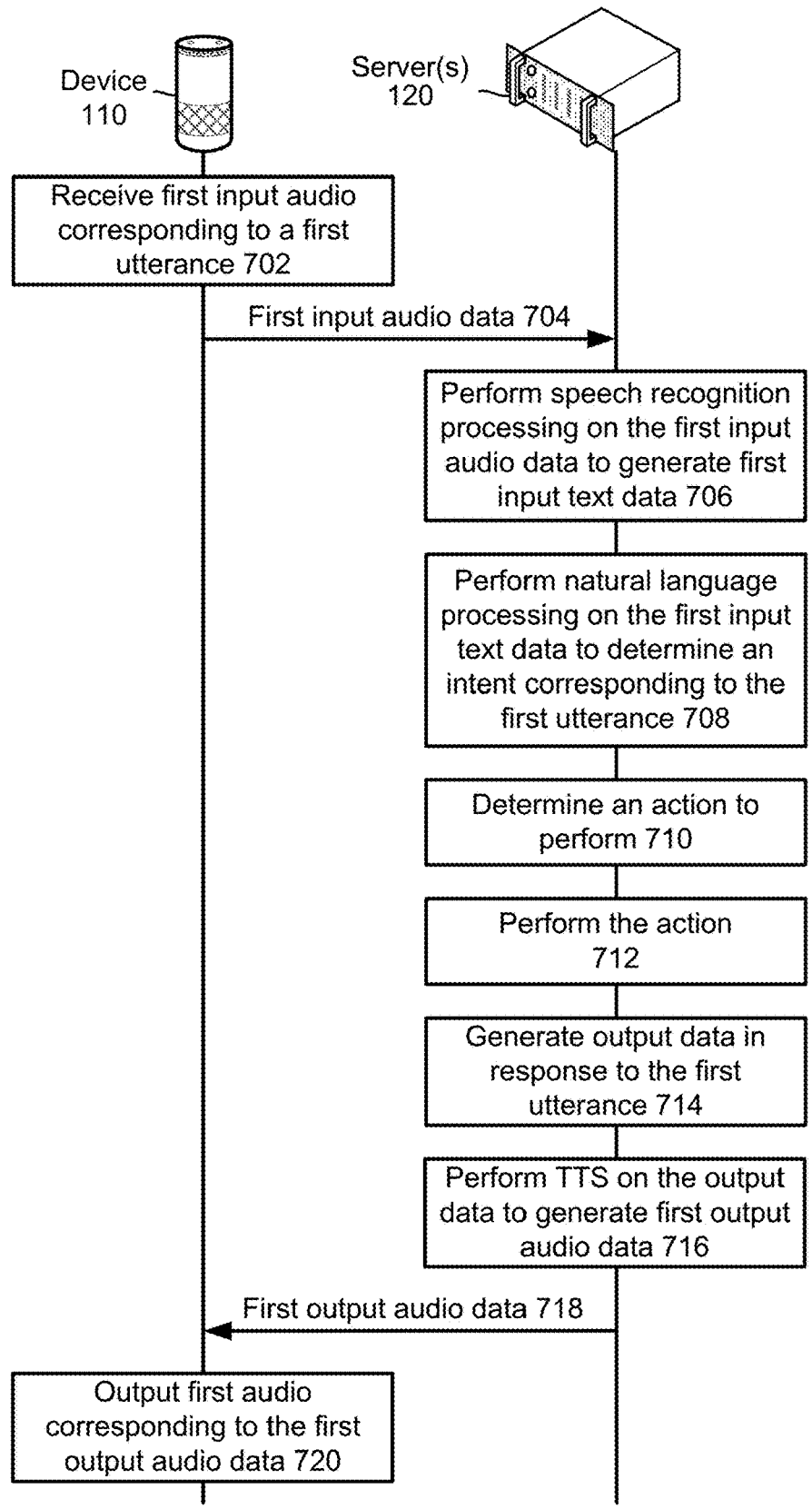

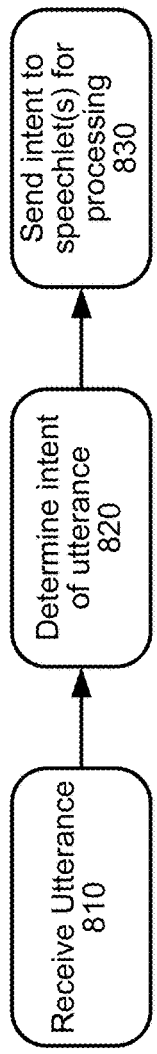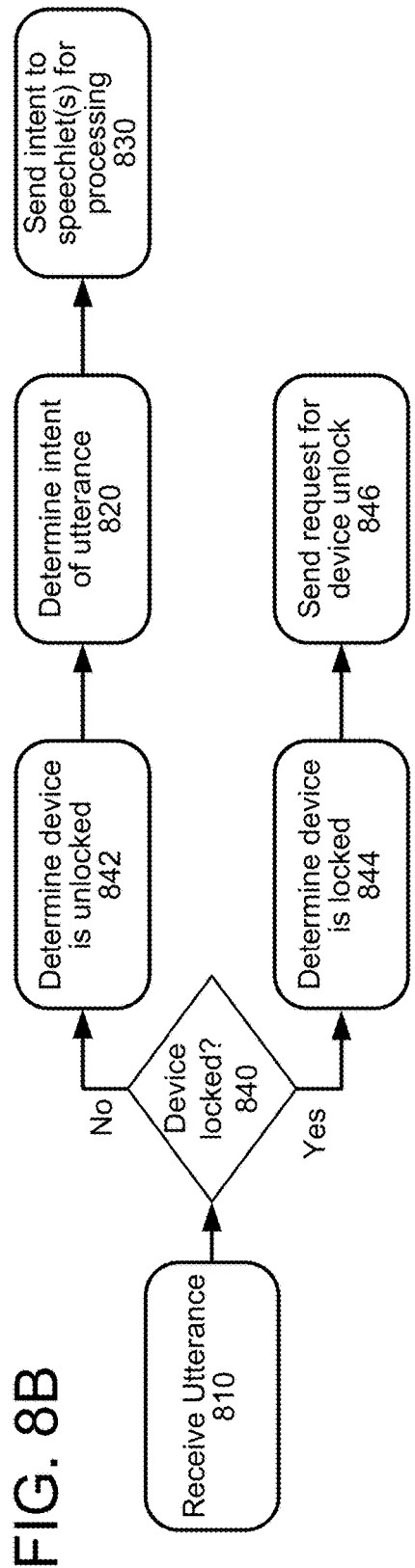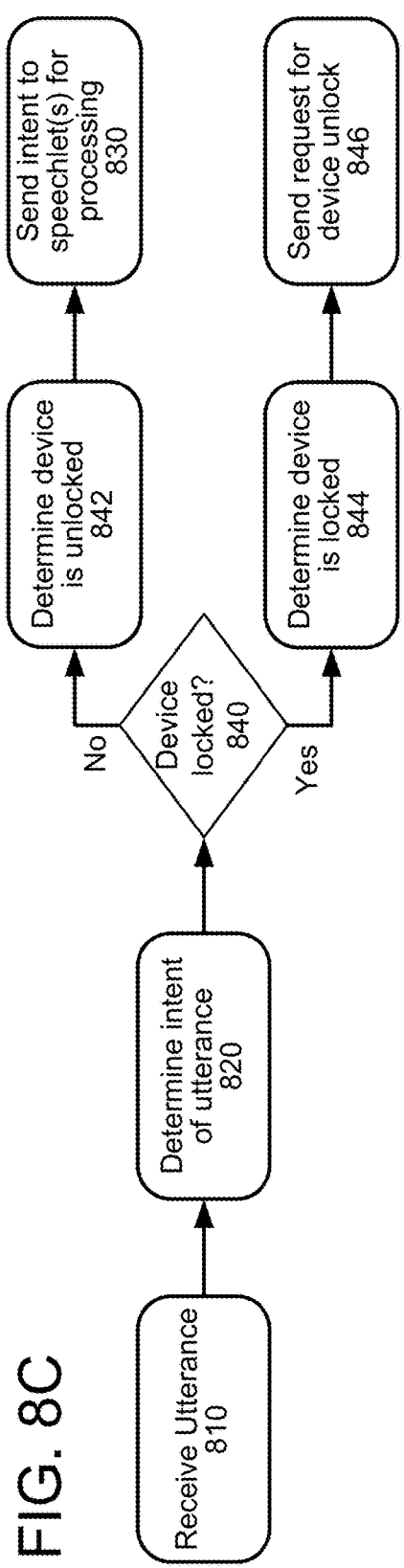

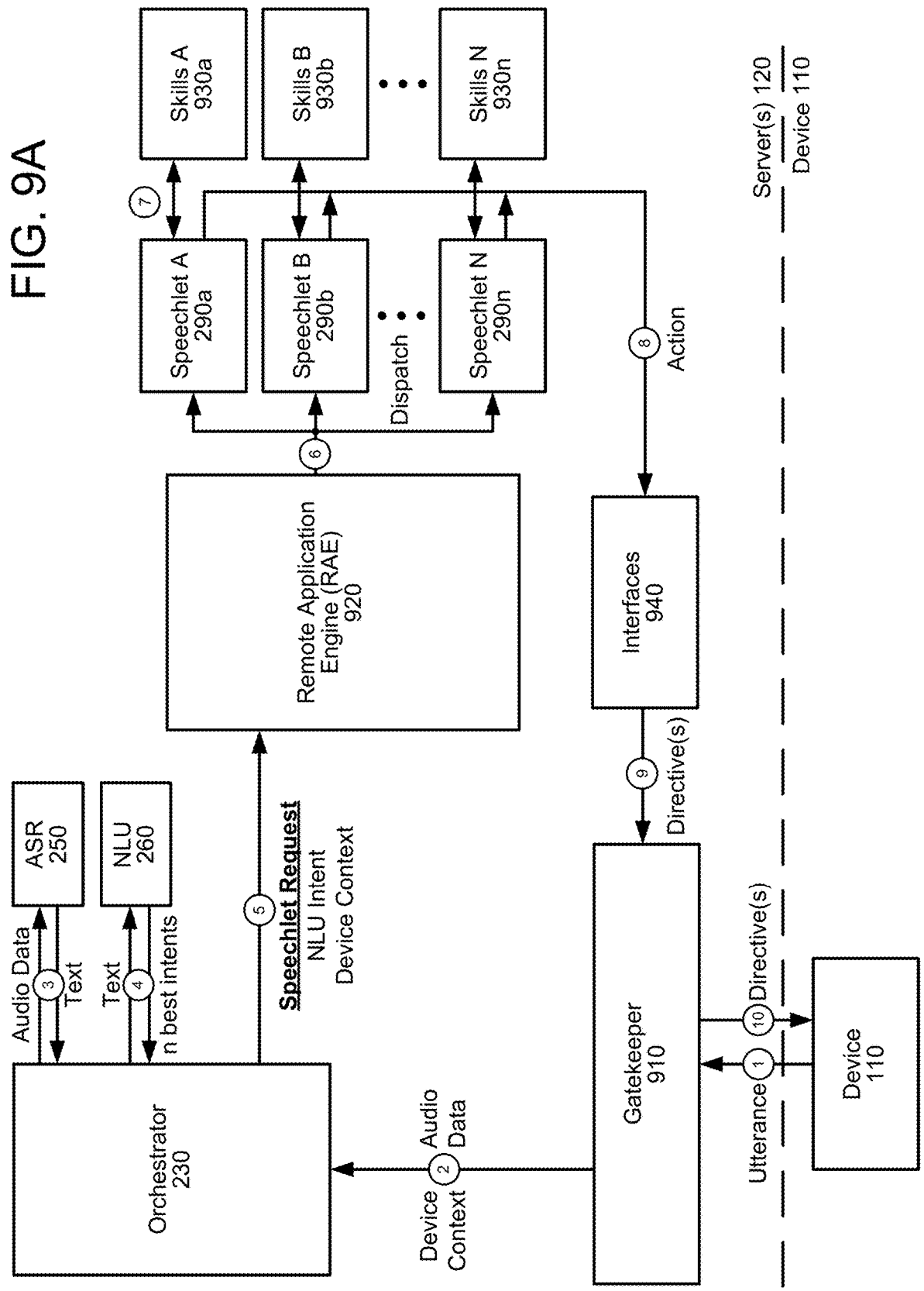

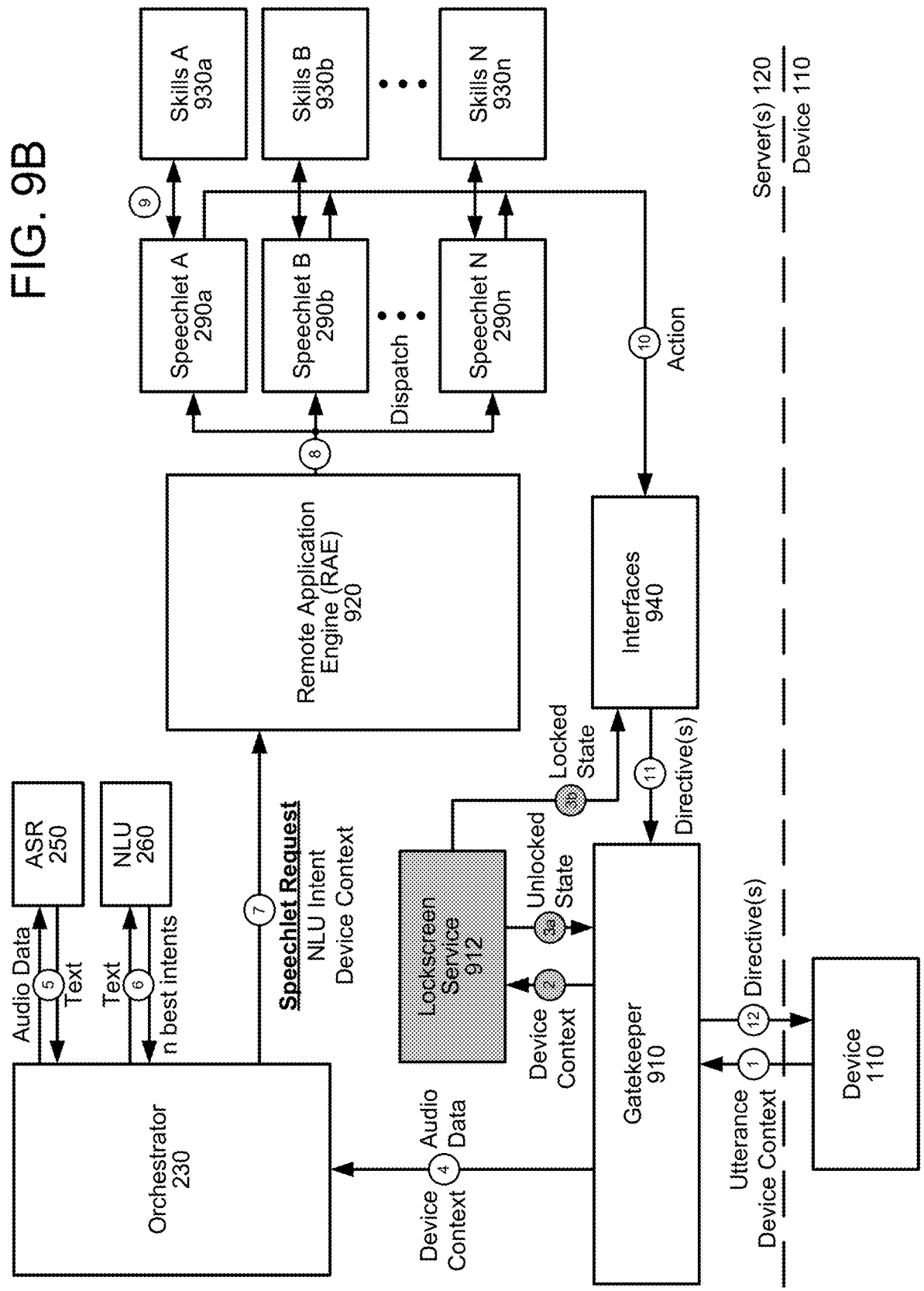

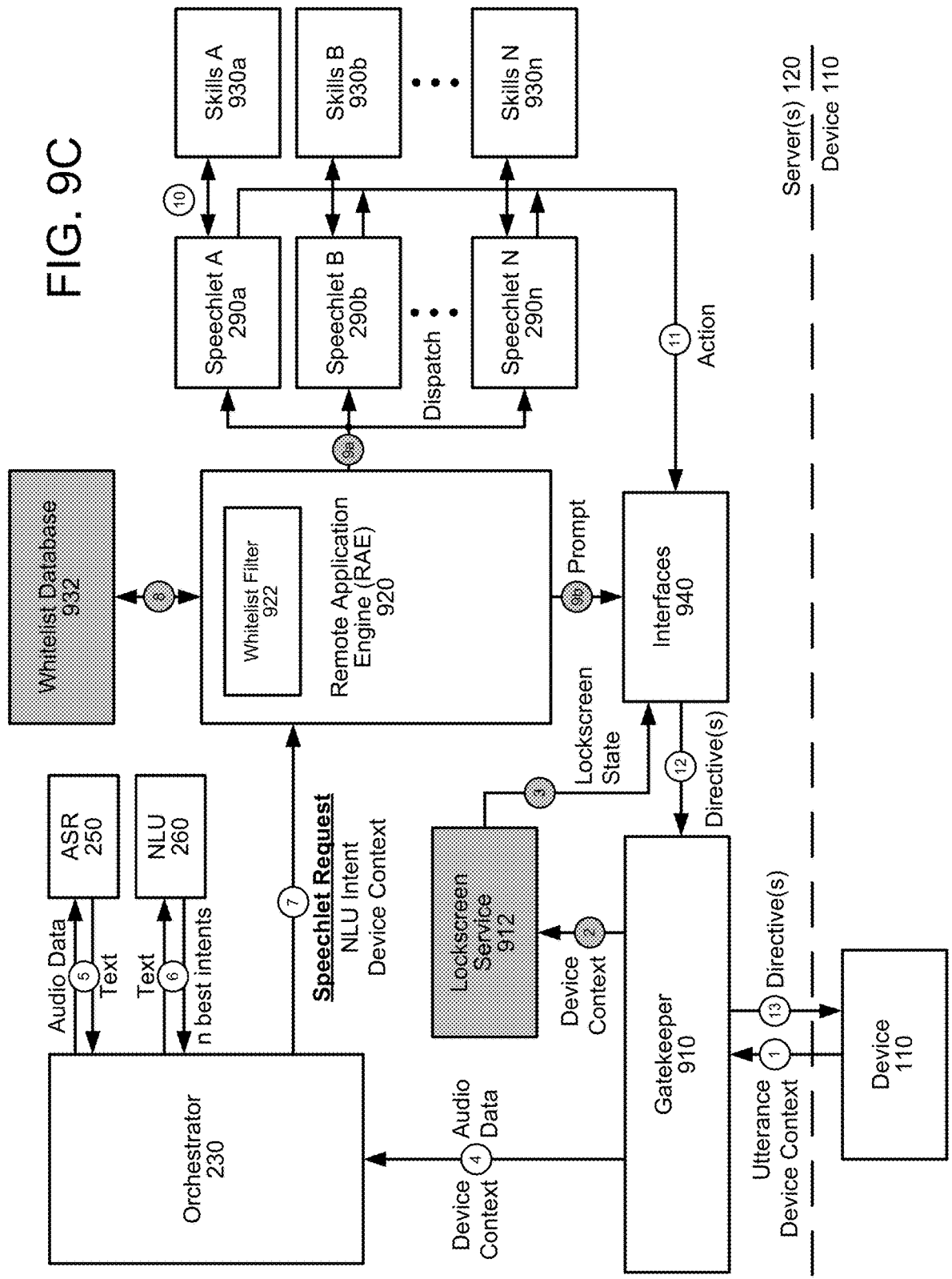

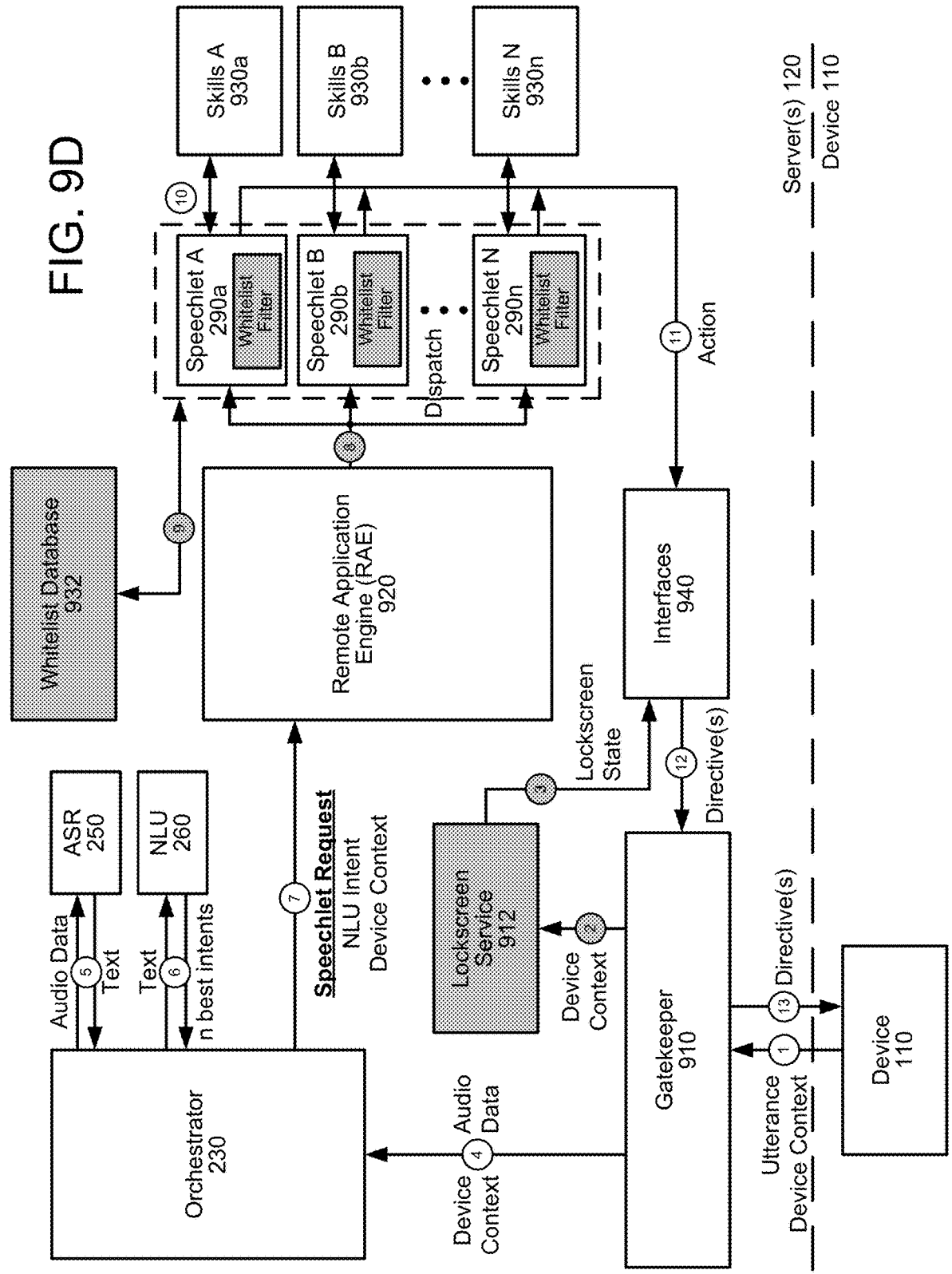

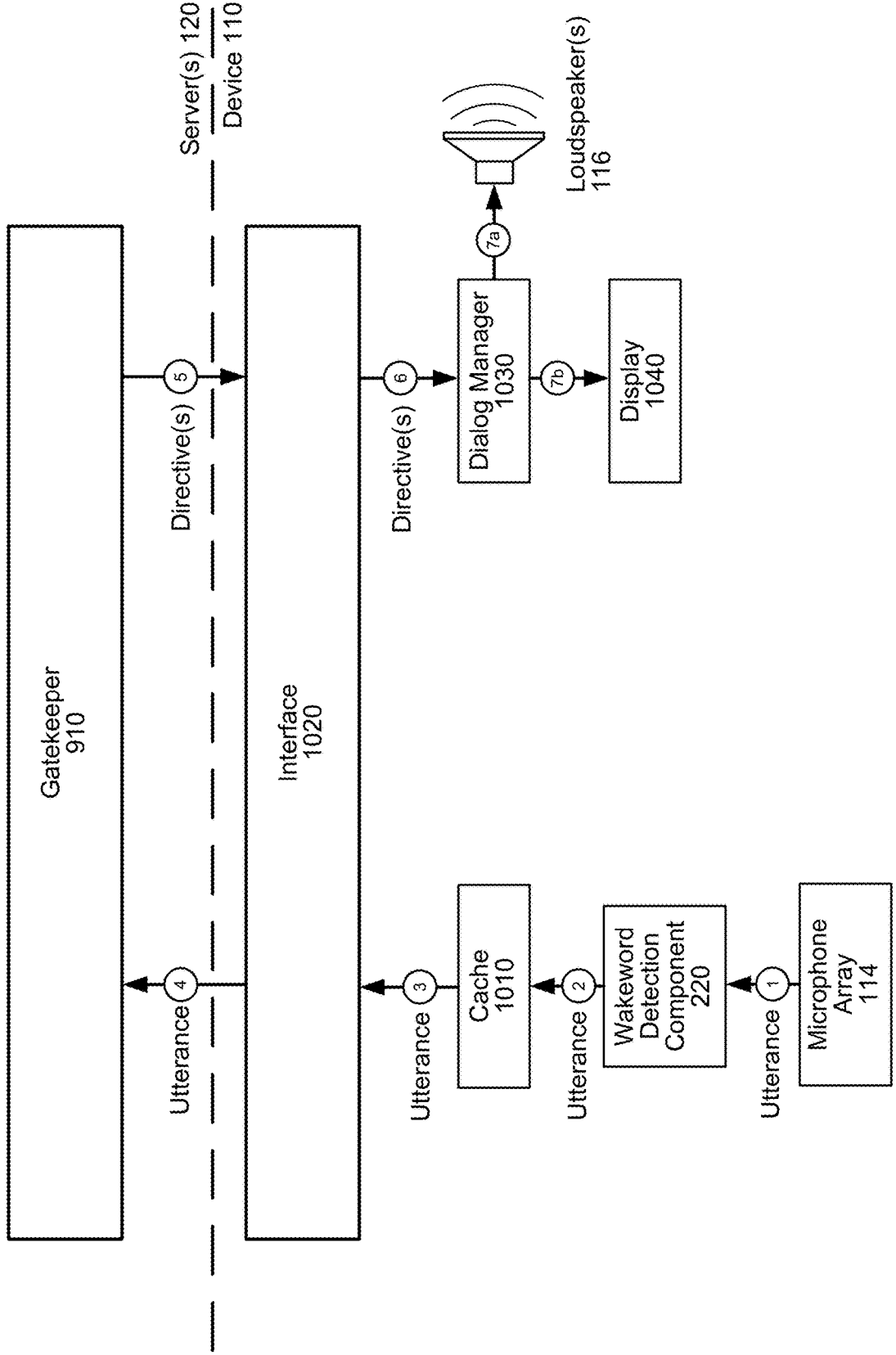

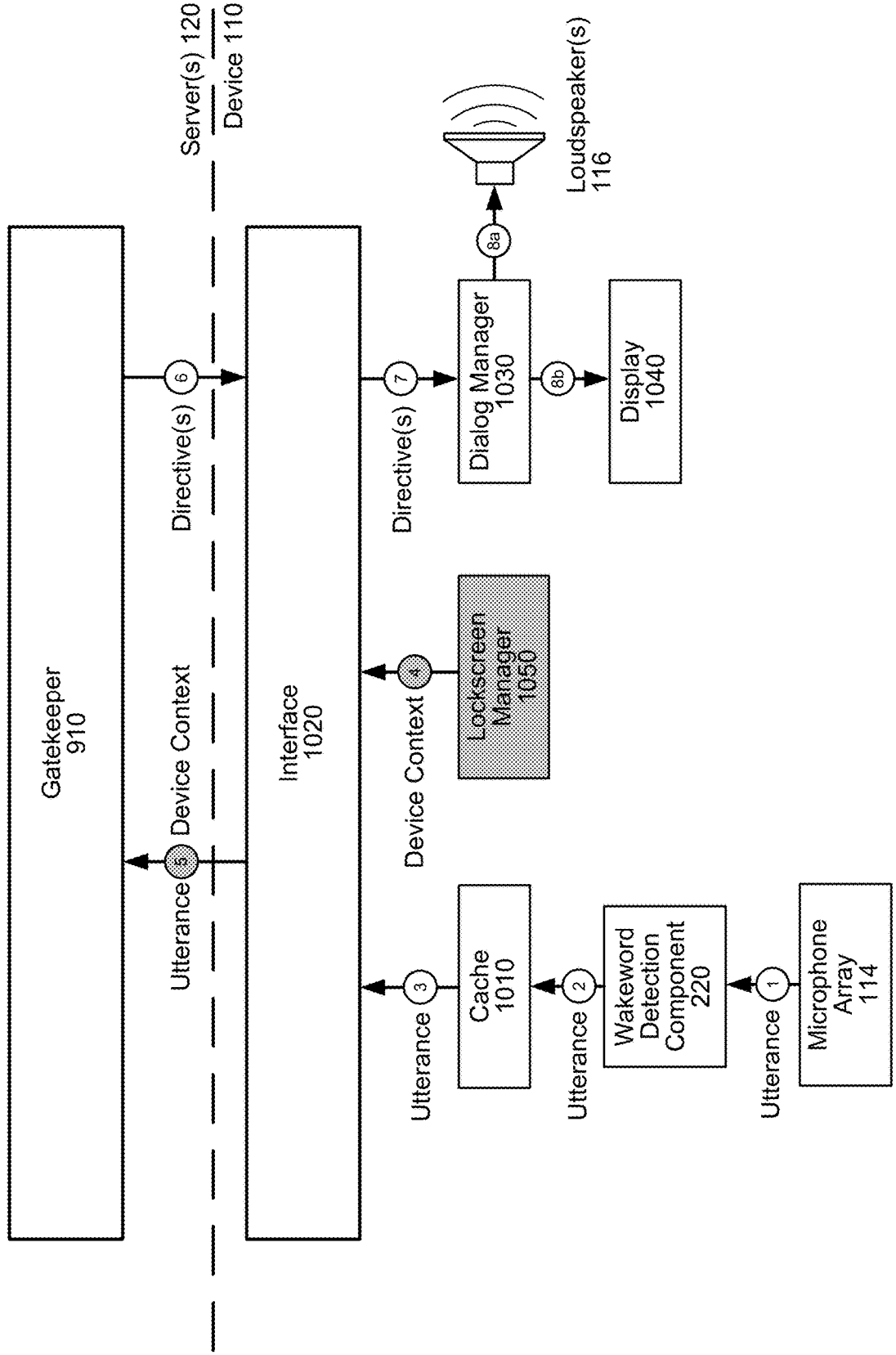

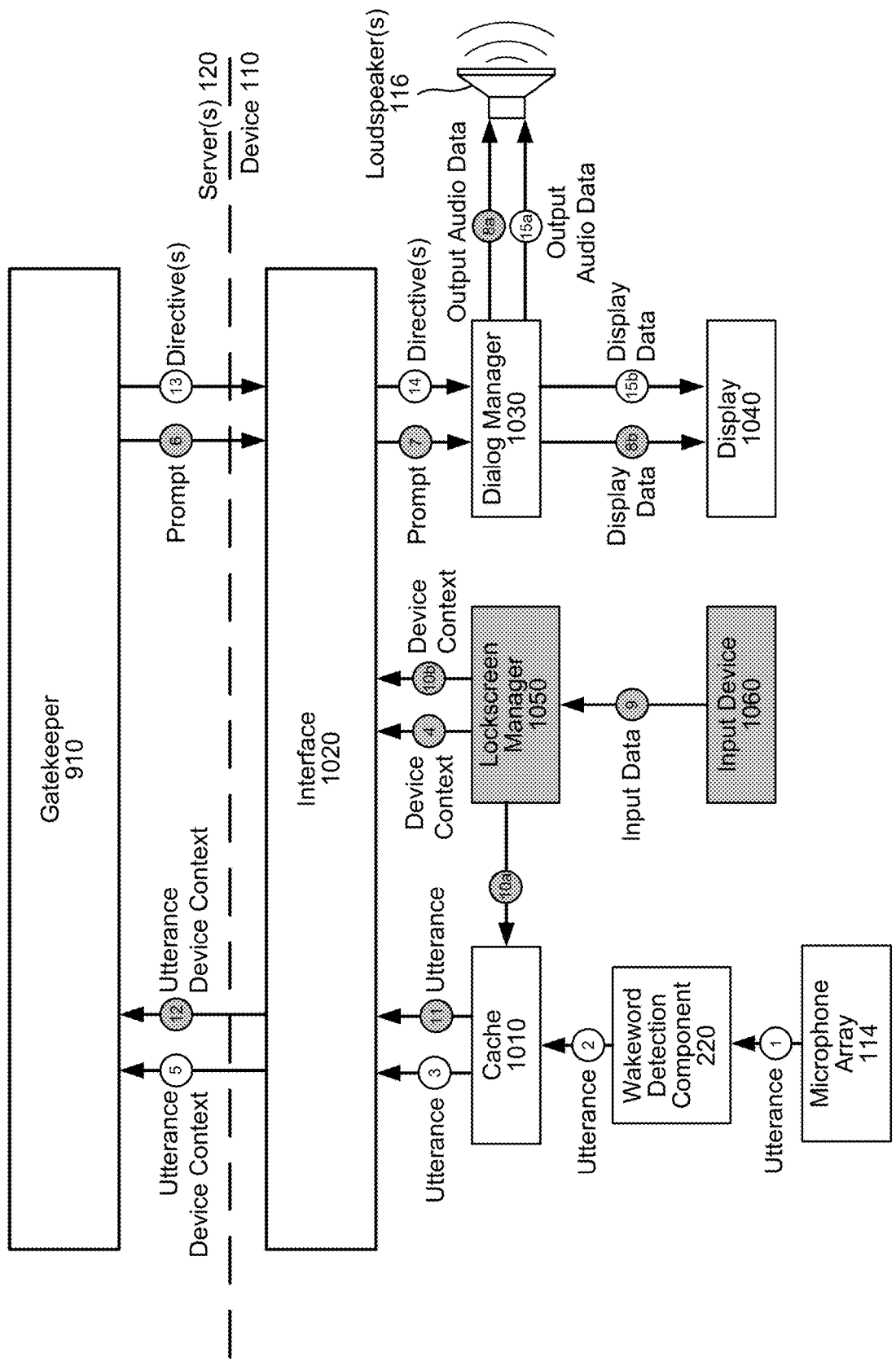

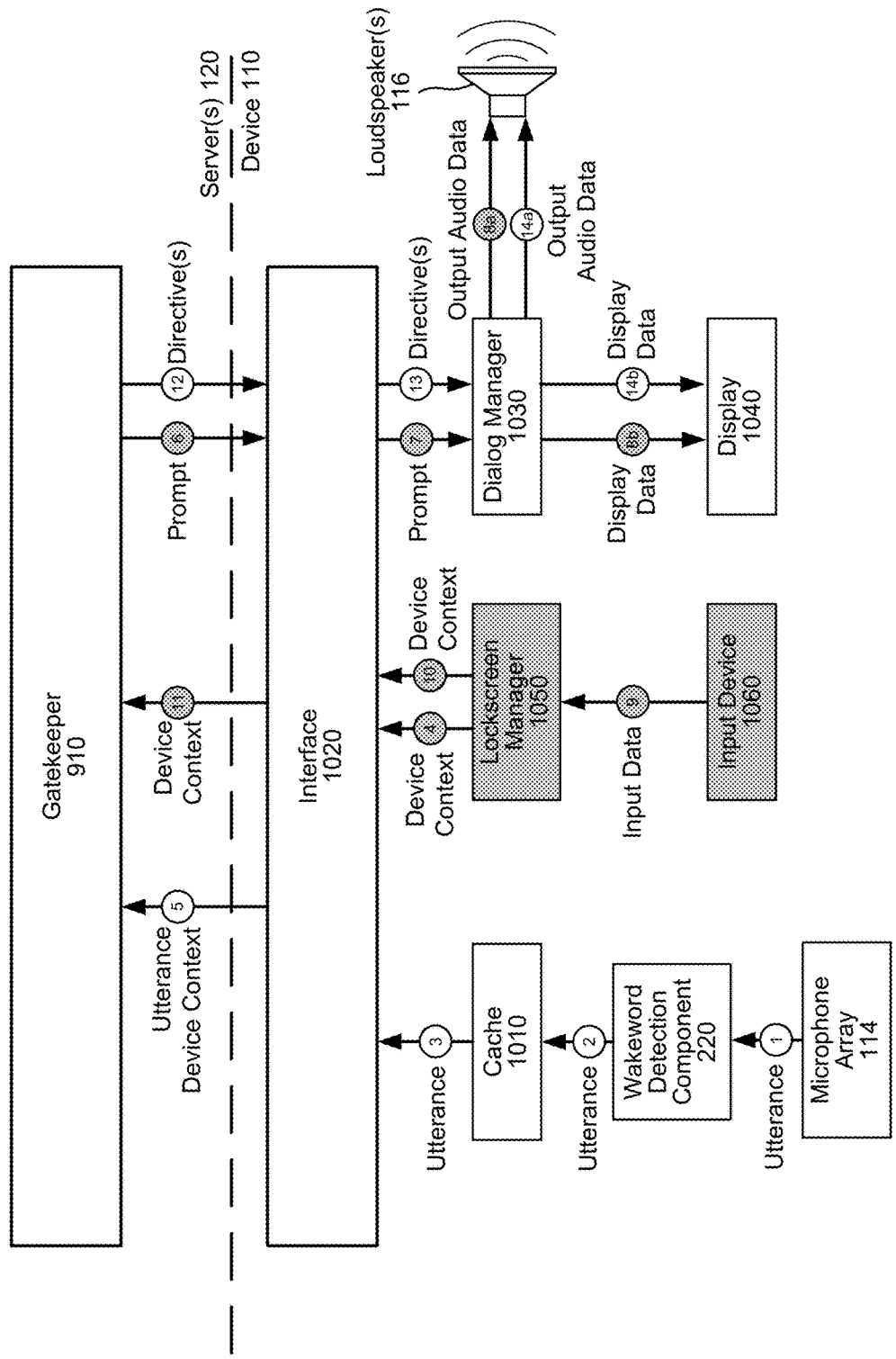

FIG. 15A

Whitelist Database
1510

| Domain | Intent | Action(s) | Example Utterance(s) |
|---|---|---|---|
| Notification | SetNotificationIntent | Set alarm | "Set an alarm for <time>" |
| Notification | SilenceNotificationIntent | Silence notification | "Stop the alarm" |
| Notification | BrowseNotificationIntent | Output timers | "What are current timers?" |
| ToDos | CreateListIntent | Create list | "Create a <to do list> for <date>" |
| ToDos | AddToListIntent | Add item to list | "Add eggs to my shopping list" |
| ToDos | GetListsIntent | Output lists | "What lists do I have?" |
| Music | PlayMusicIntent | Play Music | "Play <song> by <artist>" |
| Music | PlayStationIntent | Play Station | "Play Channel <##> on <Service>" |
| Music | GetMusicDetailsIntent | Output Details | "What is this song?" |
| Music | NextIntent | Skip song | "Next" |
| LocalSearch | GetClosingTimeIntent | Output closing time | "When does <business> close?" |
| LocalSearch | GetHoursIntent | Output hours | "What are the hours for <>?" |
| LocalSearch | GetPhoneNumberIntent | Output number | "What's the phone number for...?" |
| LocalSearch | SearchPlaceIntent | Output results | "What's the top rated <> nearby?" |
| Global | WhatTimeIntent | Output current time | "What time is it now?" |
| ... | ... | ... | ... |
| <Domain> | <Intent> | <Action> | <Example Utterance> |

FIG. 15B

Whitelist Database 1520

| Intent |
| --- |
| SetNotificationIntent |
| SilenceNotificationIntent |
| BrowseNotificationIntent |
| CreateListIntent |
| AddToListIntent |
| GetListsIntent |
| PlayMusicIntent |
| PlayStationIntent |
| GetMusicDetailsIntent |
| NextIntent |
| GetClosingTimeIntent |
| GetHoursIntent |
| GetPhoneNumberIntent |
| SearchPlaceIntent |
| WhatTimeIntent |
| ... |
| <Intent> |

FIG. 15C

Whitelist Database 1530

| Domain | Intent |
|---|---|
| Notification | SetNotificationIntent |
| Notification | SilenceNotificationIntent |
| Notification | BrowseNotificationIntent |
| ToDos | CreateListIntent |
| ToDos | AddToListIntent |
| ToDos | GetListsIntent |
| Music | PlayMusicIntent |
| Music | PlayStationIntent |
| Music | GetMusicDetailsIntent |
| Music | NextIntent |
| LocalSearch | GetClosingTimeIntent |
| LocalSearch | GetHoursIntent |
| LocalSearch | GetPhoneNumberIntent |
| LocalSearch | SearchPlaceIntent |
| Global | WhatTimeIntent |
| ... | ... |
| <Domain> | <Intent> |

FIG. 15D

Whitelist Database 1540

| Domain | Intent | Action(s) |
|---|---|---|
| Notification | SetNotificationIntent | Set alarm |
| Notification | SilenceNotificationIntent | Silence notification |
| Notification | BrowseNotificationIntent | Output timers |
| ToDos | CreateListIntent | Create list |
| ToDos | AddToListIntent | Add item to list |
| ToDos | GetListsIntent | Output lists |
| Music | PlayMusicIntent | Play Music |
| Music | PlayStationIntent | Play Station |
| Music | GetMusicDetailsIntent | Output Details |
| Music | NextIntent | Skip song |
| LocalSearch | GetClosingTimeIntent | Output closing time |
| LocalSearch | GetHoursIntent | Output hours |
| LocalSearch | GetPhoneNumberIntent | Output number |
| LocalSearch | SearchPlaceIntent | Output results |
| Global | WhatTimeIntent | Output current time |
| ... | ... | ... |
| <Domain> | <Intent> | <Action> |

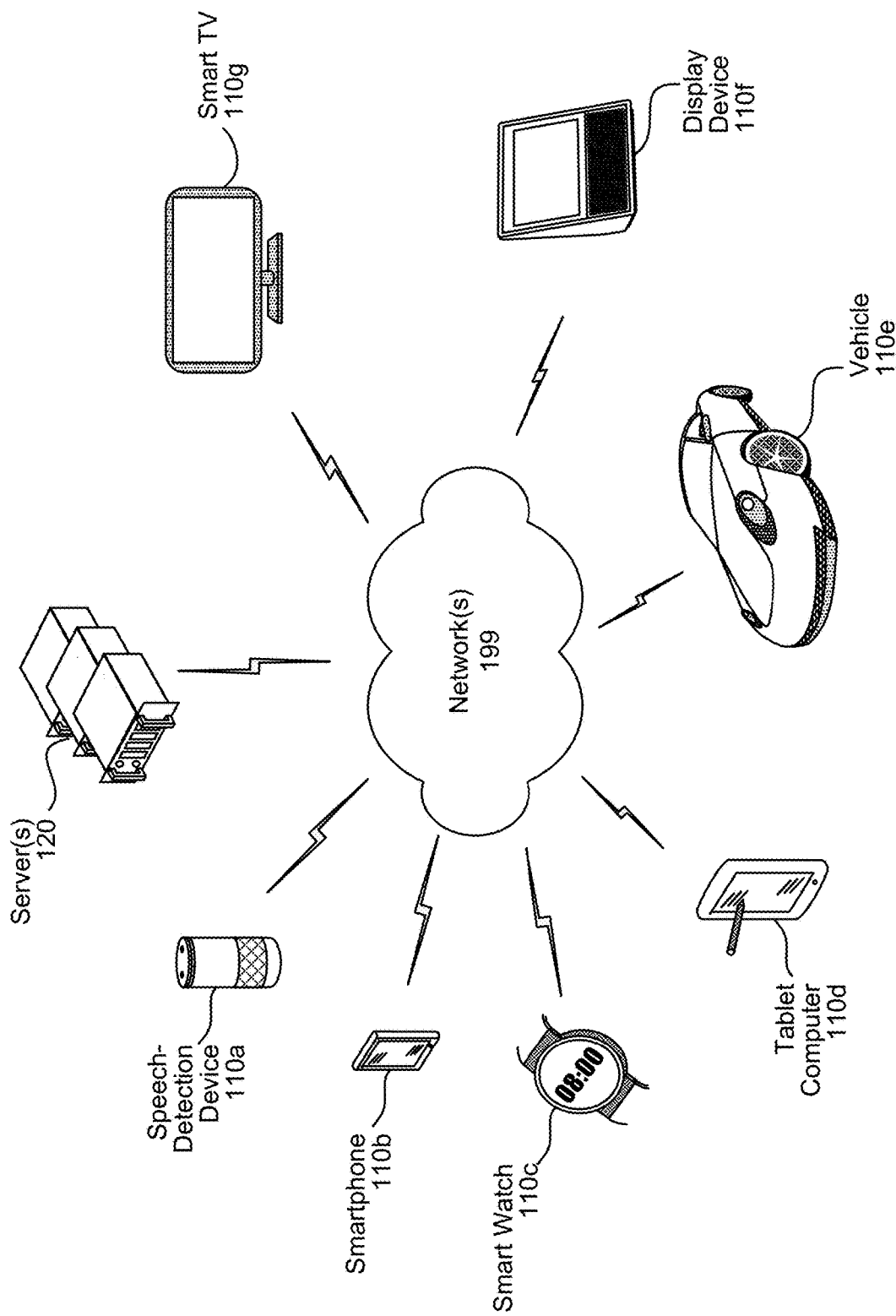

VOICE COMMAND PROCESSING FOR LOCKED DEVICES

CROSS-REFERENCE TO RELATED APPLICATION

This application is a continuation of, and claims the benefit of priority of, U.S. Non-Provisional patent application Ser. No. 15/991,652, filed on May 29, 2018, and entitled "VOICE COMMAND PROCESSING FOR LOCKED DEVICES," in the names of Haitang Wang, et al., the contents of which is expressly incorporated herein by reference in its entirety.

BACKGROUND

Speech recognition systems have progressed to the point where humans can interact with computing devices using their voices. Such systems employ techniques to identify the words spoken by a human user based on the various qualities of a received audio input. Speech recognition processing combined with natural language understanding processing enable speech-based user control of computing devices to perform tasks based on the user's spoken commands. The combination of speech recognition processing and natural language understanding processing techniques is referred to herein as speech processing. Speech processing may also involve converting a user's speech into text data which may then be provided to speechlets.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 7 is a signal flow diagram illustrating an example of processing speech and generating output audio according to embodiments of the present disclosure.

FIGS. 8A-8E illustrate examples of processing an utterance received from a locked device according to embodiments of the present disclosure.

FIGS. 9A-9D illustrate example component diagrams for a server processing an utterance received from a locked device according to embodiments of the present disclosure.

FIGS. 10A-10D illustrate example component diagrams for a device processing a voice command while locked according to embodiments of the present disclosure.

FIGS. 15A-15D illustrate examples of whitelist databases according to embodiments of the present disclosure.

FIG. 18 illustrates an example of a computer network for use with the speech processing system.

DETAILED DESCRIPTION

Figure 1:
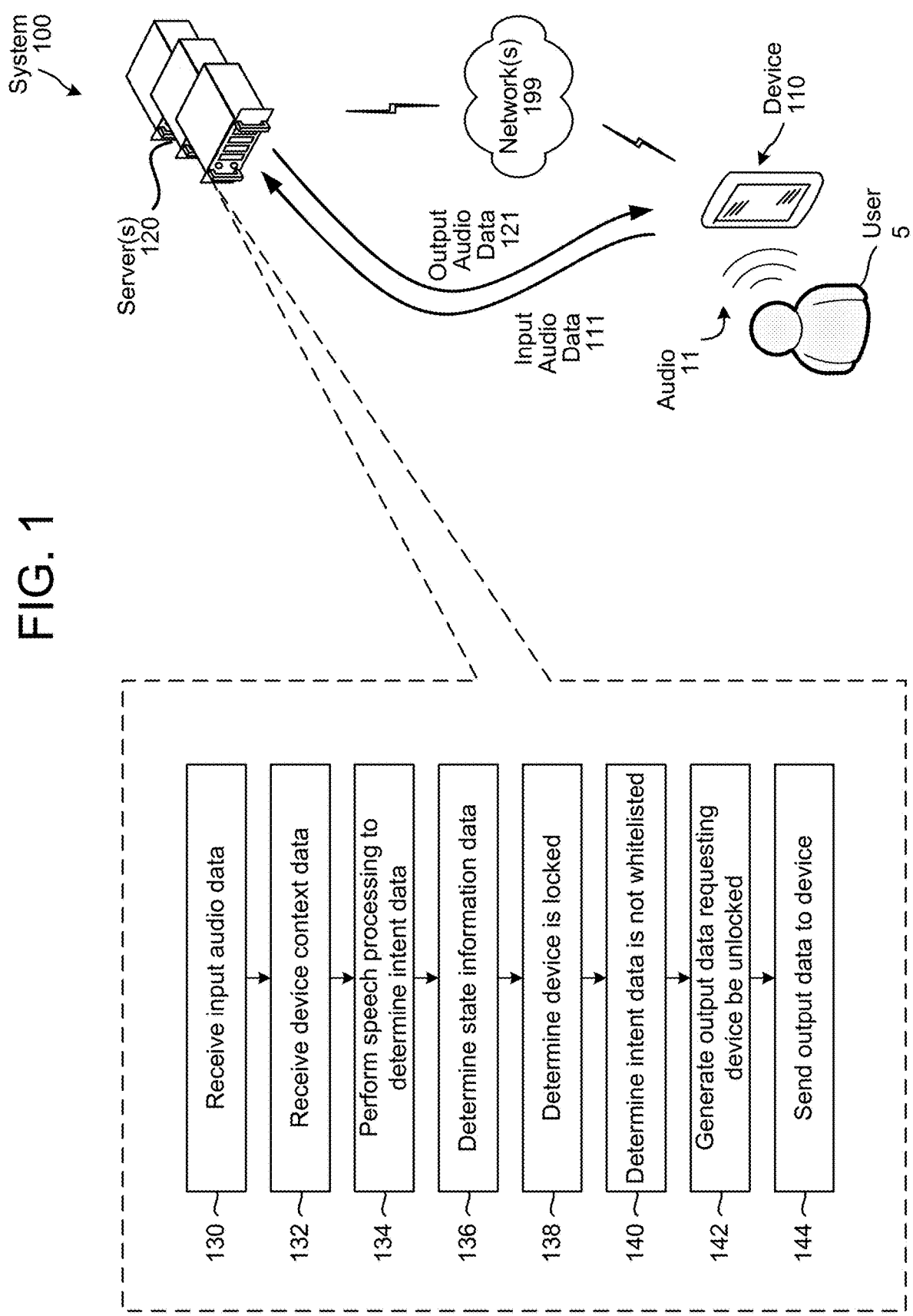
FIG. 1 illustrates a system configured to process voice commands according to embodiments of the present disclosure.

Automatic speech recognition (ASR) is a field of computer science, artificial intelligence, and linguistics concerned with transforming audio data representing speech into text data representative of that speech. Natural language understanding (NLU) is a field of computer science, artificial intelligence, and linguistics concerned with enabling computers to derive meaning from text data containing natural language. Text-to-speech (TTS) is a field of computer science, artificial intelligence, and linguistics concerned with enabling computers to output synthesized speech. ASR, NLU, and TTS may be used together as part of a speech processing system.

Certain systems implement virtual assistants. A user may speak an input to a system and the system may perform an action. For example, the system may output music, images, video, or other content responsive to the user input; may provide an answer to a question asked by the user; may interact with third party systems to cause ride sharing trips to be booked; etc.

Such systems may implement one or more speechlets (e.g., skills). Each speechlet may enable the system to perform certain functionality. For example, a weather speechlet may enable a system to provide users with weather information, a music speechlet may enable a system to output music to users, a video speechlet may enable a system to display videos to users, etc.

However, conventional systems only process voice commands received by an unlocked device. For example, the device must be unlocked in order for the conventional system to process the voice command. If the device is locked, a user must unlock the device and then repeat the voice command for the conventional system to process the voice command.

To improve a user experience and provide additional functionality, systems and methods are disclosed that process voice commands from a locked device. For example, a locked device may store a voice command and automatically send the voice command after the device is unlocked. When the device is locked, the system may generate a prompt requesting that the user unlock the device before the voice command will be processed. For example, the system may generate audio data requesting that the device be unlocked and may generate display data that displays a number keypad or other user interface with which the user may input login information to unlock the device. Once the device is unlocked, the device may automatically send the voice command and the system may process the voice command without the user repeating the voice command.

In some examples, the system may process certain voice commands even when the device is locked. In order to identify intents that may be processed even when the device is in the locked state, the system may include a whitelist filter that compares an intent associated with the voice command to whitelisted intents from a whitelist database. For example, an intent may be compared to the whitelist database before being dispatched to (e.g., processed by) a speechlet. If the intent is included in the whitelist database, the system may process the intent as it would normally be processed if the device was unlocked. However, if the intent is not included in the whitelist database, the system may generate the prompt requesting that the user unlock the device before the voice command can be processed. Once the device is unlocked, the device may automatically send the voice command and the system may process the voice command without the user repeating the voice command. Thus, the system may perform certain voice commands even while the device is in the locked state, while other voice commands may be automatically processed after the device is unlocked without the user repeating the voice command.

FIG. 1 illustrates a system configured to process voice commands (e.g., voice inputs) using natural language understanding (NLU) processing. Although the figures and discussion of the present disclosure illustrate certain operational steps of the system in a particular order, the steps described may be performed in a different order (as well as certain steps removed or added) without departing from the intent of the disclosure. A plurality of devices may communicate across one or more networks 199. For example, FIG. 1 illustrates an example of a device 110 (e.g., a tablet) local to a user 5 communicating with the server(s) 120.

The server(s) 120 may be configured to process voice commands (e.g., voice inputs) received from the device 110. For example, the device 110 may capture input audio data 111 corresponding to a voice command from the user 5 (e.g., an utterance) and may send the input audio data 111 to the server(s) 120 for processing. The server(s) 120 may receive the input audio data 111, may identify the voice command represented in the input audio data 111, may determine one or more action(s) to perform, may perform at least some of the one or more action(s), and/or may send a command to the device 110 to perform at least some of the one or more action(s). Thus, the server(s) 120 may identify the voice command and may perform action(s) and/or send a command to the device 110 to perform action(s) corresponding to the voice command.

FIG. 1 illustrates the server(s) 120 processing a voice command when an utterance is received from a device 110. For example, the server(s) 120 may generate NLU intent data based on the input audio data 111 and may perform one or more action(s) based on the NLU intent data. The server(s) 120 may process the input audio data 111 and generate output audio data 121 as a response to the user 5. For example, the input audio data 111 may correspond to a voice command to stream music (e.g., "Alexa, please play electronic dance music") and the output audio data 121 may correspond to confirmation that the voice command was received (e.g., "Here is a playlist of electronic dance music.").

In some examples, the server(s) 120 may only process the NLU intent data from an unlocked device (e.g., the device 110 is in an unlocked state). However, the system 100 enables the device 110 to process voice commands even when the device 110 is locked (e.g., the device 110 is in a locked state). To reduce a risk of privacy issues and/or improve a customer experience, the system 100 may process the utterance differently when the device 110 is in a locked state. For example, the server(s) 120 may receive device context data from the device 110 and may generate state information data (e.g., lockscreen state information) from the device context data, indicating whether the device 110 is in the locked state or the unlocked state.

When the server(s) 120 determine that the device 110 is in the unlocked state, the server(s) 120 may process the NLU intent normally and may send directive(s) to the device 110. Thus, the server(s) 120 may process a voice command and determine to perform one or more action(s) and/or send a command to the device 110 to perform one or more actions corresponding to the voice command. When the device 110 is in the locked state, however, the server(s) 120 may generate a prompt requesting that a user unlock the device 110 before the server(s) 120 processes the voice command. For example, the server(s) 120 may generate TTS audio data requesting that the device 110 be unlocked and may generate display data that displays a number keypad or other user interface with which the user may input login information to unlock the device. Thus, the directive(s) sent to the device 110 include output data associated with requesting the login information before the server(s) 120 processes the NLU intent.

In some examples, the server(s) 120 may process certain NLU intents even when the device 110 is in the locked state. For example, the server(s) 120 may process NLU intents associated with playing music (e.g., favorable/unfavorable feedback regarding a song, requesting an individual song be played, requesting information about a currently playing song, and/or commands associated with play, stop, pause, shuffle, mute, unmute, volume up, volume down, next, previous, fast forward, rewind, cancel, add to queue, add to playlist, create playlist, etc.), reading a book (e.g., start book, show next chapter, show next page, add bookmark, remove bookmark, rate book, remaining time in audiobook, navigate within book, change speed of audiobook, etc.), with news updates (e.g., sports updates, sports briefing, sports summary, daily briefing, read daily brief, etc.), weather updates (e.g., get weather forecast), cinema showtimes (e.g., what movies are in theaters, requesting movie times for a particular movie, requesting movie times for a particular theater, etc.), general questions (e.g., user asks a question and the server(s) 120 generate a response, such as "What time is it," "What day is it," "Did the Patriots win today," etc.), local searches (e.g., address/phone number associated with a business, hours of the business, what time the business opens or closes, directions to the business, etc.), flight information (e.g., status, arrival time, and/or departure time of a flight), list generating (e.g., creating or browsing to-do lists), notifications (e.g., creating, browsing, modifying, and/or canceling notifications such as alarms, timers, other notifications, and/or the like), suggestions (e.g., "show me things to try," "what can I say," "help me," "what are examples of . . . ," etc.).

In order to identify the certain NLU intents that may be processed even when the device 110 is in the locked state, the server(s) 120 may include a whitelist filter that compares the NLU intent to a list of whitelisted intents from a whitelist database. For example, each of the potential intents listed above may be included in the whitelist database and an incoming NLU intent may be compared to the whitelist database before being sent to one or more speechlet(s). If the NLU intent is included in the whitelist database, the server(s) 120 may send the NLU intent to the one or more speechlet(s) and process the NLU intent as it would normally be processed if the device 110 was unlocked. However, if the NLU intent is not included in the whitelist database, the server(s) 120 may generate the prompt requesting that a user unlock the device 110 before the server(s) 120 processes the voice command. Thus, the server(s) 120 may perform certain voice commands even while the device 110 is in the locked state, while other voice commands result in the server(s) 120 sending a prompt to unlock the device.

As illustrated in FIG. 1, the server(s) 120 may receive (130) input audio data including an utterance and may receive (132) device context data that indicates a state of the device 110. For example, the device context data may indicate that the device 110 is in an unlocked state or a locked state.

The server(s) 120 may perform (134) speech processing on the audio data to determine intent data. For example, the server(s) 120 may perform automatic speech recognition (ASR) processing on the input audio data 111 to generate first text data and may perform natural language understanding (NLU) processing on the first text data to determine an intent of the user 5.

The server(s) 120 may determine (136) state information data based on the device context data, and may determine (138) that the device 110 is locked (e.g., in a locked state) based on the state information data. The server(s) 120 may determine (140) that the intent data is not whitelisted (e.g., included in a whitelist database), may generate (142) output data requesting that the device 110 be unlocked, and may send (144) the output data to the device 110. For example, the output data may include audio data (e.g., synthesized speech) and/or display data indicating that the device 110 must be unlocked to proceed with the voice command.

If the device 110 is in an unlocked state, the server(s) 120 may process the intent data as normal. Additionally or alternatively, if the intent data is included in the whitelist database, the server(s) 120 may process the intent data as normal. However, since the server(s) 120 determined that the device 110 is in the locked state and that the intent data is not included in the whitelist database, the server(s) 120 sends a prompt to the device 110 indicating that the device 110 needs to be unlocked to continue processing.

As used herein, information about the user 5 may be stored as user profile data (e.g., user profile). For example, information such as a name, an address, a phone number, user preferences, and/or other information associated with the user 5 may be stored in the user profile.

As used herein, the device 110 represents any device that is associated with the server(s) 120, such as a device that uses the server(s) 120 to interpret voice commands, perform other functionality, and/or the like. Thus, while FIG. 1 illustrates the device 110 as a tablet, the disclosure is not limited thereto and the device 110 may be a speech enabled device, a computer, a smartphone, a television, and/or any other device that is associated with the server(s) 120 and/or an account that is associated with the server(s) 120.

While not illustrated in FIG. 1, there may be additional dialog between the server(s) 120 and the user 5 to clarify the voice command. For example, the server(s) 120 may receive additional input audio data from the device 110, perform speech processing to understand the query, update information associated with the voice command (e.g., potential intents, entities, etc.), and/or generate additional output audio data to respond. Thus, while FIG. 1 only illustrates a simple interaction between the user 5 and the server(s) 120, the disclosure is not limited thereto. Instead, the server(s) 120 may be configured for extended interactions with the user 5, generating follow up questions and/or explanations in order to acquire and/or convey as much information as needed to process the voice command.

Figure 2:
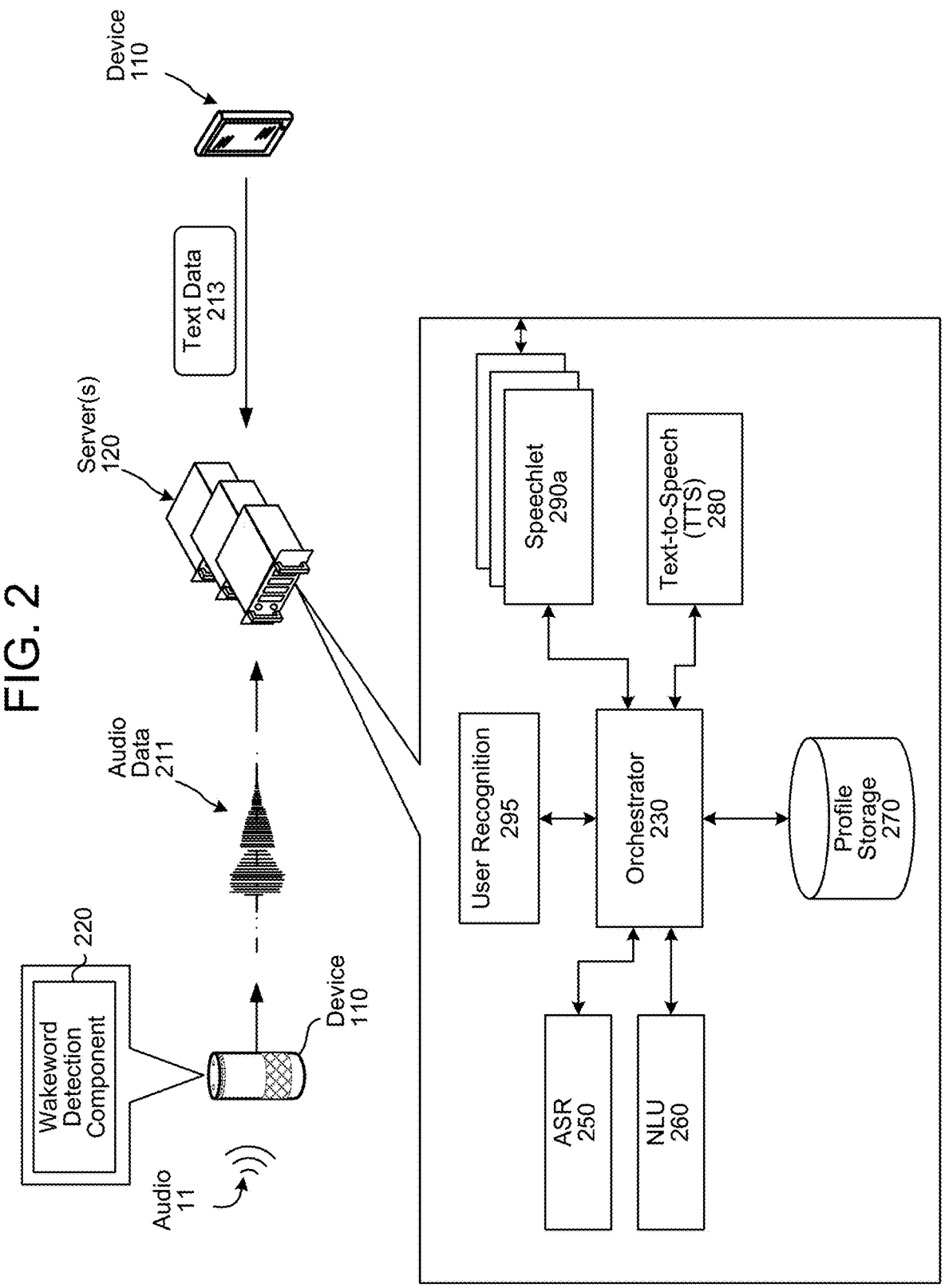
FIG. 2 is a conceptual diagram of components of a system according to embodiments of the present disclosure.

The system may operate using various components as described in FIG. 2. The various components may be located on same or different physical devices. Communication between various components may occur directly or across a network(s) 199.

An audio capture component(s), such as a microphone(s) 114 or an array of microphones of the device 110, captures audio 11. The device 110 processes audio data, representing the audio 11, to determine whether speech is detected. The device 110 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. This process may also be referred to as keyword detection, with a wakeword being a specific example of a keyword. An example wakeword is "Alexa."

Wakeword detection is typically performed without performing linguistic analysis, textual analysis, or semantic analysis. Instead, the audio data representing the audio 11 is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the server(s) 120. The audio data 211 may include data corresponding to the wakeword, or the portion of the audio data 211 corresponding to the wakeword may be removed by the device 110 prior to sending the audio data 211 to the server(s) 120.

Upon receipt by the server(s) 120, the audio data 211 may be sent to an orchestrator component 230. The orchestrator component 230 may include memory and logic that enables the orchestrator component 230 to transmit various pieces and forms of data to various components of the system, as well as perform other operations.

The orchestrator component 230 sends the audio data 211 to an automatic speech recognition (ASR) component 250. The ASR component 250 transcribes the audio data 211 into text data. The text data output by the ASR component 250 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to a natural language understanding (NLU) component 260, either directly or via the orchestrator component 230. The text data sent from the ASR component 250 to the NLU component 260 may include a top scoring hypothesis or may include an N-best list including multiple hypotheses. An N-best list may additionally include a respective score associated with each hypothesis represented therein. Each score may indicate a confidence of ASR processing performed to generate the hypothesis with which the score is associated.

Alternatively, the device 110 may send text data 213 to the server(s) 120. Upon receipt by the server(s) 120, the text data 213 may be sent to the orchestrator component 230. The orchestrator component 230 may send the text data 213 to the NLU component 260.

The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent representing an action that a user desires be performed as well as pieces of the input text data that allow a device (e.g., a device 110, the server(s) 120, etc.) to execute the intent. For example, if the text data corresponds to "call John," the NLU component 260 may determine an intent that the system establish a two-way communication channel between the device 110 originating the call and a device of the recipient "John."

The NLU component 260 outputs NLU results to the orchestrator component 230. The NLU results may include a representation of a single intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value. The orchestrator component 230 may send the NLU results to an associated speechlet component 290. If the NLU results include multiple NLU hypotheses, the orchestrator component 230 may send a portion of the NLU results corresponding to the top scoring NLU hypothesis to a speechlet component 290 associated with the top scoring NLU hypothesis.

A "speechlet" or "speechlet component" may be software running on the server(s) 120 that is akin to a software application running on a traditional computing device. That is, a speechlet component 290 may enable the server(s) 120 to execute specific functionality in order to perform one or more actions (e.g., provide information to a user, display content to a user, output music, or perform some other requested action). The server(s) 120 may be configured with more than one speechlet component 290. For example, a weather speechlet component may enable the server(s) 120 to provide weather information, a ride sharing speechlet component may enable the server(s) 120 to schedule a trip with respect to a ride sharing service, a restaurant speechlet component may enable the server(s) 120 to order a pizza with respect to a restaurant's online ordering system, a communications speechlet component may enable the system to perform messaging or multi-endpoint communications, a device-specific speechlet may enable the system to perform one or more actions specific to the device 110, etc. A speechlet component 290 may operate in conjunction between the server(s) 120 and other devices such as a device 110 local to a user in order to complete certain functions. Inputs to a speechlet component 290 may come from various interactions and input sources.

The functionality described herein as a speechlet or speechlet component may be referred to using many different terms, such as an action, bot, app, or the like.

A speechlet component 290 may include hardware, software, firmware, or the like that may be dedicated to the particular speechlet component 290 or shared among different speechlet components 290. A speechlet component 290 may be part of the server(s) 120 (as illustrated in FIG. 2) or may be located at whole (or in part) with one or more separate servers.

Unless expressly stated otherwise, reference to a speechlet, speechlet device, or speechlet component may include a speechlet component operating within the server(s) 120 (for example as speechlet component 290) and/or speechlet component operating within a server(s) separate from the server(s) 120.

A speechlet component 290 may be configured to perform one or more actions. An ability to perform such action(s) may sometimes be referred to as a "skill." That is, a skill may enable a speechlet component 290 to execute specific functionality in order to provide data or produce some other output requested by a user. A particular speechlet component 290 may be configured to execute more than one skill. For example, a weather skill may involve a weather speechlet component providing weather information to the server(s) 120, a ride sharing skill may involve a ride sharing speechlet component scheduling a trip with respect to a ride sharing service, an order pizza skill may involve a restaurant speechlet component ordering a pizza with respect to a restaurant's online ordering system, a windows control skill may involve a device-specific speechlet component causing a vehicle to move its windows, etc.

A speechlet component 290 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, device-specific skills, as well as custom skills that are not associated with any pre-configured type of skill.

In some examples, the system may be configured with different device-specific speechlet components (illustrated as part of the speechlet components 290 in FIG. 2). A device-specific speechlet component may be specific to a vehicle manufacturer, an appliance manufacturer, or some other device manufacturer that does not control or maintain the server(s) 120.

A user profile may be configured with top-level speechlets. Thus, a user may invoke a top-level speechlet without explicitly referring to the speechlet in the user input. For example, a weather speechlet may be a top-level speechlet. A user may say "Alexa, what is the weather." In response, the system may call the weather speechlet to provide weather information, even though the user did not explicitly refer to the weather speechlet in the user input.

A user profile may also be configured with non-top-level speechlets. Thus, a user may need to explicitly refer to a non-top-level speechlet in a user input in order to cause the system to call the particular non-top-level speechlet to perform an action responsive to the user input. For example, the system may be configured with a top-level weather speechlet and a non-top-level Weather Underground speechlet. To cause the non-top-level Weather Underground speechlet to be called instead of the top-level weather speechlet, a user may need to explicitly refer to the non-top-level Weather Underground speechlet in the user input, for example by saying "Alexa, ask Weather Underground what is the weather for tomorrow."

In certain instances, the server(s) 120 may receive or determine text data responsive to a user input, when it may be more appropriate for audio to be output to a user. The server(s) 120 may include a TTS component 280 that generates audio data (e.g., synthesized speech) from text data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The server(s) 120 may include profile storage 270. The profile storage 270 may include a variety of information related to individual users, groups of users, etc. that interact with the system. The profile storage 270 may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 270 may include one or more group profiles. Each group profile may be associated with a different group identifier. A group profile may be an umbrella profile specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a single group profile may additionally include preferences specific to the user associated therewith. That is, each user profile may include preferences unique from one or more other user profiles associated with the same group profile. A user profile may be a stand-alone profile or may be associated with a group profile.

A user profile may represent speechlet components enabled by the user associated with the user profile. The system may be configured such that certain speechlet components may not be invoked by a user's input unless the user has enabled the speechlet component. The system may automatically enable a device-specific speechlet component with respect to a user profile when the user associates a device, associated with the device-specific speechlet component, with the user's profile. For example, if the user associates a vehicle with their user profile, the system may enable the vehicle manufacturer's speechlet component without a particular user request to do so. The system may hide a device-specific speechlet component from a user until the user has associated a device (associated with the device-specific speechlet component) with their user profile. This is because device-specific speechlet components may be configured to only provide functionality useful to users having devices associated with the device-specific speechlet components. For example, a particular vehicle manufacturer's speechlet component may only provide functionality useful to a user having one or more of the vehicle manufacturer's vehicles.

When a user associates a device with their user profile, the user may provide the system with account information (e.g., account number, username, password, etc.). The server(s) 120 (or components thereof) may use the account information to communicate with a device server(s) associated with the vehicle. The server(s) 120 may be restricted from sending data to or receiving data from a device server(s) until the server(s) 120 authenticates itself with the device server(s) using the account information and/or a device identifier specific to the device newly associated with the user profile.

The profile storage 270, or a different storage, may store device profiles. Each device profile may be associated with a different device identifier. Each device profile may represent output capabilities (e.g., audio, video, quality of output, etc.) of the device. Each device profile may also represent a speechlet component identifier specific to a device-specific speechlet component associated with the device. For example, if the device 110 is a vehicle, the speechlet component identifier may represent a vehicle manufacturer speechlet component associated with the vehicle. For further example, if the device 110 is an appliance, the speechlet component identifier may represent an appliance manufacturer speechlet component associated with the appliance.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the component(s) of the system(s) and/or user are located.

The server(s) 120 may include a user recognition component 295 that recognizes one or more users associated with data input to the system. The user recognition component 295 may take as input the audio data 211, text data 213, and/or text data output by the ASR component 250. The user recognition component 295 determines scores indicating whether user input originated from a particular user. For example, a first score may indicate a likelihood that the user input originated from a first user, a second score may indicate a likelihood that the user input originated from a second user, etc. The user recognition component 295 also determines an overall confidence regarding the accuracy of user recognition operations. The user recognition component 295 may perform user recognition by comparing audio characteristics in the audio data 211 to stored audio characteristics of users. The user recognition component 295 may also perform user recognition by comparing biometric data (e.g., fingerprint data, iris data, etc.) received by the system in correlation with the present user input to stored biometric data of users. The user recognition component 295 may further perform user recognition by comparing image data (e.g., including a representation of at least a feature of a user) received by the system in correlation with the present user input with stored image data including representations of features of different users. The user recognition component 295 may perform additional user recognition processes, including those known in the art. Output of the user recognition component 295 may include a single user identifier corresponding to the most likely user that originated the present input. Alternatively, output of the user recognition component 295 may include an N-best list of user identifiers with respective scores indicating likelihoods of respective users originating the present input. The output of the user recognition component 295 may be used to inform NLU processing as well as processing performed by speechlet components 290.

Figure 3:
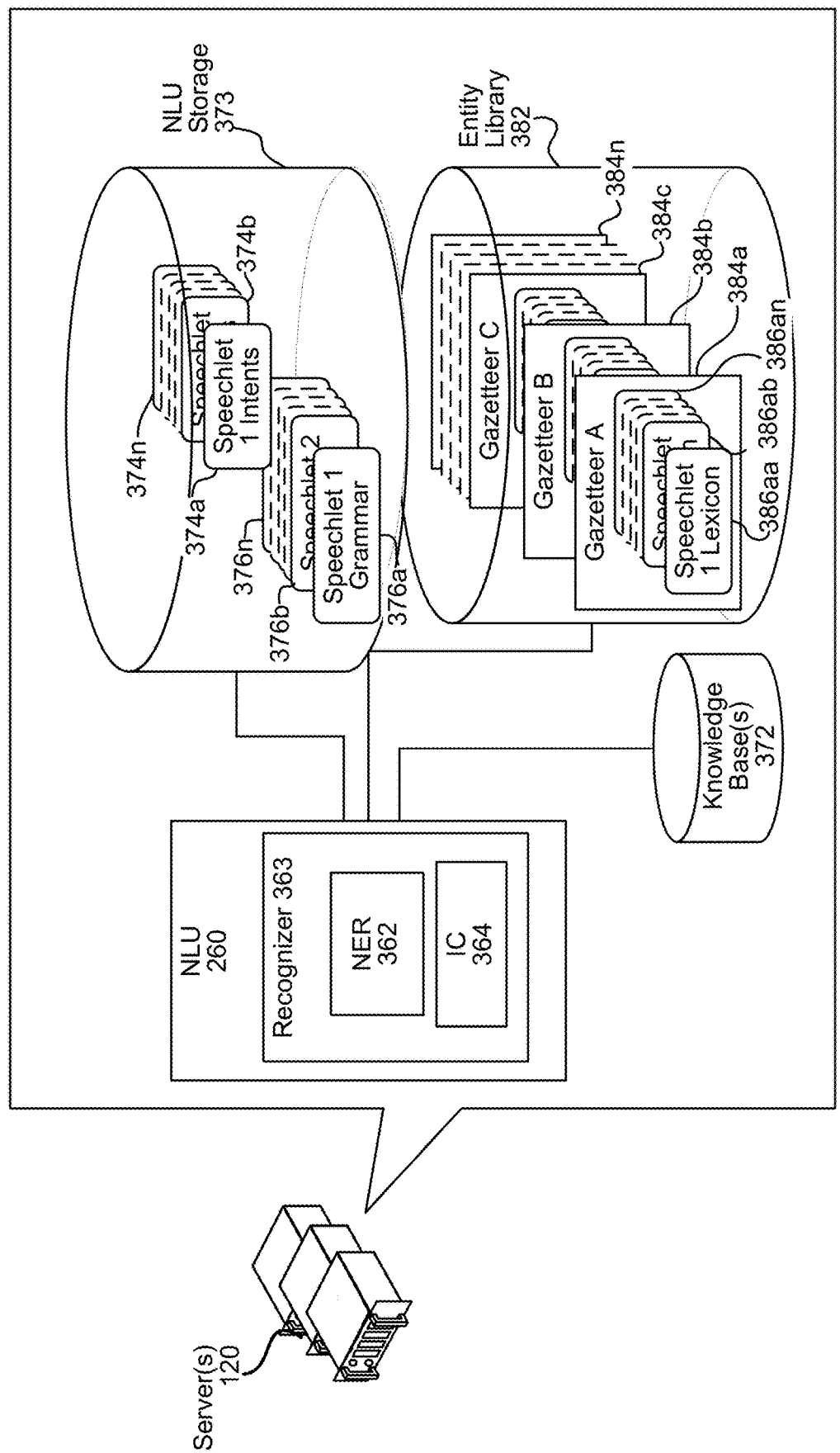
FIG. 3 is a conceptual diagram of how natural language understanding processing is performed according to embodiments of the present disclosure.

FIG. 3 illustrates how NLU processing is performed on text data. Generally, the NLU component 260 attempts to make a semantic interpretation of text data input thereto. That is, the NLU component 260 determines the meaning behind text data based on the individual words and/or phrases represented therein. The NLU component 260 interprets text data to derive an intent of the user as well as pieces of the text data that allow a device (e.g., the device 110, the server(s) 120, etc.) to complete that action. For example, if the NLU component 260 receives text data corresponding to "tell me the weather," the NLU component 260 may determine that the user intends the system to output weather information.

The NLU component 260 may process text data including several hypotheses. For example, if the ASR component 250 outputs text data including an N-best list of ASR hypotheses, the NLU component 260 may process the text data with respect to all (or a portion of) the ASR hypotheses represented therein. Even though the ASR component 250 may output an N-best list of ASR hypotheses, the NLU component 260 may be configured to only process with respect to the top scoring ASR hypothesis in the N-best list.

The NLU component 260 may annotate text data by parsing and/or tagging the text data. For example, for the text data "tell me the weather for Seattle," the NLU component 260 may tag "Seattle" as a location for the weather information.

The NLU component 260 may include one or more recognizers 363. Each recognizer 363 may be associated with a different speechlet component 290. Each recognizer 363 may process with respect to text data input to the NLU component 260. Each recognizer 363 may operate in parallel with other recognizers 363 of the NLU component 260.

Each recognizer 363 may include a named entity recognition (NER) component 362. The NER component 362 attempts to identify grammars and lexical information that may be used to construe meaning with respect to text data input therein. The NER component 362 identifies portions of text data that correspond to a named entity that may be applicable to processing performed by a speechlet component 290, associated with the recognizer 363 implementing the NER component 362. The NER component 362 (or other component of the NLU component 260) may also determine whether a word refers to an entity whose identity is not explicitly mentioned in the text data, for example "him," "her," "it" or other anaphora, exophora or the like.

Each recognizer 363, and more specifically each NER component 362, may be associated with a particular grammar model and/or database 373, a particular set of intents/actions 374, and a particular personalized lexicon 386. Each gazetteer 384 may include speechlet-indexed lexical information associated with a particular user and/or device 110. For example, a Gazetteer A (384a) includes speechlet-indexed lexical information 386aa to 386an. A user's music speechlet lexical information might include album titles, artist names, and song names, for example, whereas a user's contact list speechlet lexical information might include the names of contacts. Since every user's music collection and contact list is presumably different, this personalized information improves entity resolution.

An NER component 362 applies grammar models 376 and lexical information 386 associated with the speechlet component 290 (associated with the recognizer 363 implementing the NER component 362) to determine a mention of one or more entities in text data. In this manner, the NER component 362 identifies "slots" (corresponding to one or more particular words in text data) that may be needed for later processing. The NER component 362 may also label each slot with a type (e.g., noun, place, city, artist name, song name, etc.).

Each grammar model 376 includes the names of entities (i.e., nouns) commonly found in speech about the particular speechlet component 290 to which the grammar model 376 relates, whereas the lexical information 386 is personalized to the user and/or the device 110 from which the user input originated. For example, a grammar model 376 associated with a shopping speechlet component may include a database of words commonly used when people discuss shopping.

A downstream process called named entity resolution (discussed in detail elsewhere herein) actually links a portion of text data to an actual specific entity known to the system. To perform named entity resolution, the NLU component 260 may utilize gazetteer information (384a-384n) stored in an entity library storage 382. The gazetteer information 384 may be used to match text data with different entities, such as song titles, contact names, etc. Gazetteers 384 may be linked to users (e.g., a particular gazetteer may be associated with a specific user's music collection), may be linked to certain speechlet components 290 (e.g., a shopping speechlet component, a music speechlet component, a video speechlet component, a device-specific speechlet component, etc.), or may be organized in a variety of other ways.

Each recognizer 363 may also include an intent classification (IC) component 364. An IC component 364 parses text data to determine an intent(s), associated with the speechlet component 290 (associated with the recognizer 363 implementing the IC component 364), that potentially represents the user input. An intent represents to an action a user desires be performed. An IC component 364 may communicate with a database 374 of words linked to intents. For example, a music intent database may link words and phrases such as "quiet," "volume off," and "mute" to a <Mute> intent. An IC component 364 identifies potential intents by comparing words and phrases in text data to the words and phrases in an intents database 374, associated with the speechlet component 290 that is associated with the recognizer 363 implementing the IC component 364.

The intents identifiable by a specific IC component 364 are linked to speechlet-specific (i.e., the speechlet component 290 associated with the recognizer 363 implementing the IC component 364) grammar frameworks 376 with "slots" to be filled. Each slot of a grammar framework 376 corresponds to a portion of text data that the system believes corresponds to an entity. For example, a grammar framework 376 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386 (associated with the speechlet component 290 associated with the recognizer 363 implementing the NER component 362), attempting to match words and phrases in text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as hidden Markov models, maximum entropy models, log linear models, conditional random fields (CRF), and the like. For example, an NER component 362 implemented by a music speechlet recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb based on a word database associated with the music speechlet, which an IC component 364 (also implemented by the music speechlet recognizer) may determine corresponds to a <PlayMusic> intent. At this stage, no determination has been made as to the meaning of "mother's little helper" and "the rolling stones," but based on grammar rules and models, the NER component 362 has determined the text of these phrases relates to the grammatical object (i.e., entity) of the user input represented in the text data.

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words associated with the speechlet component 290 (in the knowledge base 372). For example, if the text data includes "play songs by the rolling stones," after failing to determine an album name or song name called "songs" by "the rolling stones," the NER component 362 may search the speechlet vocabulary for the word "songs." In the alternative, generic words may be checked before the gazetteer information, or both may be tried, potentially producing two different results.

An NER component 362 may tag text data to attribute meaning thereto. For example, an NER component 362 may tag "play mother's little helper by the rolling stones" as: {speechlet} Music, {intent}<PlayMusic>, {artist name} rolling stones, {media type} SONG, and {song title} mother's little helper. For further example, the NER component 362 may tag "play songs by the rolling stones" as: {speechlet} Music, {intent}<PlayMusic>, {artist name} rolling stones, and {media type} SONG.

Figure 4:
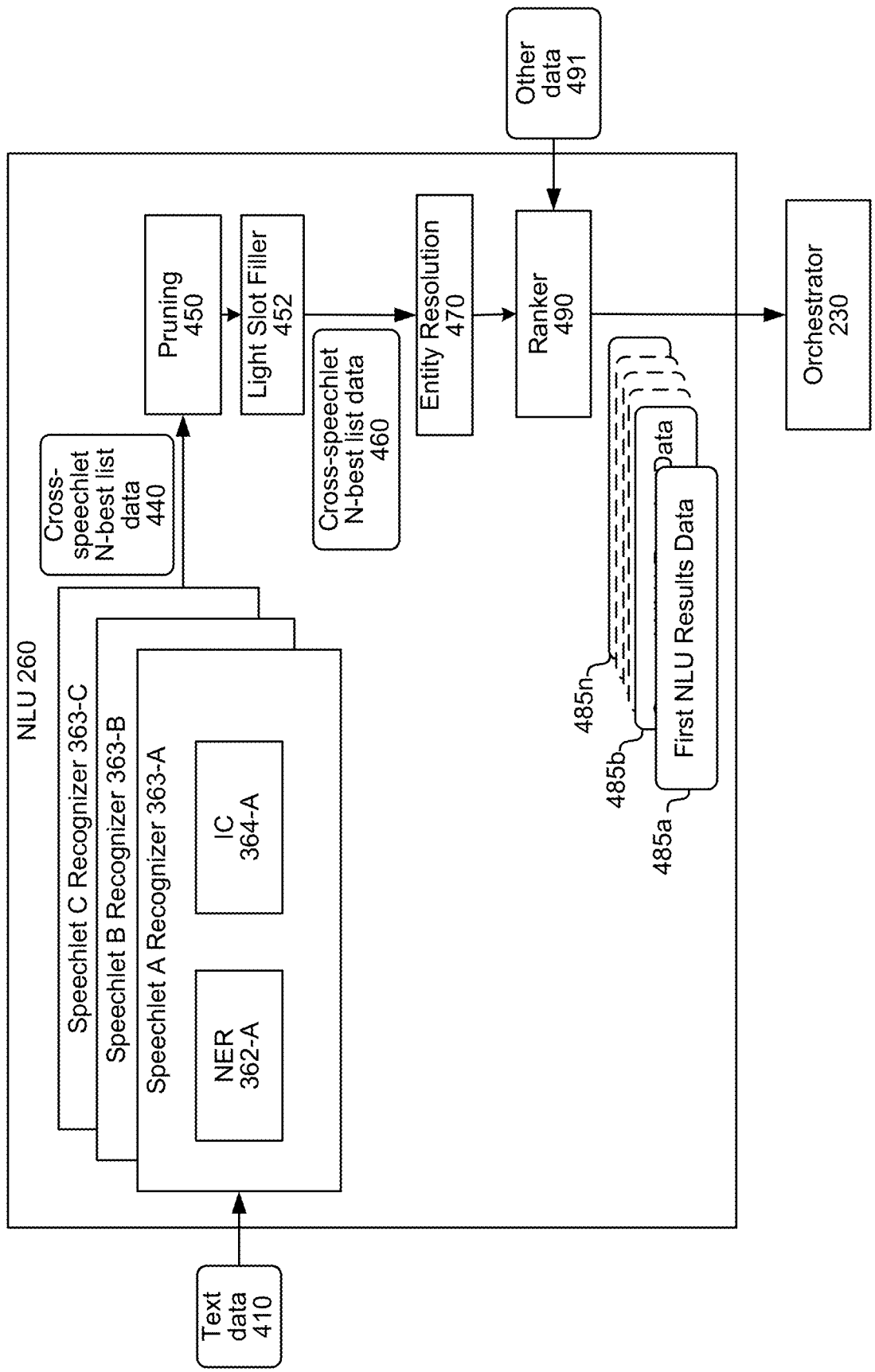
FIG. 4 is a conceptual diagram of how natural language understanding processing is performed according to embodiments of the present disclosure.

The NLU component 260 may generate cross-speechlet N-best list data 440, which may include a list of NLU hypotheses output by each recognizer 363 (as illustrated in FIG. 4). A recognizer 363 may output tagged text data generated by an NER component 362 and an IC component 364 operated by the recognizer 363, as described above. Each NLU hypothesis including an intent indicator and text/slots called out by the NER component 362 may be grouped as an NLU hypothesis represented in the cross-speechlet N-best list data 440. Each NLU hypothesis may also be associated with one or more respective score(s) for the NLU hypothesis. For example, the cross-speechlet N-best list data 440 may be represented as, with each line representing a separate NLU hypothesis:

[0.95] Intent: <PlayMusic> ArtistName: Lady Gaga SongName: Poker Face

[0.95] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The NLU component 260 may send the cross-speechlet N-best list data 440 to a pruning component 450. The pruning component 450 may sort the NLU hypotheses represented in the cross-speechlet N-best list data 440 according to their respective scores. The pruning component 450 may then perform score thresholding with respect to the cross-speechlet N-best list data 440. For example, the pruning component 450 may select NLU hypotheses represented in the cross-speechlet N-best list data 440 associated with confidence scores satisfying (e.g., meeting and/or exceeding) a threshold confidence score. The pruning component 450 may also or alternatively perform number of NLU hypothesis thresholding. For example, the pruning component 450 may select a maximum threshold number of top scoring NLU hypotheses. The pruning component 450 may generate cross-speechlet N-best list data 460 including the selected NLU hypotheses. The purpose of the pruning component 450 is to create a reduced list of NLU hypotheses so that downstream, more resource intensive, processes may only operate on the NLU hypotheses that most likely represent the user's intent.

The NLU component 260 may also include a light slot filler component 452. The light slot filler component 452 can take text data from slots represented in the NLU hypotheses output by the pruning component 450 and alter it to make the text data more easily processed by downstream components. The light slot filler component 452 may perform low latency operations that do not involve heavy operations such as reference to a knowledge base. The purpose of the light slot filler component 452 is to replace words with other words or values that may be more easily understood by downstream system components. For example, if an NLU hypothesis includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the cross-speechlet N-best list data 460.

The NLU component 260 sends the cross-speechlet N-best list data 460 to an entity resolution component 470. The entity resolution component 470 can apply rules or other instructions to standardize labels or tokens from previous stages into an intent/slot representation. The precise transformation may depend on the speechlet component 290. For example, for a travel speechlet component, the entity resolution component 270 may transform text data corresponding to "Boston airport" to the standard BOS three-letter code referring to the airport. The entity resolution component 470 can refer to a knowledge base that is used to specifically identify the precise entity referred to in each slot of each NLU hypothesis represented in the cross-speechlet N-best list data 460. Specific intent/slot combinations may also be tied to a particular source, which may then be used to resolve the text data. In the example "play songs by the stones," the entity resolution component 470 may reference a personal music catalog, Amazon Music account, user profile data, or the like. The entity resolution component 470 may output text data including an altered N-best list that is based on the cross-speechlet N-best list data 460, and that includes more detailed information (e.g., entity IDs) about the specific entities mentioned in the slots and/or more detailed slot data that can eventually be used by a speechlet component 290. The NLU component 260 may include multiple entity resolution components 470 and each entity resolution component 470 may be specific to one or more speechlet components 290.

The entity resolution component 470 may not be successful in resolving every entity and filling every slot represented in the cross-speechlet N-best list data 460. This may result in the entity resolution component 470 outputting incomplete results.

The NLU component 260 may include a ranker component 490. The ranker component 490 may assign a particular confidence score to each NLU hypothesis input therein. The confidence score of an NLU hypothesis may represent a confidence of the system in the NLU processing performed with respect to the NLU hypothesis. The confidence score of a particular NLU hypothesis may be affected by whether the NLU hypothesis has unfilled slots. For example, if an NLU hypothesis associated with a first speechlet component includes slots that are all filled/resolved, that NLU hypothesis may be assigned a higher confidence score than another NLU hypothesis including at least some slots that are unfilled/unresolved by the entity resolution component 470.

The ranker component 490 may apply re-scoring, biasing, or other techniques to determine the top scoring NLU hypotheses. To do so, the ranker component 490 may consider not only the data output by the entity resolution component 470, but may also consider other data 491. The other data 491 may include a variety of information. The other data 491 may include speechlet component 290 rating or popularity data. For example, if one speechlet component 290 has a particularly high rating, the ranker component 490 may increase the score of an NLU hypothesis associated with that speechlet component 290. The other data 491 may also include information about speechlet components 290 that have been enabled for the user identifier and/or device identifier associated with the current user input. For example, the ranker component 490 may assign higher scores to NLU hypotheses associated with enabled speechlet components 290 than NLU hypotheses associated with non-enabled speechlet components 290. The other data 491 may also include data indicating user usage history, such as if the user identifier associated with the current user input is regularly associated with user input that invokes a particular speechlet component 290 or does so at particular times of day. The other data 491 may additionally include data indicating date, time, location, weather, type of device 110, user identifier, device identifier, context, as well as other information. For example, the ranker component 490 may consider when any particular speechlet component 290 is currently active (e.g., music being played, a game being played, etc.) with respect to the user or device associated with the current user input. The other data 291 may also include device type information. For example, if the device 110 does not include a display, the ranker component 490 may decrease the score associated with NLU hypotheses that would result in displayable content being presented to a user.

Following ranking by the ranker component 490, the NLU component 260 may output NLU results data 485 to the orchestrator component 230. The NLU results data 485 may include first NLU results data 485*a* including tagged text data associated with a first speechlet component 290*a*, second NLU results data 485*b* including tagged text data associated with a second speechlet component 290*b*, etc. The NLU results data 485 may include the top scoring NLU hypotheses (e.g., in the form of an N-best list) as determined by the ranker component 490. Alternatively, the NLU results data 485 may include the top scoring NLU hypothesis as determined by the ranker component 490.

Prior to the orchestrator component 230 sending text data to the NLU component 260, the orchestrator component 230 may determine whether the device 110 is associated with a device-specific speechlet component 290. The orchestrator component 230 may use the device identifier, received from the device 110, to determine device profile data associated with the device 110. The orchestrator component 230 may determine the device profile data represents a speechlet component identifier unique to a device-specific speechlet component associated with the device 110. Alternatively, the orchestrator component 230 may determine the device profile data represents a manufacturer of the device 110. The orchestrator component 230 may then determine whether the system includes a device-specific speechlet component associated with the device manufacturer.

If the orchestrator component 230 determines the device 110 is associated with a device-specific speechlet component, the orchestrator component 230 calls the NLU component 260 twice. The orchestrator component 230 calls the NLU component 260 to perform NLU processing on text data (received from the device 110, or output by the ASR component 250) with respect to various speechlet components of the system, as described above with respect to FIGS. 3 and 4. The orchestrator component 230 also separately calls the NLU component 260 to perform NLU processing on the text data specifically with respect to the device-specific speechlet component. The NLU component 260 may perform the foregoing processing at least partially in parallel, and output NLU results of the respective processing to the orchestrator component 230. The orchestrator component 230 may then rank the received NLU results to determine which speechlet component should be called to execute with respect to the current user input.

Figure 5:
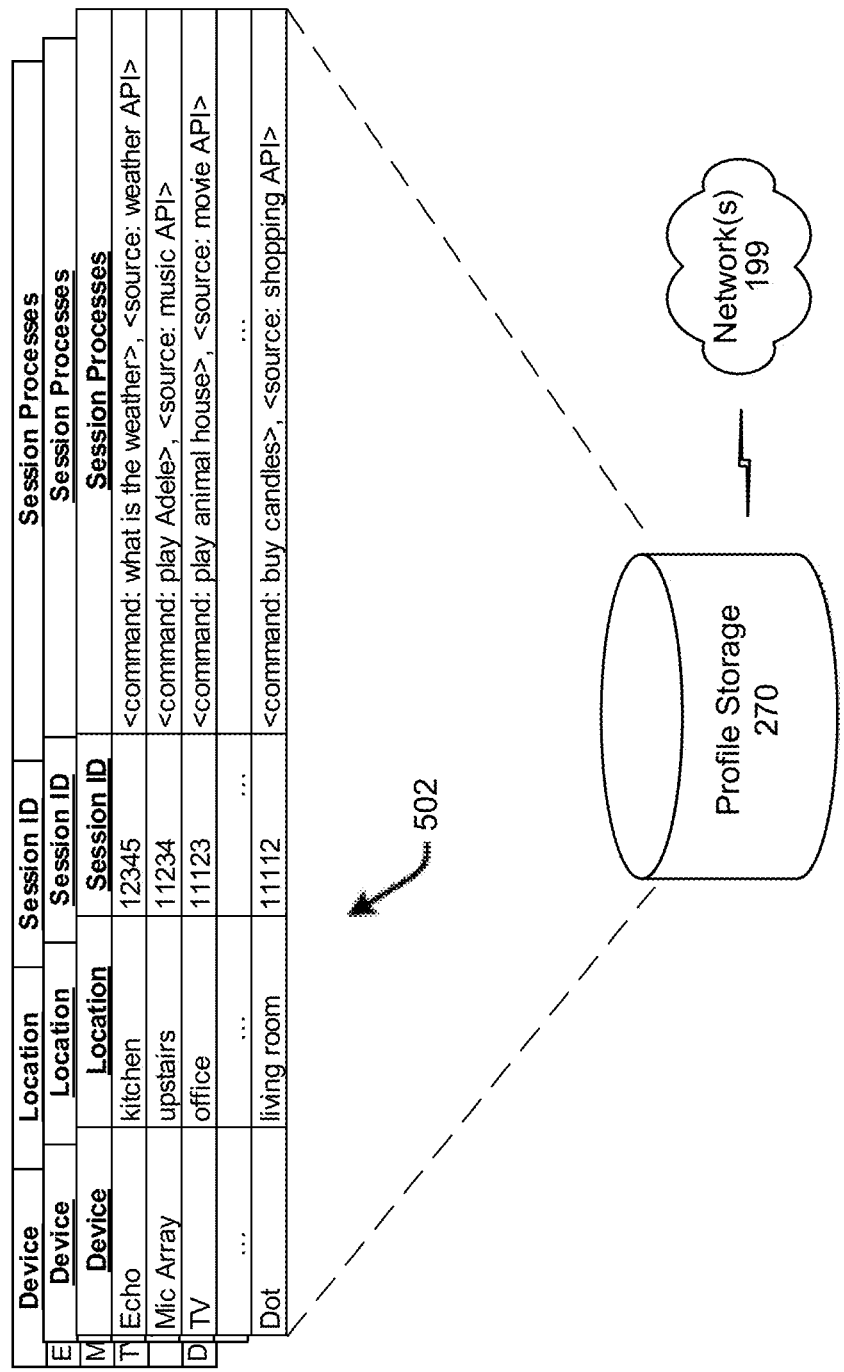
FIG. 5 illustrates data stored and associated with user profiles according to embodiments of the present disclosure.

FIG. 5 illustrates data stored and associated with user accounts according to embodiments of the present disclosure. The server(s) 120 may include or refer to data regarding user accounts 502 (e.g., user profile(s)), shown by the profile storage 270 illustrated in FIG. 5. The profile storage 270 may be located proximate to server(s) 120, or may otherwise be in communication with various components, for example over network(s) 199. In an example, the profile storage 270 is a cloud-based storage.

As discussed above, the profile storage 270 may include a variety of information related to individual users, households, accounts, etc. that interact with the system 100. For illustration, as shown in FIG. 5, each user profile 502 may include data such as device type information, device location information, session ID information, and processes performed with respect to each session ID. Each user profile 502 may also include information about previous usage history (e.g., number of times an application is used), previous commands/intents, temporal information or the like. In addition, a user profile 502 may store other data as well. In some examples, the profile storage 270 may include data regarding devices associated with particular individual user accounts 502. Such data may include device identifier (ID) and internet protocol (IP) address information for different devices as well as names by which the devices may be referred to by a user. Further qualifiers describing the devices may also be listed along with a description of the type of object of the device.

Figure 6:
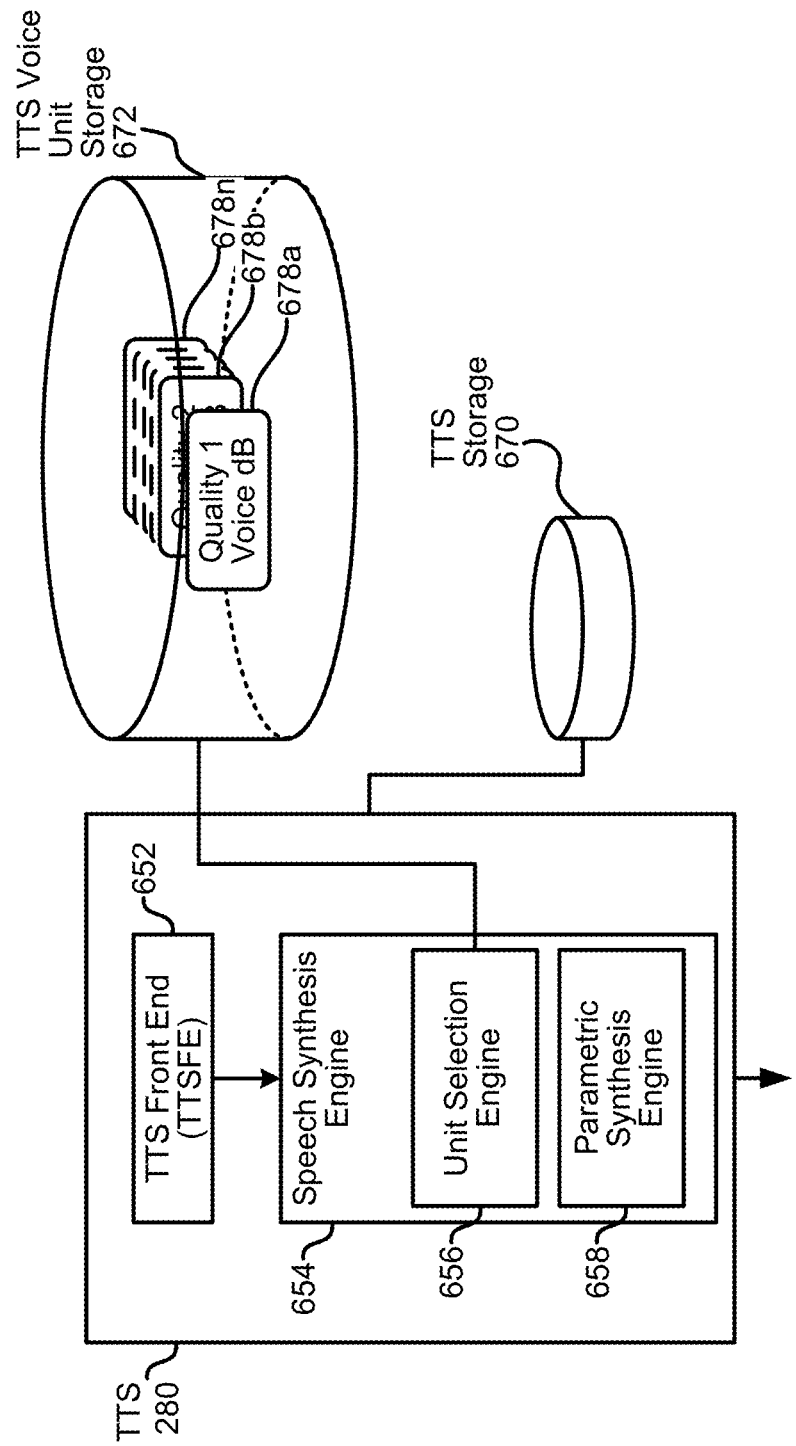
FIG. 6 illustrates an example of a text-to-speech (TTS) component generating TTS or synthesized speech according to examples of the present disclosure.

FIG. 6 illustrates an example of a text-to-speech (TTS) component 280 generating TTS or synthesized speech according to examples of the present disclosure. The TTS component/processor 280 includes a TTS front end (TTSFE) 652, a speech synthesis engine 654, and TTS storage 670. The TTSFE 652 transforms input text data (for example from command processor 290) into a symbolic linguistic representation for processing by the speech synthesis engine 654. The TTSFE 652 may also process tags or other data input to the TTS component that indicate how specific words should be pronounced (e.g., an indication that a word is an interjection). The speech synthesis engine 654 compares the annotated phonetic units models and information stored in the TTS storage 670 for converting the input text into speech. The TTSFE 652 and speech synthesis engine 654 may include their own controller(s)/processor(s) and memory or they may use the controller/processor and memory of the server(s) 120, device 110, or other device, for example. Similarly, the instructions for operating the TTSFE 652 and speech synthesis engine 654 may be located within the TTS component 280, within the memory and/or storage of the server(s) 120, device 110, or within an external device.

Text input into a TTS component 280 may be sent to the TTSFE 652 for processing. The front-end may include components for performing text normalization, linguistic analysis, and linguistic prosody generation. During text normalization, the TTSFE processes the text input and generates standard text, converting such things as numbers, abbreviations (such as Apt., St., etc.), symbols ($, %, etc.) into the equivalent of written out words.

During linguistic analysis the TTSFE 652 analyzes the language in the normalized text to generate a sequence of phonetic units corresponding to the input text. This process may be referred to as phonetic transcription. Phonetic units include symbolic representations of sound units to be eventually combined and output by the system as speech. Various sound units may be used for dividing text for purposes of speech synthesis. A TTS component 280 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage 670. The linguistic analysis performed by the TTSFE 652 may also identify different grammatical components such as prefixes, suffixes, phrases, punctuation, syntactic boundaries, or the like. Such grammatical components may be used by the TTS component 280 to craft a natural sounding audio waveform output. The language dictionary may also include letter-to-sound rules and other tools that may be used to pronounce previously unidentified words or letter combinations that may be encountered by the TTS component 280. Generally, the more information included in the language dictionary, the higher quality the speech output.

Based on the linguistic analysis the TTSFE 652 may then perform linguistic prosody generation where the phonetic units are annotated with desired prosodic characteristics, also called acoustic features, which indicate how the desired phonetic units are to be pronounced in the eventual output speech. During this stage the TTSFE 652 may consider and incorporate any prosodic annotations that accompanied the text input to the TTS component 280. Such acoustic features may include pitch, energy, duration, and the like. Application of acoustic features may be based on prosodic models available to the TTS component 280. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information.

The output of the TTSFE 652, referred to as a symbolic linguistic representation, may include a sequence of phonetic units annotated with prosodic characteristics. This symbolic linguistic representation may be sent to a speech synthesis engine 654, also known as a synthesizer, for conversion into an audio waveform of speech for output to an audio output device and eventually to a user. The speech synthesis engine 654 may be configured to convert the input text into high-quality natural-sounding speech in an efficient manner. Such high-quality speech may be configured to sound as much like a human speaker as possible, or may be configured to be understandable to a listener without attempts to mimic a precise human voice.

A speech synthesis engine 654 may perform speech synthesis using one or more different methods. In one method of synthesis called unit selection, described further below, a unit selection engine 656 matches the symbolic linguistic representation created by the TTSFE 652 against a database of recorded speech, such as a database of a voice corpus. The unit selection engine 656 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (such as its pitch, energy, etc.), as well as other information, such as where the phonetic unit appears in a word, sentence, or phrase, the neighboring phonetic units, etc. Using all the information in the unit database, a unit selection engine 656 may match units to the input text to create a natural sounding waveform. The unit database may include multiple examples of phonetic units to provide the system with many different options for concatenating units into speech. One benefit of unit selection is that, depending on the size of the database, a natural sounding speech output may be generated. As described above, the larger the unit database of the voice corpus, the more likely the system will be able to construct natural sounding speech.

In another method of synthesis called parametric synthesis parameters such as frequency, volume, noise, are varied by a parametric synthesis engine 658, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. A TTS component 280 may include an acoustic model, or other models, which may convert a symbolic linguistic representation into a synthetic acoustic waveform of the text input based on audio signal manipulation. The acoustic model includes rules which may be used by the parametric synthesis engine 658 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTSFE 652.

The parametric synthesis engine 658 may use a number of techniques to match speech to be synthesized with input phonetic units and/or prosodic annotations. One common technique is using Hidden Markov Models (HMIs). HMMs may be used to determine probabilities that audio output should match textual input. HMIs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 654, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise) based vocoders, CELP (code-excited linear prediction) vocoders, GlottHMM vocoders, HSM (harmonic/stochastic model) vocoders, or others.

Unit selection speech synthesis may be performed as follows. Unit selection includes a two-step process. First a unit selection engine 656 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well a given speech unit matches the features of a desired speech output (e.g., pitch, prosody, etc.). A join cost represents how well a speech unit matches a consecutive speech unit for purposes of concatenating the speech units together in the eventual synthesized speech. The overall cost function is a combination of target cost, join cost, and other costs that may be determined by the unit selection engine 656. As part of unit selection, the unit selection engine 656 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS storage 670 and/or in another storage component. For example, different unit selection databases may be stored in TTS voice unit storage 672. Each speech unit database includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 654 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Audio waveforms including the speech output from the TTS component 280 may be sent to an audio output component, such as a speaker for playback to a user or may be sent for transmission to another device, such as another server(s) 120, for further processing or output to a user. Audio waveforms including the speech may be sent in a number of different formats such as a series of feature vectors, uncompressed audio data, or compressed audio data. For example, audio speech output may be encoded and/or compressed by an encoder/decoder (not shown) prior to transmission. The encoder/decoder may be customized for encoding and decoding speech data, such as digitized audio data, feature vectors, etc. The encoder/decoder may also encode non-TTS data of the system, for example using a general encoding scheme such as .zip, etc.

A TTS component 280 may be configured to perform TTS processing in multiple languages. For each language, the TTS component 280 may include specially configured data, instructions and/or components to synthesize speech in the desired language(s). To improve performance, the TTS component 280 may revise/update the contents of the TTS storage 670 based on feedback of the results of TTS processing, thus enabling the TTS component 280 to improve speech recognition.

Other information may also be stored in the TTS storage 670 for use in speech recognition. The contents of the TTS storage 670 may be prepared for general TTS use or may be customized to include sounds and words that are likely to be used in a particular application. For example, for TTS processing by a global positioning system (GPS) device, the TTS storage 670 may include customized speech specific to location and navigation. In certain instances the TTS storage 670 may be customized for an individual user based on his/her individualized desired speech output. For example a user may prefer a speech output voice to be a specific gender, have a specific accent, speak at a specific speed, have a distinct emotive quality (e.g., a happy voice), or other customizable characteristic(s) (such as speaking an interjection in an enthusiastic manner) as explained in other sections herein. The speech synthesis engine 654 may include specialized databases or models to account for such user preferences.

For example, to create the customized speech output of the system, the system may be configured with multiple voice corpuses/unit databases 678a-678n, where each unit database is configured with a different "voice" to match desired speech qualities. The voice selected by the TTS component 280 to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterance may be spoken by an individual and recorded by the system. The TTS training utterances used to train a TTS voice corpus may be different from the training utterances used to train an ASR system or the models used by the speech quality detector. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice corpuses 678 may then be used during runtime to perform unit selection to synthesize speech having a speech quality corresponding to the input speech quality.

FIG. 7 is a signal flow diagram illustrating an example of processing speech and generating output audio according to embodiments of the present disclosure. A device 110 receives (702) input audio corresponding to an utterance of a user. The device 110 generates input audio data corresponding to the received input audio and sends (704) the input audio data to the server(s) 120 for processing.

When the server(s) 120 receives the first input audio data, the server(s) 120 performs (706) speech recognition on the first input audio data to generate first input text data. The server(s) 120 also performs (708) natural language processing on the first input text data to determine an intent of a user command represented in the utterance of the input audio. Based on the intent of the user command, the server(s) 120 determine (710) an action to perform and perform (712) the action. For example, the server(s) 120 may determine that the user wants to play music and may identify a music source available to the user from which to stream. However, the disclosure is not limited thereto and the server(s) 120 may perform any action known to one of skill in the art without departing from the disclosure.

After performing the action in step 712, the server(s) 120 may generate (714) output data in response to the first utterance and may perform (716) text-to-speech (TTS) processing on the output data to generate first output audio data. For example, the output data may include text data to be output to a user as synthesized speech and the server(s) 120 may perform TTS processing to generate the output audio data including the synthesized speech.

The server(s) 120 may send (718) the output audio data to the user device 110 and the device 110 may output (720) audio corresponding to the output audio data. Thus, the device 110 may output the audio to a user 5 local to the device 110. If the user 5 responds to the audio, the device 110 may receive second input audio corresponding to a second utterance and repeat the steps listed above.

For ease of illustration, FIG. 7 illustrates a high level signal flow diagram encompassing the overall system for processing speech and generating output audio. However, the server(s) 120 may perform additional steps to determine an intent corresponding to the speech and generate output audio.

In some examples, the server(s) 120 may determine that there is enough information to process the speech and select an action that corresponds to the speech without further input from the user 5. For example, the server(s) 120 may generate one or more candidate actions and select one of the actions using the orchestrator 230. The server(s) 120 may determine a confidence score associated with the selected action, which indicates a likelihood that the action corresponds to the speech, and if the confidence score is above a threshold value the server(s) 120 may dispatch the action to a speechlet 290 associated with the selected action. Dispatching the action refers to sending an instruction to the speechlet 290 to execute a command, which may be indicated by a framework having slots/fields that correspond to the selected action.

In other examples, the server(s) 120 may determine that there is not enough information to select an action and may request additional information from the user 5. The server(s) 120 may utilize thresholding to determine whether a specific action is being invoked by the user 5 or whether there is insufficient information to select an action. For example, if the server(s) 120 determines one or more intents that may correspond to the speech, but none of the intents are associated with a confidence value meeting or exceeding a threshold value, the server(s) 120 may request additional information. While the server(s) 120 may dispatch the selected action despite the confidence score being below the threshold value, a lower confidence score corresponds to an increased likelihood that the selected action is not what the user 5 intended. Thus, dispatching the selected action may result in performing a command that is different than the user 5 requested, resulting in a lower user satisfaction value after the command is executed.

In order to increase the likelihood that the selected action corresponds to the speech, the server(s) 120 may generate a prompt requesting additional information and/or clarification from the user 5. For example, in response to a request to "book a flight to Portland," the server(s) 120 may generate a prompt that solicits the user as to whether Portland corresponds to Portland, Oregon or Portland, Maine (e.g., "Would you like to fly to Portland, Oregon, or to Portland, Maine?"). The solicitation may take the form of text output via a display of a user device or audio output by a speaker of a user device. The solicitation may be output by a device different from the device that received the speech. For example, a first device 110a may generate the input audio data but a second device 110b may output the solicitation to the user without departing from the disclosure. Accordingly, if the solicitation to the user is to be audio, the TTS component 280 may generate output audio data based on the text data of the prompt and the device 110 may output audio corresponding to the output audio data.

In response to the output audio, the user may provide additional information. Thus, the server(s) 120 may receive second input audio data and perform speech recognition processing and natural language process on the second input audio data to determine the additional information. If the additional information clarifies the request, the server(s) 120 may select an action having a confidence score above the threshold value and execute a command.

As described above, FIG. 7 illustrates a high level signal flow diagram encompassing the overall system for processing speech and generating output audio. For example, FIG. 7 illustrates an example of the server(s) 120 receiving input audio data representing a voice command, processing the input audio data to determine an intent and a corresponding action associated with the voice command, performing the action, and then generating output audio data in response to the voice command. For ease of illustration, the following drawings may not go into detail about how the server(s) 120 process input audio data and generate output audio data. Instead, the following drawings may omit details in order to illustrate important concepts of the invention.

In some examples, a skill may be customized to control which user profile(s) and/or account(s) are given access to the skill. For example, a skill/intent may be customized to only be accessible by friends and family of the skill creator. Additionally or alternatively, a business may customize the business enterprise skill to only be accessible by employees of the business.

To restrict access, the server(s) 120 may perform some form of filtering to identify whether a particular user profile and/or account is permitted to access to the skill. For example, the server(s) 120 may determine that a voice command is invoking the skill, determine that a corresponding user profile is not permitted access to the skill, and explicitly deny access to the skill. Additionally or alternatively, the server(s) 120 may implicitly restrict access by ignoring potential intents associated with the skill. For example, the server(s) 120 may determine a plurality of potential intents associated with the voice command, determine that a highest confidence score of the plurality of potential intents corresponds to a first potential intent associated with the skill, determine that the user profile does not have access to the skill, and select a second potential intent having a second confidence score lower than the first confidence score. Thus, if the user profile had access to the skill the server(s) 120 would select the first potential intent, but since the user profile does not have access the server(s) 120 may select the second potential intent instead.

In some examples, instead of restricting access to the skill by filtering potential intents, the server(s) 120 may enable access to the skill by adding potential intents associated with the skill to a top-level domain. For example, user profile(s) and/or account(s) that are given access to the skill and/or corresponding speechlet may be configured such that the speechlet is included as a top-level speechlet. Thus, a user may invoke a top-level speechlet without explicitly referring to the speechlet. For example, a weather speechlet may be a top-level speechlet and a user may say "Alexa, what is the weather" to invoke the weather speechlet.

Additionally or alternatively, the user profile(s) and/or account(s) that are given access to the skill and/or corresponding speechlet may be configured such that the speechlet is associated with the user profile and/or account but included as a non-top-level speechlet. Thus, a user may need to explicitly refer to a non-top-level speechlet in a user input in order to cause the system to call the particular non-top-level speechlet to perform an action responsive to the user input. For example, the user profile may be configured with a top-level weather speechlet and a non-top-level Weather Underground speechlet. To cause the non-top-level Weather Underground speechlet to be called instead of the top-level weather speechlet, a user may need to explicitly refer to the non-top-level Weather Underground speechlet, for example by saying "Alexa, ask Weather Underground what is the weather for tomorrow."

When user profile(s) and/or account(s) are not given access to the skill and/or corresponding speechlet, the speechlet is not associated with the user profile(s) and/or account(s) and the server(s) do not associate potential intents corresponding to the skill with the user profile. Thus, the user cannot invoke the skill even when explicitly referring to the speechlet.

Similarly, a skill and/or intent may be customized to control whether the skill/intent may be invoked when the device 110 is locked. For example, a skill/intent may be customized to only be accessible (e.g., invoked or processed) when the device 110 is in an unlocked state, thus restricting access to the skill/intent and protecting a privacy of the user profile. When the device 110 is locked and the skill/intent is invoked, the server(s) 120 may determine that a voice command is invoking the skill/intent, determine that a corresponding user profile is not permitted access to the skill/intent when the device 110 is locked, and may explicitly deny access to the skill/intent (e.g., send a prompt to unlock the device 110).

Additionally or alternatively, the server(s) 120 may implicitly restrict access by ignoring potential intents associated with the skill/intent when the device 110 is locked. For example, the server(s) 120 may determine a plurality of potential intents associated with the voice command, determine that a highest confidence score of the plurality of potential intents corresponds to a first potential intent associated with the skill, determine that the user profile does not have access to the skill/intent when the device 110 is locked, and select a second potential intent having a second confidence score lower than the first confidence score. Thus, if the user profile had access to the skill/intent the server(s) 120 would select the first potential intent (e.g., if the device 110 was unlocked the server(s) 120 would select the first potential intent), but since the user profile does not have access when the device 110 is locked, the server(s) 120 may select the second potential intent instead.

In some examples, instead of restricting access to the skill/intent by filtering potential intents, the server(s) 120 may enable access to the skill/intent by adding potential intents associated with the skill/intent to a top-level domain when the device 110 is unlocked and adding potential intents associated with the skill/intent to a non-top-level domain when the device 110 is locked. For example, user profile(s) and/or account(s) that are given access to the skill and/or corresponding speechlet may be configured such that the speechlet is included as a top-level speechlet when the device 110 is unlocked. Thus, when the device 110 is unlocked, a user may invoke a top-level speechlet without explicitly referring to the speechlet. For example, a weather speechlet may be a top-level speechlet and a user may say "Alexa, what is the weather" to invoke the weather speechlet. However, when the device 110 is locked, the user may invoke the non-top-level speechlet by explicitly referring to the speechlet.

Figure 8D:
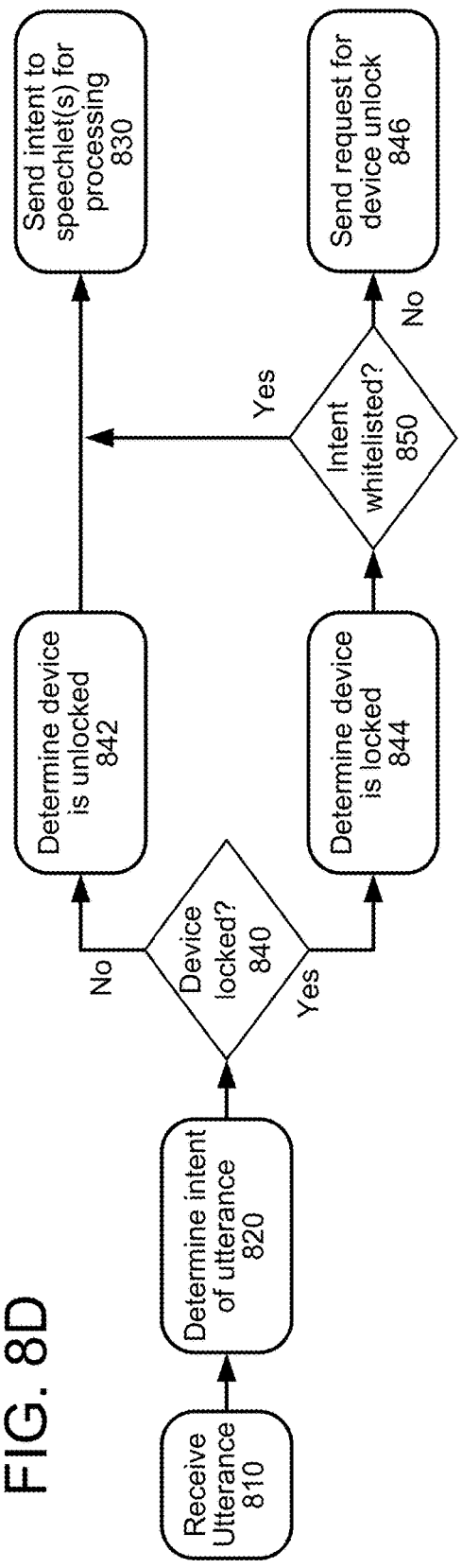

FIGS. 8A-8E illustrate examples of processing an utterance received from a locked device according to embodiments of the present disclosure. As illustrated in FIG. 8A, to process an utterance received from an unlocked device, the server(s) 120 may receive (810) the utterance (e.g., audio data including the utterance) from the device 110, may determine (820) an intent of the utterance, and may send (830) the intent to one or more speechlet(s) for processing. For example, the speechlet(s) may determine an action to perform and the server(s) 120 may perform the action.

In contrast, the server(s) 120 may process an utterance differently when the utterance is received from a locked device 110. In one example illustrated in FIG. 8B, the server(s) 120 may receive (810) the utterance and determine (840) whether the device 110 is locked. For example, the server(s) 120 may receive device context data from the device 110 and may determine state information indicating whether the device 110 is locked or unlocked, although the disclosure is not limited thereto. If the server(s) 120 determine (842) that the device 110 is unlocked, the server(s) 120 may perform the steps described above and determine (820) the intent of the utterance and send (830) the intent to one or more speechlet(s) for processing. However, if the server(s) 120 determine (844) that the device 110 is locked, the server(s) 120 may send (846) a request for device unlock to the device 110. For example, the server(s) 120 may generate output data corresponding to a request to input login information to unlock the device 110, as described in greater detail above.

In a second example illustrated in FIG. 8C, the server(s) 120 may receive (810) the utterance and determine (820) an intent of the utterance for every utterance, regardless of whether the device 110 is locked or unlocked. After determining the intent, the server(s) 120 may determine (840) whether the device is locked. If the server(s) 120 determine (842) that the device 110 is unlocked, the server(s) 120 may send (830) the previously determined intent to one or more speechlet(s) for processing. However, if the server(s) 120 determine (844) that the device 110 is locked, the server(s) 120 may send (846) a request for device unlock to the device 110. Thus, in the example illustrated in FIG. 8B the server(s) 120 determine whether the device 110 is locked as an initial step before determining the intent, whereas in the example illustrated in FIG. 8C the server(s) 120 determine the intent as an initial step and a later processing step determines whether the device 110 is locked or unlocked.

Additionally or alternatively, the server(s) 120 may process certain intents (e.g., perform certain voice commands) even while the device 110 is locked. For example, the server(s) 120 may whitelist certain intents that do not access sensitive information on the device 110 and/or a user profile associated with the device 110, enabling a user of the device 110 to process certain voice commands even when the device 110 is locked. FIG. 8D illustrates a first example wherein this process (e.g., whitelist filtering) is performed prior to sending the intent to one or more speechlet(s), while FIG. 8E illustrates a second example wherein the server(s) 120 send the intent to the one or more speechlet(s) and the speechlet(s) perform this process (e.g., whitelist filtering) prior to processing the intent (e.g., determining an action to perform and/or performing an action based on the intent).

As illustrated in FIG. 8D, the server(s) 120 may receive (810) the utterance and determine (820) an intent of the utterance. However, the disclosure is not limited thereto and the server(s) 120 may determine the intent of the utterance at a later step, as discussed above with regard to FIG. 8B. After determining the intent, the server(s) 120 may determine (840) whether the device is locked. If the server(s) 120 determine (842) that the device 110 is unlocked, the server(s) 120 may send (830) the previously determined intent to one or more speechlet(s) for processing. If the server(s) 120 determine (844) that the device 110 is locked, the server(s) 120 may determine (850) whether the intent is whitelisted and, if so, may loop to step 830 and send the previously determined intent to the one or more speechlet(s) for processing. If the server(s) 120 determine that the device 110 is locked in step 844 and that the intent is not whitelisted in step 850, the server(s) 120 may send (846) a request for device unlock to the device 110.

Figure 8E:
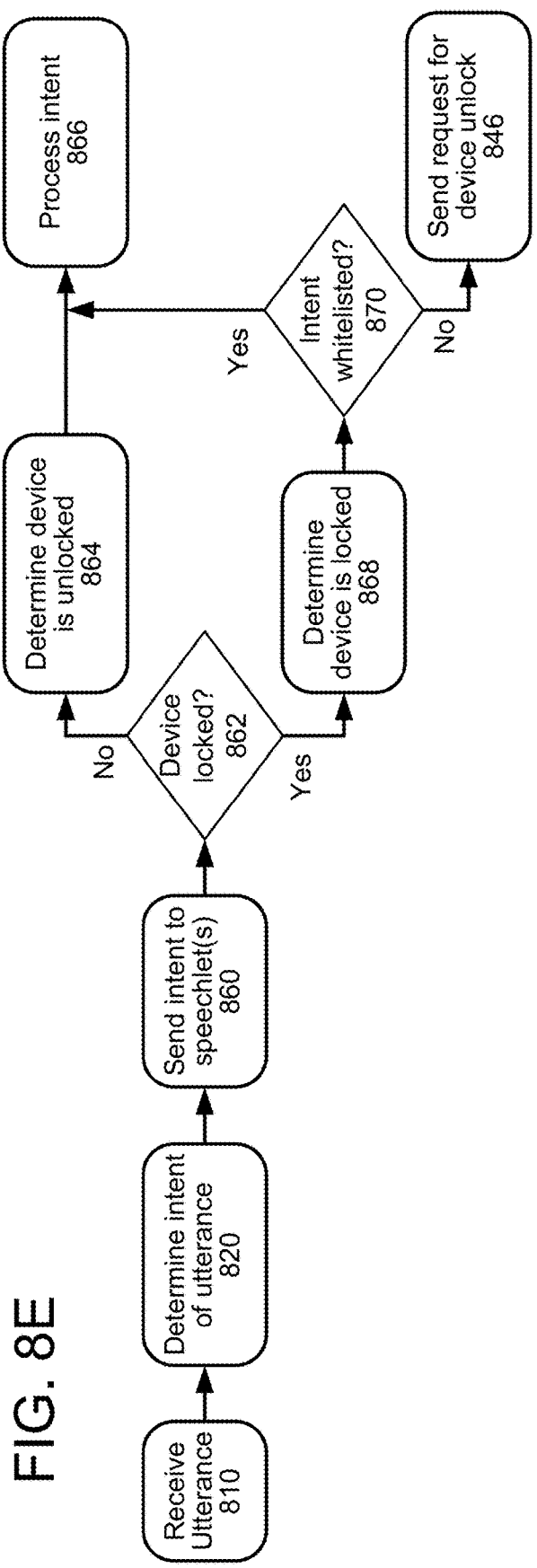

As illustrated in FIG. 8E, the server(s) 120 may receive (810) the utterance and determine (820) an intent of the utterance. However, the disclosure is not limited thereto and the server(s) 120 may determine the intent of the utterance at a later step, as discussed above with regard to FIG. 8B. Whereas FIG. 8D illustrates the server(s) 120 determining whether the device 110 is locked after determining the intent, FIG. 8E illustrates that the server(s) 120 may send (860) the intent to one or more speechlet(s) regardless of whether the device is locked or unlocked. Thus, the whitelist filtering is performed by the one or more speechlet(s) instead of a previous component.

Using each of the one or more speechlet(s), the server(s) 120 may determine (862) whether the device is locked. If the server(s) 120 determine (864) that the device 110 is unlocked, the server(s) 120 may process (866) the intent normally using the current speechlet. If the server(s) 120 determine (866) that the device 110 is locked, the server(s) 120 may determine 870 whether the intent is whitelisted for the current speechlet and, if so, may loop to step 866 to process the intent normally using the current speechlet. If the server(s) 120 determine that the device 110 is locked in step 868 and that the intent is not whitelisted in step 870, the server(s) 120 may send (846) a request for device unlock to the device 110.

As illustrated in FIGS. 8D-8E, the server(s) 120 may perform whitelist filtering on a device level (e.g., determining whether the device 110 is locked using a component prior to sending the intent to one or more speechlet(s) for processing) or on a more granular, speechlet-specific level (e.g., sending the intent to one or more speechlet(s) and then determining whether the device 110 is locked and/or the intent is whitelisted by each of the one or more speechlet(s)). The example illustrated in FIG. 8D is easier to implement and can improve efficiency by reducing redundant processing, whereas the example illustrated in FIG. 8E provides more customization as a particular intent may be processed by a first speechlet but not by a second speechlet. For example, processing the intent by a weather speechlet may not result in privacy concerns, whereas processing the intent by a banking speechlet may result in privacy concerns. Thus, by determining whether to process the intent individually for each speechlet, the example illustrated in FIG. 8E enables the server(s) 120 to perform additional functionality compared to the example illustrated in FIG. 8D without sacrificing privacy protection.

FIGS. 9A-9D illustrate example component diagrams for a server processing an utterance received from a locked device according to embodiments of the present disclosure. To clarify the different components/steps involved with processing an utterance received from a locked device, FIG. 9A illustrates an example component diagram for the server(s) 120 processing an utterance received from an unlocked device. As illustrated in FIG. 9A, the device 110 may send an utterance (e.g., audio data corresponding to a voice command) to the server(s) 120 (e.g., step 1). The server(s) 120 may receive the utterance at a gatekeeper 910 and the gatekeeper 910 may send the utterance, along with device context data, to the orchestrator 230 (e.g., step 2).

The orchestrator 230 may send the audio data to the automatic speech recognition (ASR) component 250 and may receive text data associated with the audio data from the ASR component 250 (e.g., step 3). The orchestrator 230 may send the text data to the natural language understanding (NLU) component 260 and may receive a list of n best intents from the NLU component 260 (e.g., step 4). The orchestrator may then send a speechlet request, which includes the NLU intent data (e.g., n best intents, top rated intent, and/or combination thereof) and the device context data, to a remote application engine (RAE) 920 for further processing (e.g., step 5).

In some examples, the orchestrator 230 may perform additional processing to determine the most relevant intent and therefore the NLU intent data may correspond to a single NLU intent. For example, the orchestrator 230 may send the list of n best intents to another component (not illustrated) that selects the most relevant intent to be included in the speechlet request. The most relevant intent may be selected using rule-based techniques (e.g., a rule may indicate that a certain keyword is associated with a certain intent, so whenever the keyword is detected the rule is applied and the intent selected), based on a confidence score (e.g., when no rule applies, the intent having the highest confidence score may be selected), and/or the like. However, the disclosure is not limited thereto and the NLU intent data may include the n best intents without departing from the disclosure.

The RAE 920 acts as an interface between the orchestrator 230 and the speechlet(s) 290. Thus, the RAE 920 may perform various functions associated with the speechlet request, such as preparing exchanges between the orchestrator 230 and the speechlet(s) 290, modifying an envelope associated with the speechlet request, dispatching the speechlet request to one or more speechlet(s) 290, and/or the like. For example, the RAE 920 may include a first component (e.g., Speechlet Request Envelope Handler) that formats the speechlet request (e.g., wraps the request and response exceptions to the speechlet) and a second component (e.g., Speechlet Dispatcher Handler) that may invoke the speechlets and/or perform dispatching, although the disclosure is not limited thereto.

The RAE 920 may invoke one or more speechlet(s) 290 (e.g., first speechlet 290a, second speechlet 290b, etc.) by sending or dispatching the speechlet request to the one or more speechlet(s) 290 (e.g., step 6). For example, the RAE 920 may determine a speechlet 290 (e.g., speechlet A 290a) or a plurality of speechlets (e.g., speechlet A 290a, speechlet B 290b, and/or additional speechlets) that are registered to receive the NLU intent. The speechlet(s) 290 may be associated with skill(s) 930 (e.g., skills A 930a associated with speechlet A 290a, Skills B 930b associated with speechlet B 290b, etc.) and may execute the speechlet request (e.g., process the NLU intent data) using these skills 930 (e.g., step 7). For example, speechlet A 290a may process the NLU intent data included in the speechlet request using skills A 930a, such that speechlet A 290a determines an action to perform and sends the action to interfaces 940 (e.g., step 8).

Interfaces 940 may include one or more components or processes that generate output data to be sent back to the device 110. For example, the action received from the speechlet(s) 290 may indicate that the device 110 generate audio output including a notification of the action being performed. Thus, the action would include text data and interfaces 940 would generate the text-to-speech audio data (e.g., synthesized speech) based on the text data. Additionally or alternatively, the action may indicate that the device 110 display a graphical output on a display, such as a visual notification or other graphic, and interfaces 940 may generate display data corresponding to the graphical output to be displayed. Thus, interfaces 940 may include a speech synthesizer, graphical components, and/or other components used to interface with a user of the device 110 (e.g., components used to generate output data in order to convey information to the user). Interfaces 940 may send the output data as one or more directive(s) to the gatekeeper 910 (e.g., step 9) and the gatekeeper 910 may send the one or more directive(s) to the device 110 (e.g., step 10).

FIG. 9A illustrates the server(s) 120 processing NLU intent data when an utterance is received from an unlocked device (e.g., the device 110 is in an unlocked state). However, the system 100 enables the device 110 to process voice commands (e.g., voice inputs) even when the device 110 is locked (e.g., the device 110 is in a locked state). To reduce a risk of privacy issues and/or improve a customer experience, the system 100 may process the utterance differently when the device 110 is in a locked state, as illustrated in FIG. 9B. For example, the server(s) 120 may receive device context data from the device 110 and may generate state information data (e.g., lockscreen state information) from the device context data, indicating whether the device 110 is in the locked state or the unlocked state. When the server(s) 120 determine that the device 110 is in the unlocked state, the server(s) 120 may proceed as described above with regard to FIG. 9A to process the NLU intent and send directive(s) to the device 110. When the device 110 is in the locked state, however, the server(s) 120 may generate a prompt requesting that a user unlock the device 110. For example, interfaces 940 may generate TTS audio data requesting that the device 110 be unlocked and generate display data that displays a number keypad or other user interface with which the user may input login information to unlock the device. Thus, the directive(s) sent to the device 110 include output data associated with requesting the login information before proceeding with processing the NLU intent.

As illustrated in FIG. 9B, the server(s) 120 may include a lockscreen service 912. The device 110 may send the utterance (e.g., audio data including a voice command) and device context data to the server(s) 120, which may be received by the gatekeeper 910 (e.g., step 1). Before processing the audio data, the gatekeeper 910 may send the device context data to the lockscreen service 912 (e.g., step 2) and the lockscreen service 912 may determine whether the device 110 is in the locked state or the unlocked state based on the device context data. For example, the lockscreen service 912 may generate state information data, as discussed above.

If the lockscreen service 912 determines that the device 110 is in the unlocked state, the lockscreen service 912 may send an indication of the unlocked state to the gatekeeper 910 (e.g., step 3a) and the server(s) 120 may proceed with processing the audio data as described above with regard to FIG. 9A. For example, the gatekeeper 910 may send the utterance, along with device context data, to the orchestrator 230 (e.g., step 4). The orchestrator 230 may send the audio data to the automatic speech recognition (ASR) component 250 and may receive text data associated with the audio data from the ASR component 250 (e.g., step 5). The orchestrator 230 may send the text data to the natural language understanding (NLU) component 260 and may receive a list of n best intents from the NLU component 260 (e.g., step 6). The orchestrator 230 may then send a speechlet request, which includes the NLU intent data (e.g., n best intents, top rated intent, and/or combination thereof) and the device context data, to the RAE 920 for further processing (e.g., step 7). The RAE 920 may invoke one or more speechlet(s) 290 by sending or dispatching the speechlet request to the one or more speechlet(s) 290 (e.g., step 8). The speechlet(s) 290 may be associated with skill(s) 930 and may execute the speechlet request (e.g., process the NLU intent data) using these skills 930 (e.g., step 9). For example, speechlet A 290a may process the NLU intent data included in the speechlet request using skills A 930a, such that speechlet A 290a determines an action to perform and sends the action to interfaces 940 (e.g., step 10). Interfaces 940 may receive the action to be performed, may generate output data to be sent to the device 110 (e.g., TTS audio data and/or display data), and may send the output data as one or more directive(s) to the gatekeeper 910 (e.g., step 11). The gatekeeper 910 may send the one or more directive(s) to the device 110 (e.g., step 12).

However, if the lockscreen service 912 determines that the device 110 is in the locked state, the lockscreen service 912 may send an indication of the locked state to interfaces 940 and interfaces 940 may generate directive(s) corresponding to the prompt described above. For example, interfaces 940 may generate output data, including display data and TTS audio data that includes synthesized speech, which prompts a user of the device 110 to input login information to unlock the device 110. Thus, the server(s) 120 may not proceed with processing the utterance and instead requests that the device 110 be unlocked before continuing.

While FIG. 9B illustrates the lockscreen service 912 sending an indication of the unlocked state directly to the gatekeeper 910 and the gatekeeper 910 sending the audio data and device context data to the orchestrator 230 in response to receiving the unlocked state, the disclosure is not limited thereto. Instead, the gatekeeper 910 may send the audio data and the device context data to the orchestrator 230 for every utterance and the lockscreen service 912 may send the indication of the unlocked state to the interfaces 940 without departing from the disclosure. Thus, the orchestrator 230 may determine whether the device 110 is in the locked state or the unlocked state by retrieving state information data from the interfaces 940 prior to sending the speechlet request to the RAE 920. Additionally or alternatively, the RAE 920 may determine whether the device 110 is in the locked state or the unlocked state by retrieving state information data from the interfaces 940 prior to dispatching the speechlet request to the one or more speechlet(s) 290.

In some examples, the server(s) 120 may process certain NLU intents even when the device 110 is in the locked state. For example, the server(s) 120 may process NLU intents associated with playing music (e.g., favorable/unfavorable feedback regarding a song, requesting an individual song be played, requesting information about a currently playing song, and/or commands associated with play, stop, pause, shuffle, mute, unmute, volume up, volume down, next, previous, fast forward, rewind, cancel, add to queue, add to playlist, create playlist, etc.), reading a book (e.g., start book, show next chapter, show next page, add bookmark, remove bookmark, rate book, remaining time in audiobook, navigate within book, change speed of audiobook, etc.), with news updates (e.g., sports updates, sports briefing, sports summary, daily briefing, read daily brief, etc.), weather updates (e.g., get weather forecast), cinema showtimes (e.g., what movies are in theaters, requesting movie times for a particular movie, requesting movie times for a particular theater, etc.), general questions (e.g., user asks a question and the server(s) 120 generate a response, such as "What time is it," "What day is it," "Did the Patriots win today," etc.), local searches (e.g., address/phone number associated with a business, hours of the business, what time the business opens or closes, directions to the business, etc.), flight information (e.g., status, arrival time, and/or departure time of a flight), list generating (e.g., creating or browsing to-do lists), notifications (e.g., creating, browsing, modifying, and/or canceling notifications such as alarms, timers, other notifications, and/or the like), suggestions (e.g., "show me things to try," "what can I say," "help me," "what are examples of . . . ," etc.).

In addition to the lockscreen service 912 mentioned above with regard to FIG. 9B, FIG. 9C illustrates that the server(s) 120 may include a whitelist filter 922 and a whitelist database 932. Whereas FIG. 9B illustrates the server(s) 120 determining whether to process the utterance based only on whether the device 110 is in the locked state or the unlocked state, FIG. 9C illustrates the server(s) 120 filtering by NLU intent data and determining to process a first plurality of intents when the device 110 is in the locked state. Thus, the server(s) 120 may perform certain voice commands even while the device 110 is in the locked state, while other voice commands result in the server(s) 120 sending a prompt to unlock the device.

As illustrated in FIG. 9C, the device 110 may send an utterance (e.g., audio data corresponding to a voice command) and device context data to the server(s) 120 (e.g., step 1). The server(s) 120 may receive the utterance and the device context data at the gatekeeper 910 and the gatekeeper 910 may send the device context data to the lockscreen service 912 (e.g., step 2).

The lockscreen service 912 may determine whether the device 110 is in the locked state or the unlocked state based on the device context data and may send an indication of the lockscreen state (e.g., state information data or lockscreen state information) to interfaces 940 (e.g., step 3). For example, the lockscreen service 912 may generate state information data based on the device context data as discussed above. Interfaces 940 may store the indication of the lockscreen state and may make this information available to other components within the server(s) 120, such as the orchestrator 230, the RAE 920, and/or the speechlet(s) 290.

The gatekeeper 910 may send the utterance, along with device context data, to the orchestrator 230 (e.g., step 4). The orchestrator 230 may send the audio data to the automatic speech recognition (ASR) component 250 and may receive text data associated with the audio data from the ASR component 250 (e.g., step 5). The orchestrator 230 may send the text data to the natural language understanding (NLU) component 260 and may receive a list of n best intents from the NLU component 260 (e.g., step 6). The orchestrator 230 may then send a speechlet request, which includes the NLU intent data (e.g., n best intents, top rated intent, and/or combination thereof) and the device context data, to the RAE 920 for further processing (e.g., step 7). In some examples, the NLU intent data corresponds to a single NLU intent, although the disclosure is not limited thereto and the NLU intent data may include the n best intents without departing from the disclosure.

The RAE 920 may perform various functions associated with the speechlet request, such as modifying an envelope and/or dispatching the speechlet request to one or more speechlet(s) 290. For example, the RAE 920 may include a first component (e.g., Speechlet Request Envelope Handler) that wraps the request and response exceptions to the speechlet and a second component (e.g., Speechlet Dispatcher Handler) that may invoke the speechlets and/or perform dispatching, although the disclosure is not limited thereto.

In addition to these other components, in some examples the RAE 920 may include a whitelist filter 922 that may filter based on the NLU intent data included in the speechlet request. For example, the RAE 920 may retrieve state information data from interfaces 940 and may determine whether the device 110 is in a locked state. If the RAE 920 determines that the device 110 is in an unlocked state, the RAE 920 may dispatch the speechlet request to the one or more speechlet(s) 290 regardless of the NLU intent data, as discussed below with regard to step 9a. However, if the RAE 920 determines that the device 110 is in the locked state, the whitelist filter 922 may retrieve a list of whitelisted NLU intents from the whitelist database 932 and may compare the NLU intent data included in the speechlet request with the list of whitelisted NLU intents (e.g., step 8).

If the NLU intent data is included in the list, the RAE 920 may invoke one or more speechlet(s) 290 (e.g., first speechlet 290a, second speechlet 290b, etc.) by sending or dispatching the speechlet request to the one or more speechlet(s) 290 (e.g., step 9a). For example, an NLU intent may be included in the list and the RAE 920 may determine a speechlet 290 (e.g., speechlet A 290a) or a plurality of speechlets (e.g., speechlet A 290a, speechlet B 290b, and/or additional speechlets) that are registered to receive the NLU intent. The speechlet(s) 290 may be associated with skill(s) 930 and may execute the speechlet request (e.g., process the NLU intent data) using these skills 930 (e.g., step 10). For example, speechlet A 290a may process the NLU intent data included in the speechlet request using skills A 930a, such that speechlet A 290a determines an action to perform and sends the action to interfaces 940 (e.g., step 11). Interfaces 940 may receive the action to be performed, may generate output data to be sent to the device 110 (e.g., TTS audio data and/or display data), and may send the output data as one or more directive(s) to the gatekeeper 910 (e.g., step 12). The gatekeeper 910 may send the one or more directive(s) to the device 110 (e.g., step 13).

If the NLU intent data is not included in the list, the RAE 920 may send a prompt requesting that the device 110 be unlocked to interfaces 940 (e.g., step 9b). For example, interfaces 940 may generate TTS audio data requesting that the device 110 be unlocked and/or may generate display data that displays a number keypad or other user interface with which the user may input login information to unlock the device. Thus, the directive(s) sent to the device 110 in response to the prompt include output data indicating that the login information must be entered before the NLU intent will be processed.

While FIG. 9C illustrates the server(s) 120 filtering the speechlet requests based only on NLU intent (e.g., the whitelist filter 922 applies a whitelist filter globally for all speechlet(s) 290), the disclosure is not limited thereto and the server(s) 120 may filter based on NLU intent and speechlet(s) 290 without departing from the disclosure. For example, an NLU intent may be associated with two or more speechlet(s) 290 and the steps illustrated in FIG. 9C may result in the NLU intent being whitelisted or not whitelisted for all of the two or more speechlet(s) 290. To provide additional control over which voice commands to process, in some examples the server(s) 120 may perform the whitelist filtering using individual speechlet(s) 290. For example, the NLU intent may be whitelisted for first speechlet A 290a but not whitelisted for second speechlet B 290b.

FIG. 9D illustrates an example of filtering based on NLU intent and speechlet(s) 290. As illustrated in FIG. 9D, the device 110 may send an utterance (e.g., audio data corresponding to a voice command) and device context data to the server(s) 120 (e.g., step 1). The server(s) 120 may receive the utterance and the device context data at the gatekeeper 910 and the gatekeeper 910 may send the device context data to the lockscreen service 912 (e.g., step 2).

The lockscreen service 912 may determine whether the device 110 is in the locked state or the unlocked state based on the device context data and may send an indication of the lockscreen state (e.g., state information data or lockscreen state information) to interfaces 940 (e.g., step 3). For example, the lockscreen service 912 may generate state information data based on the device context data as discussed above. Interfaces 940 may store the indication of the lockscreen state and may make this information available to other components within the server(s) 120, such as the orchestrator 230, the RAE 920, and/or the speechlet(s) 290.

The gatekeeper 910 may send the utterance, along with device context data, to the orchestrator 230 (e.g., step 4). The orchestrator 230 may send the audio data to the automatic speech recognition (ASR) component 250 and may receive text data associated with the audio data from the ASR component 250 (e.g., step 5). The orchestrator 230 may send the text data to the natural language understanding (NLU) component 260 and may receive a list of n best intents from the NLU component 260 (e.g., step 6). The orchestrator 230 may then send a speechlet request, which includes the NLU intent data (e.g., n best intents, top rated intent, and/or combination thereof) and the device context data, to the RAE 920 for further processing (e.g., step 7). In some examples, the NLU intent data corresponds to a single NLU intent, although the disclosure is not limited thereto and the NLU intent data may include the n best intents without departing from the disclosure.

The RAE 920 may invoke one or more speechlet(s) 290 (e.g., first speechlet 290a, second speechlet 290b, etc.) by sending or dispatching the speechlet request to the one or more speechlet(s) 290 (e.g., step 8). For example, an NLU intent may be included in the list and the RAE 920 may determine a speechlet 290 (e.g., speechlet A 290a) or a plurality of speechlets (e.g., speechlet A 290a, speechlet B 290b, and/or additional speechlets) that are registered to receive the NLU intent. As illustrated in FIG. 9D, the RAE 920 may dispatch the speechlet request to the one or more speechlet(s) 290 without performing whitelist filtering.

Instead, each individual speechlet 290 may include a whitelist filter and may perform whitelist filtering based on the NLU intent data included in the speechlet request. For example, the speechlet(s) 290 may retrieve state information data from interfaces 940 and may determine whether the device 110 is in a locked state. If the speechlet(s) 290 determine that the device 110 is in an unlocked state, the speechlet(s) 290 may process the NLU intent normally, as described below with regard to step 10. However, if the speechlet(s) 290 determine that the device 110 is in a locked state, the whitelist filter for each individual speechlet(s) 290 may retrieve a list of whitelisted NLU intents from the whitelist database 932 and may compare the NLU intent data included in the speechlet request with the list of whitelisted NLU intents (e.g., step 9).

If the device 110 is in an unlocked state and/or if the NLU intent data is included in the list of whitelisted NLU intents, the speechlet(s) 290 may execute the speechlet request (e.g., process the NLU intent data) using the skills 930 (e.g., step 10). For example, speechlet A 290a may process the NLU intent data included in the speechlet request using skills A 930a, such that speechlet A 290a determines an action to perform and sends the action to interfaces 940 (e.g., step 11). Interfaces 940 may receive the action to be performed, may generate output data to be sent to the device 110 (e.g., TTS audio data and/or display data), and may send the output data as one or more directive(s) to the gatekeeper 910 (e.g., step 12). The gatekeeper 910 may send the one or more directive(s) to the device 110 (e.g., step 13).

If the device 110 is in a locked state and the NLU intent data is not included in the list of whitelisted NLU intents, the speechlet(s) 290 may send a prompt requesting that the device 110 be unlocked to interfaces 940 (e.g., step 11). For example, interfaces 940 may generate TTS audio data requesting that the device 110 be unlocked and/or may generate display data that displays a number keypad or other user interface with which the user may input login information to unlock the device. Thus, the directive(s) sent to the device 110 in response to the prompt include output data indicating that the login information must be entered before the NLU intent will be processed.

While the above description refers to the speechlet(s) 290 as a group, each speechlet may perform whitelist filtering using a specific list of whitelisted NLU intents that corresponds to the speechlet. For example, the first speechlet A 290a may compare the NLU intent data to a first list, the second speechlet B 290b may compare the NLU intent data to a second list, and so on. As a result, the whitelist filtering may vary based on the speechlet. For example, the first speechlet A 290a may determine that the NLU intent data is included in the first list and may process the NLU intent data normally, whereas the second speechlet B 290b may determine that the NLU intent data is not included in the second list and may send a prompt to the device 110 requesting that the device 110 be unlocked.

FIGS. 10A-10D illustrate example component diagrams for a device processing a voice command while locked according to embodiments of the present disclosure. To clarify the different components/steps involved with processing an utterance according to embodiments of the present disclosure, FIG. 10A illustrates an example component diagram for the device 110 processing an utterance in a conventional system. As illustrated in FIG. 10A, the device 110 may capture audio data corresponding to the utterance using a microphone array 114 and may send the audio data to a wakeword detection component 220 (e.g., step 1). The wakeword detection component 220 may detect that the wakeword is included in the audio data and may store at least a portion of the audio data corresponding to the utterance in a cache 1010 (e.g., step 2). In addition, the wakeword detection component 220 and/or the cache 1010 may send the audio data to the interface 1020 (e.g., step 3) and the interface 1020 may send the audio data corresponding to the utterance to the server(s) 120 via the gatekeeper 910 (e.g., step 4).

The server(s) 120 may process the audio data, as described above, and may generate one or more directive(s) corresponding to action(s) that were performed by the server(s) 120 and/or action(s) to be performed by the device 110. The gatekeeper 910 may send the one or more directive(s) to the interface 1020 (e.g., step 5) and the interface 1020 may send the one or more directive(s) to a dialog manager 1030 to be executed (e.g., step 6). Based on the directive(s), the dialog manager 1030 may send output audio data to the loudspeaker(s) (e.g., step 7a), display data to a display 1040 (e.g., step 7b), other portions of output data to other components, and/or the like.

While FIG. 10A illustrates the directive(s) being sent to the dialog manager 1030, this is intended for illustrative purposes only and the disclosure is not limited thereto. Instead, the directive(s) may be sent to any component within the device 110 without departing from the disclosure. Additionally or alternatively, while FIG. 10A illustrates the dialog manager 1030 sending the output audio data to the loudspeaker(s) 116 and sending the display data to the display 1040, the disclosure is not limited thereto. Instead, the dialog manager 1030 may only send the output audio data to the loudspeaker(s) 116, may only send the display data to the display 1040, and/or may send other portions of the output data to other components of the device 110 without departing from the disclosure.

As described above, FIG. 10A illustrates an example component diagram for the device 110 processing an utterance in a conventional system. In order to distinguish between the device 110 being in the unlocked state and the locked state, the device 110 needs to send additional information (e.g., device context data) to the server(s) 120 to indicate the current state of the device 110. Thus, FIG. 10B illustrates an example component diagram for the device 110 processing an utterance in an unlocked state.

As illustrated in FIG. 10B, the device 110 may capture audio data corresponding to the utterance using a microphone array 114 and may send the audio data to a wakeword detection component 220 (e.g., step 1). The wakeword detection component 220 may detect that the wakeword is included in the audio data and may store at least a portion of the audio data corresponding to the utterance in a cache 1010 (e.g., step 2). The wakeword detection component 220 and/or the cache 1010 may send the audio data to the interface 1020 (e.g., step 3). In addition, a lockscreen manager 1050 may determine device context data and may send the device context data to the interface 1020 (e.g., step 4). Thus, the interface 1020 may send the device context data, along with the audio data corresponding to the utterance, to the server(s) 120 via the gatekeeper 910 (e.g., step 5).

As the device context data indicates that the device 110 is in an unlocked state, the server(s) 120 may process the audio data, as described above, and may generate one or more directive(s) corresponding to action(s) that were performed by the server(s) 120 and/or action(s) to be performed by the device 110. The gatekeeper 910 may send the one or more directive(s) to the interface 1020 (e.g., step 6) and the interface 1020 may send the one or more directive(s) to a dialog manager 1030 to be executed (e.g., step 7). Based on the directive(s), the dialog manager 1030 may send output audio data to the loudspeaker(s) (e.g., step 8a), display data to a display 1040 (e.g., step 8b), other portions of output data to other components, and/or the like.

While FIG. 10B illustrates the directive(s) being sent to the dialog manager 1030, this is intended for illustrative purposes only and the disclosure is not limited thereto. Instead, the directive(s) may be sent to any component within the device 110 without departing from the disclosure. Additionally or alternatively, while FIG. 10B illustrates the dialog manager 1030 sending the output audio data to the loudspeaker(s) 116 and sending the display data to the display 1040, the disclosure is not limited thereto. Instead, the dialog manager 1030 may only send the output audio data to the loudspeaker(s) 116, may only send the display data to the display 1040, and/or may send other portions of the output data to other components of the device 110 without departing from the disclosure.

While the description of FIG. 10B refers to the device 110 being in an unlocked state, the same steps apply when the device 110 is in a locked state but the voice command is whitelisted. For example, while the device context data may indicate that the device 110 is in the locked state, the server(s) 120 may process the audio data to determine an NLU intent, may determine that the NLU intent data corresponds to a whitelisted intent, and may perform an action based on the NLU intent despite the device 110 being in the locked state. Thus, no further action is needed by the device 110.

In contrast, FIG. 10C illustrates an example component diagram for the device 110 processing an utterance in a locked state (e.g., when the voice command is not whitelisted). As illustrated in FIG. 10C, the device 110 may capture audio data corresponding to the utterance using a microphone array 114 and may send the audio data to a wakeword detection component 220 (e.g., step 1). The wakeword detection component 220 may detect that the wakeword is included in the audio data and may store at least a portion of the audio data corresponding to the utterance in a cache 1010 (e.g., step 2). The wakeword detection component 220 and/or the cache 1010 may send the audio data to the interface 1020 (e.g., step 3). In addition, the lockscreen manager 1050 may determine first device context data and may send the first device context data to the interface 1020 (e.g., step 4). Thus, the interface 1020 may send the first device context data, along with the audio data corresponding to the utterance, to the server(s) 120 via the gatekeeper 910 (e.g., step 5).

In some examples, the server(s) 120 may determine, based on the first device context data, that the device 110 is in the locked state and may generate a prompt requesting that the device 110 be unlocked. In other examples, the server(s) 120 may determine that the device 110 is in the locked state, may process the audio data to determine an NLU intent, may determine that the NLU intent is not included in the list of whitelisted intents, and may generate a prompt requesting that the device 110 be unlocked. Thus, the server(s) 120 may generate one or more directive(s) corresponding to the prompt, the directive(s) including output data (e.g., output audio data, display data, and/or the like) requesting that the device 110 be unlocked.

The gatekeeper 910 may send the one or more directive(s) corresponding to the prompt to the interface 1020 (e.g., step 6) and the interface 1020 may send the one or more directive(s) to a dialog manager 1030 to be executed (e.g., step 7). Based on the directive(s), the dialog manager 1030 may send output audio data to the loudspeaker(s) (e.g., step 8a), display data to a display 1040 (e.g., step 8b), other portions of output data to other components, and/or the like. Thus, the device 110 may output an audio notification and/or display a visual indication indicating that the device 110 needs to be unlocked to continue. Additionally or alternatively, the device 110 may display a user interface to input login information, such as a keypad to input a personal identification number (PIN).

The device 110 may receive input using an input device 1060 (e.g., touchscreen display, physical buttons, etc.) and may send the input data to the lockscreen manager 1050 (e.g., step 9). The lockscreen manager 1050 may determine that the input data corresponds to the login information required to transition to the unlocked state (e.g., login information required to unlock the device) and may send second device context data to the cache 1010 (e.g., step 10a) and/or the interface 1020 (e.g., step 10b). In response to the second device context data, the cache 1010 may send the audio data corresponding to the utterance to the interface 1020 (e.g., step 11) and the interface 1020 may send the second device context data, along with the audio data corresponding to the utterance, to the server(s) 120 via the gatekeeper 910 (e.g., step 12).

While FIG. 10C illustrates the lockscreen manager 1050 sending the second device context data to the cache 1010 in step 10a, the disclosure is not limited thereto. Instead, the lockscreen manager 1050 may send to the cache 1010 an indication that the device 110 is in an unlocked state and/or an instruction to send the audio data to the server(s) 120 without departing from the disclosure. Additionally or alternatively, the lockscreen manager 1050 may send the second device context data to the interface 1020 and/or another component and the interface 1020 and/or the other component may send an indication and/or instruction to the cache 1010.

The server(s) 120 may determine, based on the second device context data, that the device 110 is in the unlocked state and may process the audio data. Thus, the server(s) 120 may generate one or more directive(s) corresponding to action(s) that were performed by the server(s) 120 and/or action(s) to be performed by the device 110. The gatekeeper 910 may send the one or more directive(s) to the interface 1020 (e.g., step 13) and the interface 1020 may send the one or more directive(s) to a dialog manager 1030 to be executed (e.g., step 14). Based on the directive(s), the dialog manager 1030 may send output audio data to the loudspeaker(s) (e.g., step 15a), display data to a display 1040 (e.g., step 15b), other portions of output data to other components, and/or the like.

While FIG. 10C illustrates the directive(s) being sent to the dialog manager 1030, this is intended for illustrative purposes only and the disclosure is not limited thereto. Instead, the directive(s) may be sent to any component within the device 110 without departing from the disclosure. Additionally or alternatively, while FIG. 10C illustrates the dialog manager 1030 sending the output audio data to the loudspeaker(s) 116 and sending the display data to the display 1040, the disclosure is not limited thereto. Instead, the dialog manager 1030 may only send the output audio data to the loudspeaker(s) 116, may only send the display data to the display 1040, and/or may send other portions of the output data to other components of the device 110 without departing from the disclosure.

While FIG. 9C illustrates an example wherein the device 110 caches the audio data and resends the audio data to the server(s) 120 after being unlocked, the disclosure is not limited thereto. For example, instead of the device 110 caching the audio data, the server(s) 120 may cache the NLU intent and/or other information associated with the utterance (e.g., speechlet request, etc.).

FIG. 10D illustrates an example component diagram for the device 110 processing an utterance in a locked state (e.g., when the voice command is not whitelisted) when the server(s) 120 cache the NLU intent. Therefore, the device 110 does not need to cache the audio data and can instead send an indication that the device 110 is in an unlocked state to the server(s) 120 in order for the server(s) 120 to proceed with processing the voice command.

As illustrated in FIG. 10D, the device 110 may capture audio data corresponding to the utterance using a microphone array 114 and may send the audio data to a wakeword detection component 220 (e.g., step 1). The wakeword detection component 220 may detect that the wakeword is included in the audio data and may store at least a portion of the audio data corresponding to the utterance in a cache 1010 (e.g., step 2). The wakeword detection component 220 and/or the cache 1010 may send the audio data to the interface 1020 (e.g., step 3). In addition, the lockscreen manager 1050 may determine first device context data and may send the first device context data to the interface 1020 (e.g., step 4). Thus, the interface 1020 may send the first device context data, along with the audio data corresponding to the utterance, to the server(s) 120 via the gatekeeper 910 (e.g., step 5).

In some examples, the server(s) 120 may determine, based on the first device context data, that the device 110 is in the locked state and may generate a prompt requesting that the device 110 be unlocked. In other examples, the server(s) 120 may determine that the device 110 is in the locked state, may process the audio data to determine an NLU intent, may determine that the NLU intent is not included in the list of whitelisted intents, and may generate a prompt requesting that the device 110 be unlocked. Thus, the server(s) 120 may generate one or more directive(s) corresponding to the prompt, the directive(s) including output data (e.g., output audio data, display data, and/or the like) requesting that the device 110 be unlocked.

The gatekeeper 910 may send the one or more directive(s) corresponding to the prompt to the interface 1020 (e.g., step 6) and the interface 1020 may send the one or more directive(s) to a dialog manager 1030 to be executed (e.g., step 7). Based on the directive(s), the dialog manager 1030 may send output audio data to the loudspeaker(s) (e.g., step 8a), display data to a display 1040 (e.g., step 8b), other portions of output data to other components, and/or the like. Thus, the device 110 may output an audio notification and/or display a visual indication indicating that the device 110 needs to be unlocked to continue. Additionally or alternatively, the device 110 may display a user interface to input login information, such as a keypad to input a personal identification number (PIN).

The device 110 may receive input using an input device 1060 (e.g., touchscreen display, physical buttons, etc.) and may send the input data to the lockscreen manager 1050 (e.g., step 9). The lockscreen manager 1050 may determine that the input data corresponds to the login information required to transition to the unlocked state (e.g., login information required to unlock the device) and may send second device context data to the interface 1020 (e.g., step 10). The interface 1020 may send the second device context data to the server(s) 120 via the gatekeeper 910 (e.g., step 11). While the cache 1010 may be used to store audio data as it is being captured, in this implementation the device 110 does not need to send the audio data corresponding to the utterance back to the server(s) 120 a second time.

The server(s) 120 may determine, based on the second device context data, that the device 110 is in the unlocked state and may process the audio data. Thus, the server(s) 120 may generate one or more directive(s) corresponding to action(s) that were performed by the server(s) 120 and/or action(s) to be performed by the device 110. The gatekeeper 910 may send the one or more directive(s) to the interface 1020 (e.g., step 12) and the interface 1020 may send the one or more directive(s) to a dialog manager 1030 to be executed (e.g., step 13). Based on the directive(s), the dialog manager 1030 may send output audio data to the loudspeaker(s) (e.g., step 14a), display data to a display 1040 (e.g., step 14b), other portions of output data to other components, and/or the like.

While FIG. 10D illustrates the directive(s) being sent to the dialog manager 1030, this is intended for illustrative purposes only and the disclosure is not limited thereto. Instead, the directive(s) may be sent to any component within the device 110 without departing from the disclosure. Additionally or alternatively, while FIG. 10D illustrates the dialog manager 1030 sending the output audio data to the loudspeaker(s) 116 and sending the display data to the display 1040, the disclosure is not limited thereto. Instead, the dialog manager 1030 may only send the output audio data to the loudspeaker(s) 116, may only send the display data to the display 1040, and/or may send other portions of the output data to other components of the device 110 without departing from the disclosure.

Figure 11A:
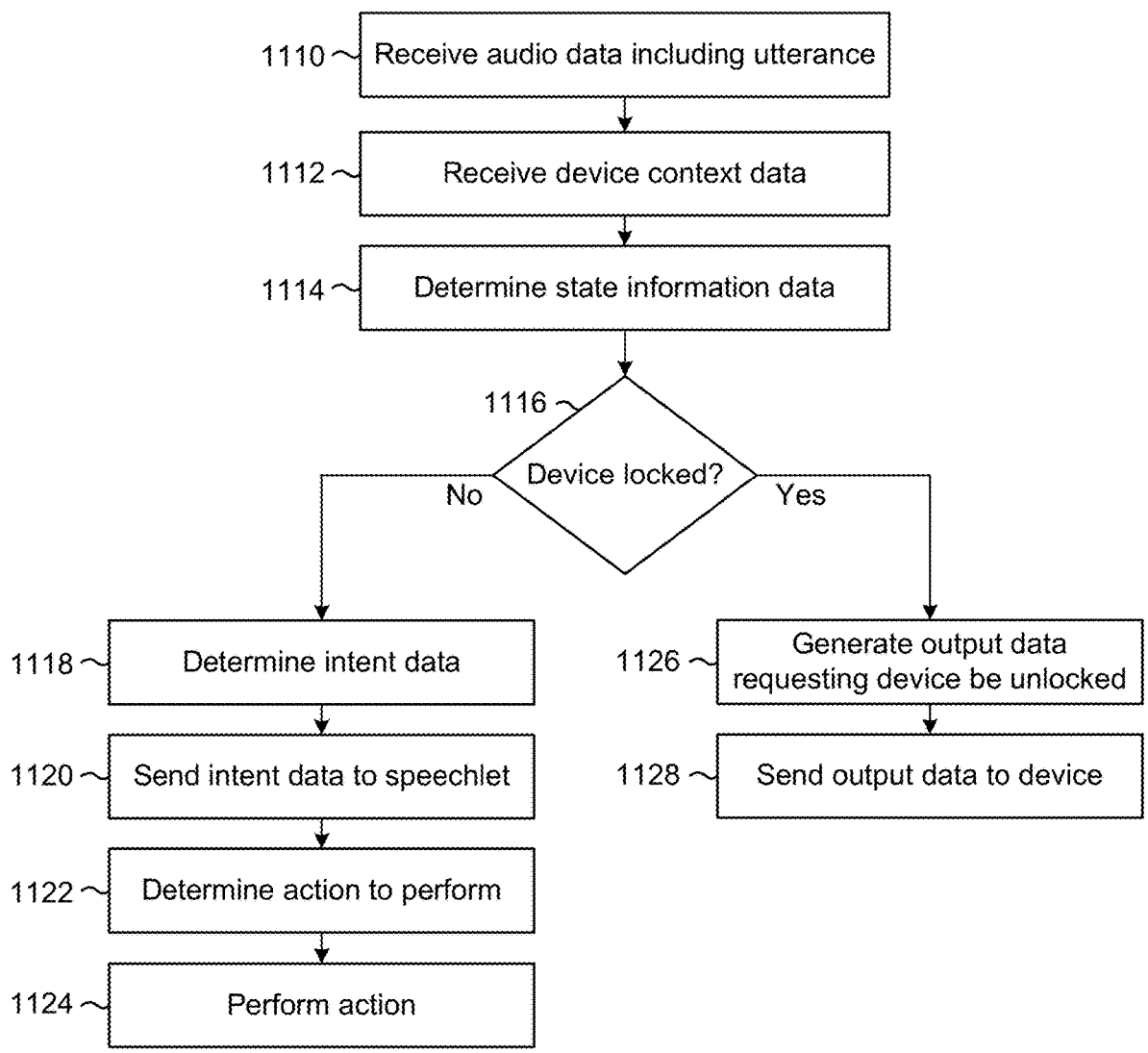
FIGS. 11A-11B are flowcharts conceptually illustrating example methods for processing an utterance received from a locked device according to embodiments of the present disclosure.
Figure 11B:
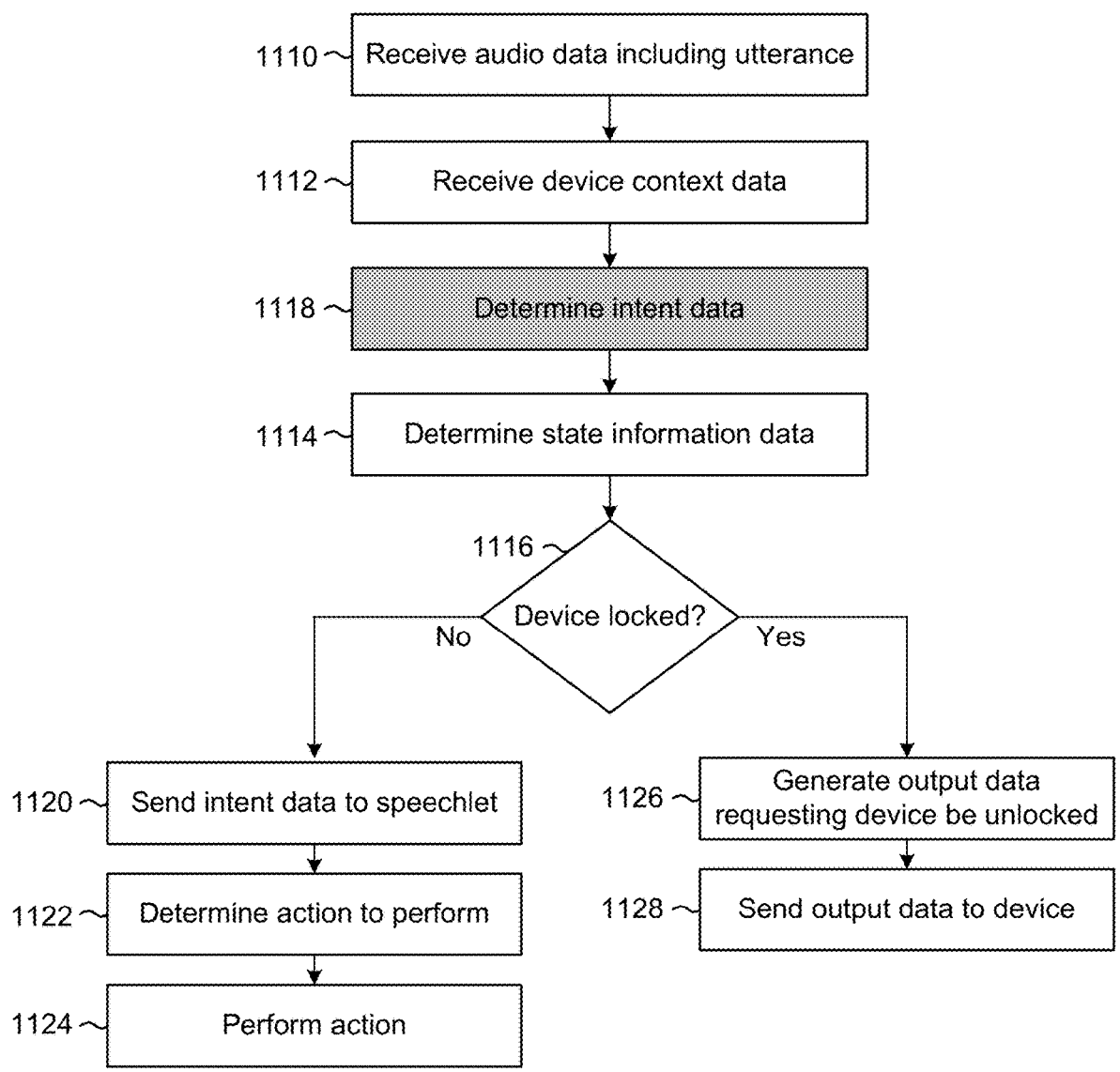

FIGS. 11A-11B are flowcharts conceptually illustrating example methods for processing an utterance received from a locked device according to embodiments of the present disclosure. As illustrated in FIG. 11A, the server(s) 120 may receive (1110) audio data including an utterance and may receive (1112) device context data that indicates a state of the device 110. The server(s) 120 may determine (1114) state information data based on the device context data and may determine (1116) whether the device 110 is locked (e.g., in a locked state) based on the state information data.

If the device 110 is not in a locked state (e.g., in an unlocked state), the server(s) 120 may determine (1118) intent data based on the audio data, send (1120) the intent data to a speechlet (or two or more speechlets), determine (1122) an action to perform, and perform (1124) the action. Thus, the server(s) 120 may process the intent data when the device 110 is in an unlocked state.

If the device 110 is in a locked state, the server(s) 120 may generate (1126) output data requesting that the device 110 be unlocked and may send (1128) the output data to the device 110. For example, the output data may include audio data (e.g., synthesized speech) and/or display data indicating that the device 110 must be unlocked to proceed with the voice command.

While FIG. 11A illustrates the server(s) 120 determining whether the device 110 is locked prior to determining the intent data, the disclosure is not limited thereto. Instead, the server(s) 120 may determine the intent data prior to determining whether the device 110 is locked without departing from the disclosure.

FIG. 11B illustrates an example of determining the intent data prior to determining whether the device 110 is locked. As illustrated in FIG. 11B, the server(s) 120 may receive (1110) audio data including an utterance and may receive (1112) device context data that indicates a state of the device 110. The server(s) 120 may determine (1118) the intent data based on the audio data, may determine (1114) state information data based on the device context data, and may determine (1116) whether the device 110 is locked (e.g., in a locked state) based on the state information data.

If the device 110 is not in a locked state (e.g., in an unlocked state), the server(s) 120 may send (1120) the intent data to a speechlet (or two or more speechlets), determine (1122) an action to perform, and perform (1124) the action. Thus, the server(s) 120 may process the intent data when the device 110 is in an unlocked state.

If the device 110 is in a locked state, the server(s) 120 may generate (1126) output data requesting that the device 110 be unlocked and may send (1128) the output data to the device 110. For example, the output data may include audio data (e.g., synthesized speech) and/or display data indicating that the device 110 must be unlocked to proceed with the voice command.

While FIGS. 11A-11B illustrate the server(s) 120 not processing the intent data when the device 110 is in a locked state, the disclosure is not limited thereto. Instead, the server(s) 120 may perform whitelist filtering to determine whether the intent data is included in a whitelist database. When the intent data is included in the whitelist database, the server(s) 120 may process the intent data even when the device 110 is in the locked state.

Figure 12A:
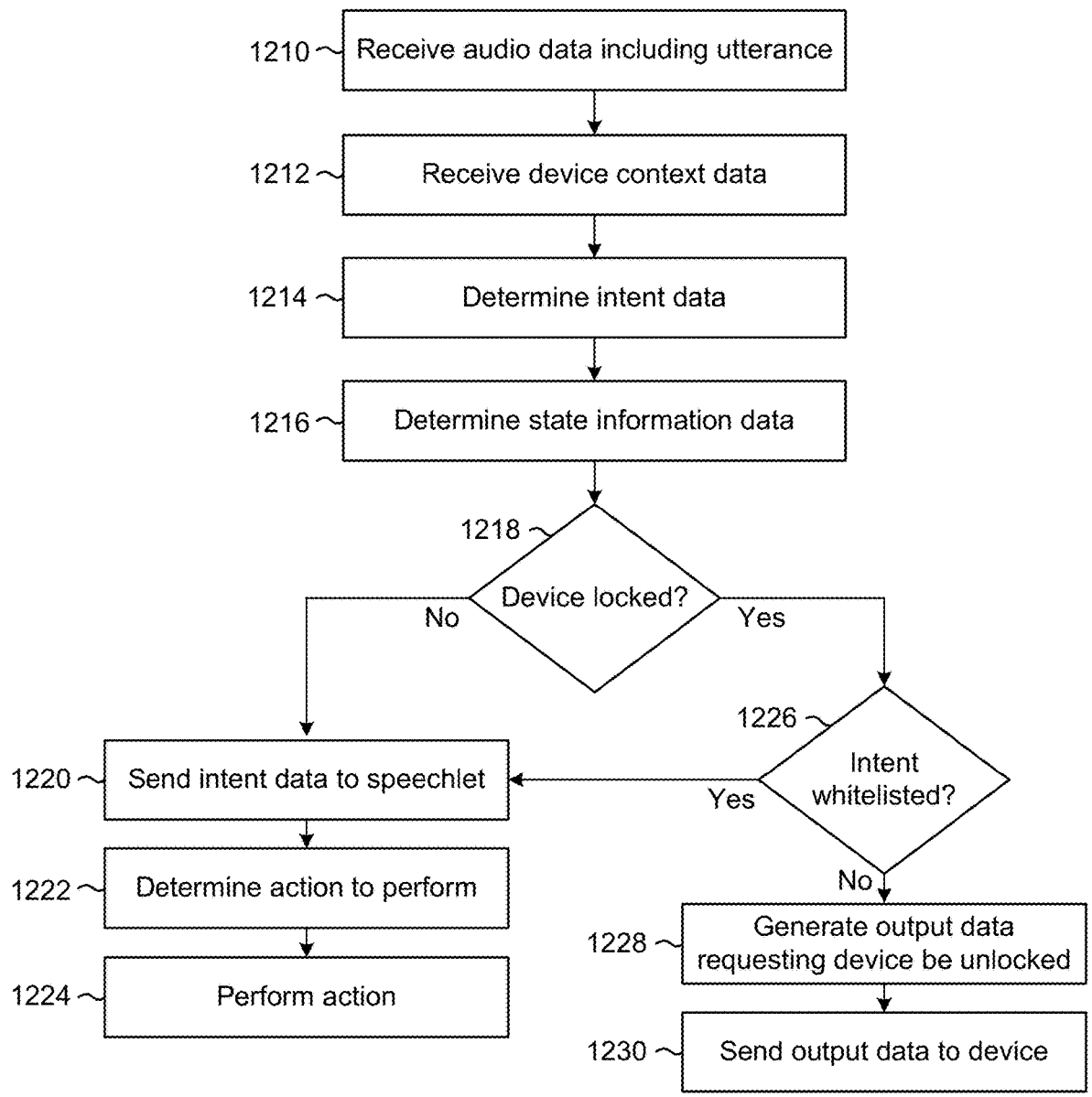
FIGS. 12A-12B are flowcharts conceptually illustrating example methods for processing an utterance received from a locked device using whitelist filtering according to embodiments of the present disclosure.
Figure 12B:
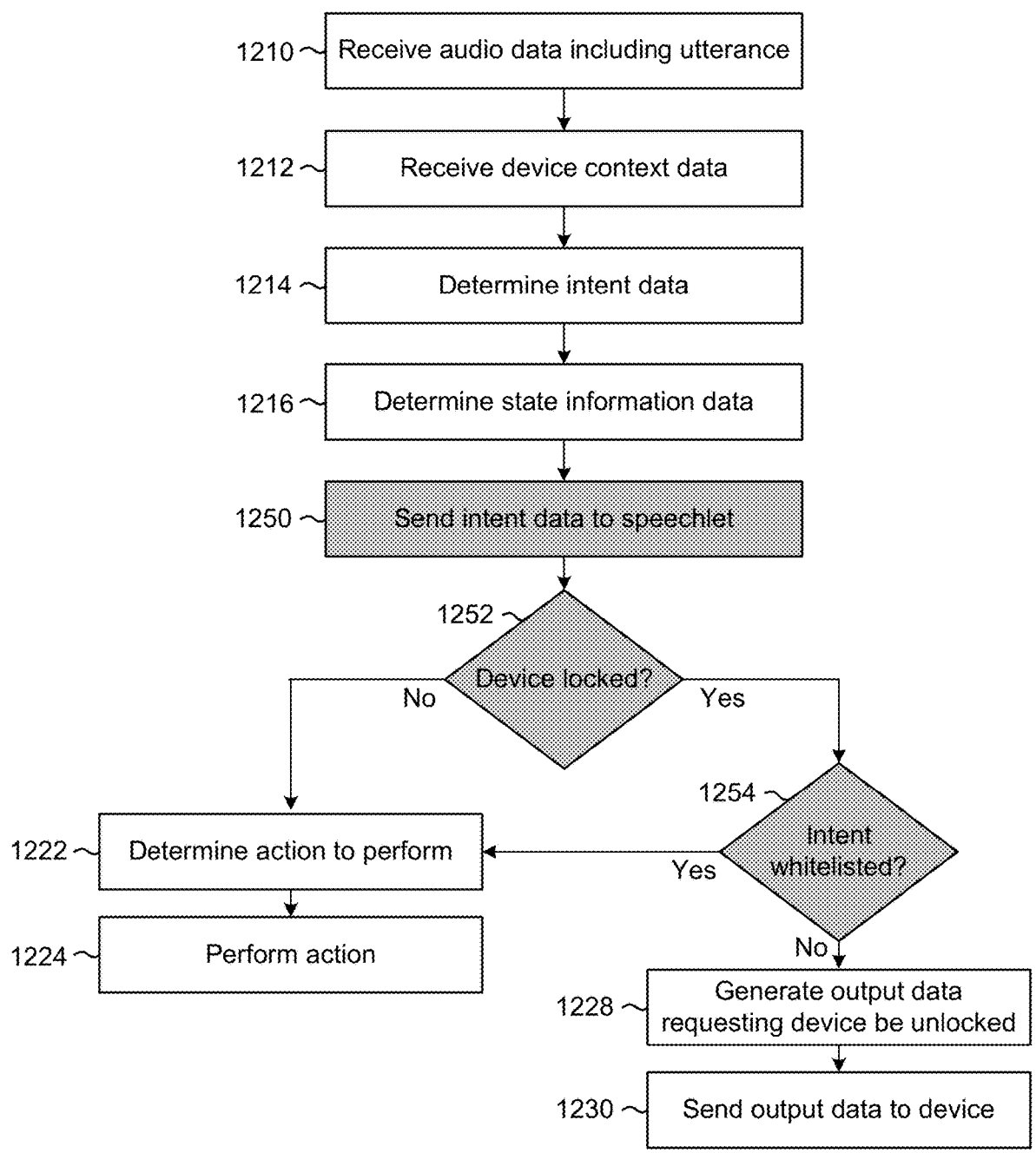

FIGS. 12A-12B are flowcharts conceptually illustrating example methods for processing an utterance received from a locked device using whitelist filtering according to embodiments of the present disclosure. As illustrated in FIG. 12A, the server(s) 120 may receive (1210) audio data including an utterance and may receive (1212) device context data that indicates a state of the device 110. The server(s) 120 may determine (1214) intent data based on the audio data, may determine (1216) state information data based on the device context data, and may determine (1218) whether the device 110 is locked (e.g., in a locked state) based on the state information data.

If the device 110 is not in a locked state (e.g., in an unlocked state), the server(s) 120 may send (1220) the intent data to a speechlet (or two or more speechlets), determine (1222) an action to perform, and perform (1224) the action. Thus, the server(s) 120 may process the intent data when the device 110 is in an unlocked state.

If the device 110 is in a locked state, the server(s) 120 may determine (1226) whether the intent data is whitelisted (e.g., included in a whitelist database). If the intent data is included in the whitelist database, the server(s) 120 may loop to step 1220 and perform steps 1220-1224 for the intent data.

However, if the intent data is not included in the whitelist database, the server(s) 120 may generate (1228) output data requesting that the device 110 be unlocked and may send (1230) the output data to the device 110. For example, the output data may include audio data (e.g., synthesized speech) and/or display data indicating that the device 110 must be unlocked to proceed with the voice command.

While FIG. 12A illustrates an example in which the server(s) 120 determine whether the intent data is whitelisted for all speechlet(s) 290, the disclosure is not limited thereto. Instead, the server(s) 120 may perform whitelisting individually for each of the speechlet(s) 290 without departing from the disclosure, as shown in FIG. 12B.

As illustrated in FIG. 12B, the server(s) 120 may receive (1210) audio data including an utterance and may receive (1212) device context data that indicates a state of the device 110. The server(s) 120 may determine (1214) intent data based on the audio data, may determine (1216) state information data based on the device context data, and may send (1250) the intent data to the speechlet (or two or more speechlets). The server(s) 120 (e.g., using the speechlet) may determine (1252) whether the device 110 is locked (e.g., in a locked state) based on the state information data. For example, each individual speechlet that receives the intent data may retrieve the state information data from interfaces 940.

If the device 110 is not in a locked state (e.g., in an unlocked state), the server(s) 120 (e.g., using the speechlet) may determine (1222) an action to perform and perform (1224) the action. Thus, the server(s) 120 may process the intent data when the device 110 is in an unlocked state.

If the device 110 is in a locked state, the server(s) 120 (e.g., using the speechlet) may determine (1254) whether the intent data is whitelisted (e.g., included in a whitelist database). For example, each individual speechlet that receives the intent data may retrieve whitelist data (e.g., a list of whitelisted intents) from the whitelist database 932 and compare the intent data to the whitelist data. If the intent data is included in the whitelist data, the server(s) 120 may loop to step 1222 and perform steps 1222-1224 to determine an action to perform and perform the action.

However, if the intent data is not included in the whitelist data, the server(s) 120 may generate (1228) output data requesting that the device 110 be unlocked and may send (1230) the output data to the device 110. For example, the output data may include audio data (e.g., synthesized speech) and/or display data indicating that the device 110 must be unlocked to proceed with the voice command.

Figure 13A:
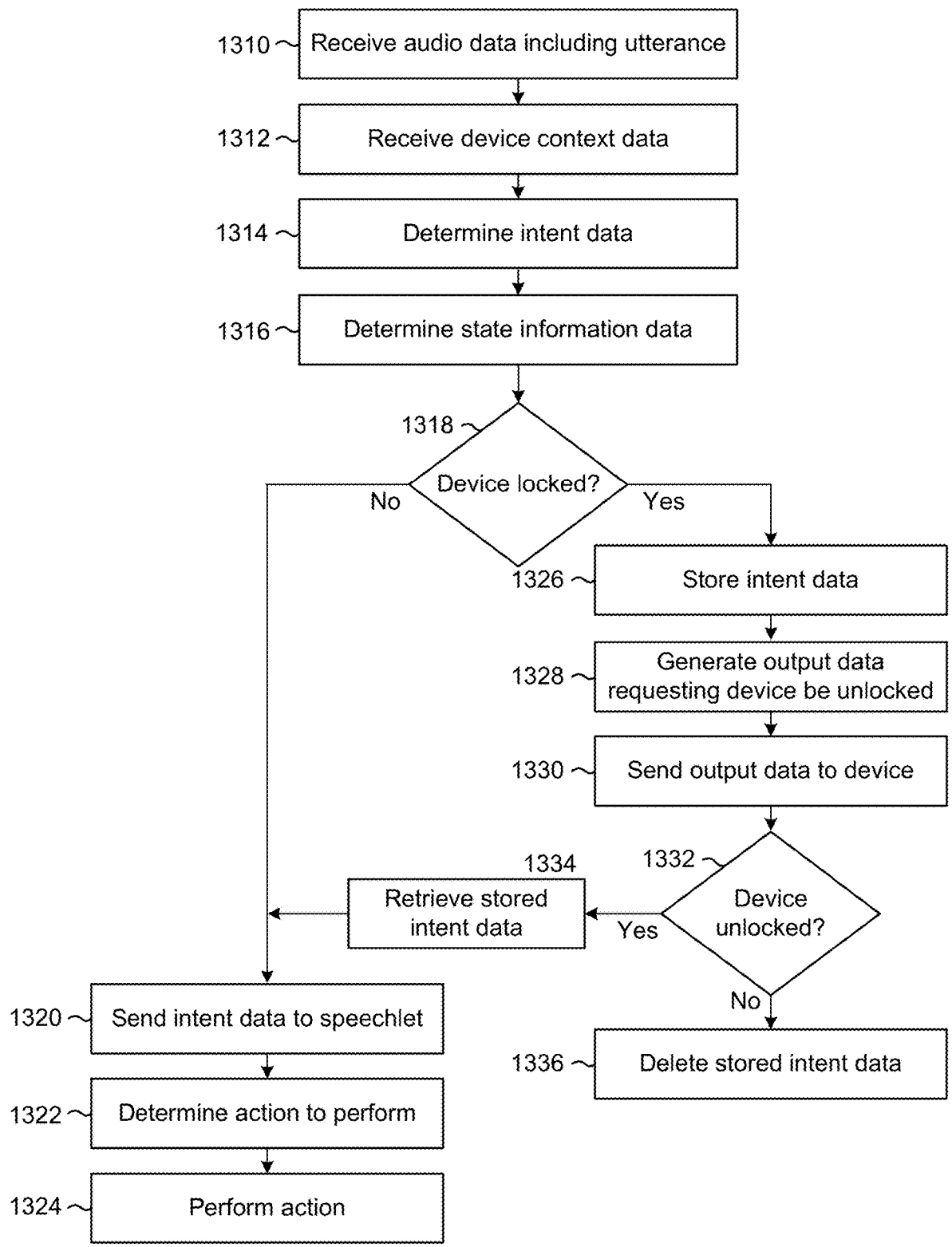
FIGS. 13A-13B are flowcharts conceptually illustrating example methods for caching an intent while processing an utterance received from a locked device according to embodiments of the present disclosure.
Figure 13B:
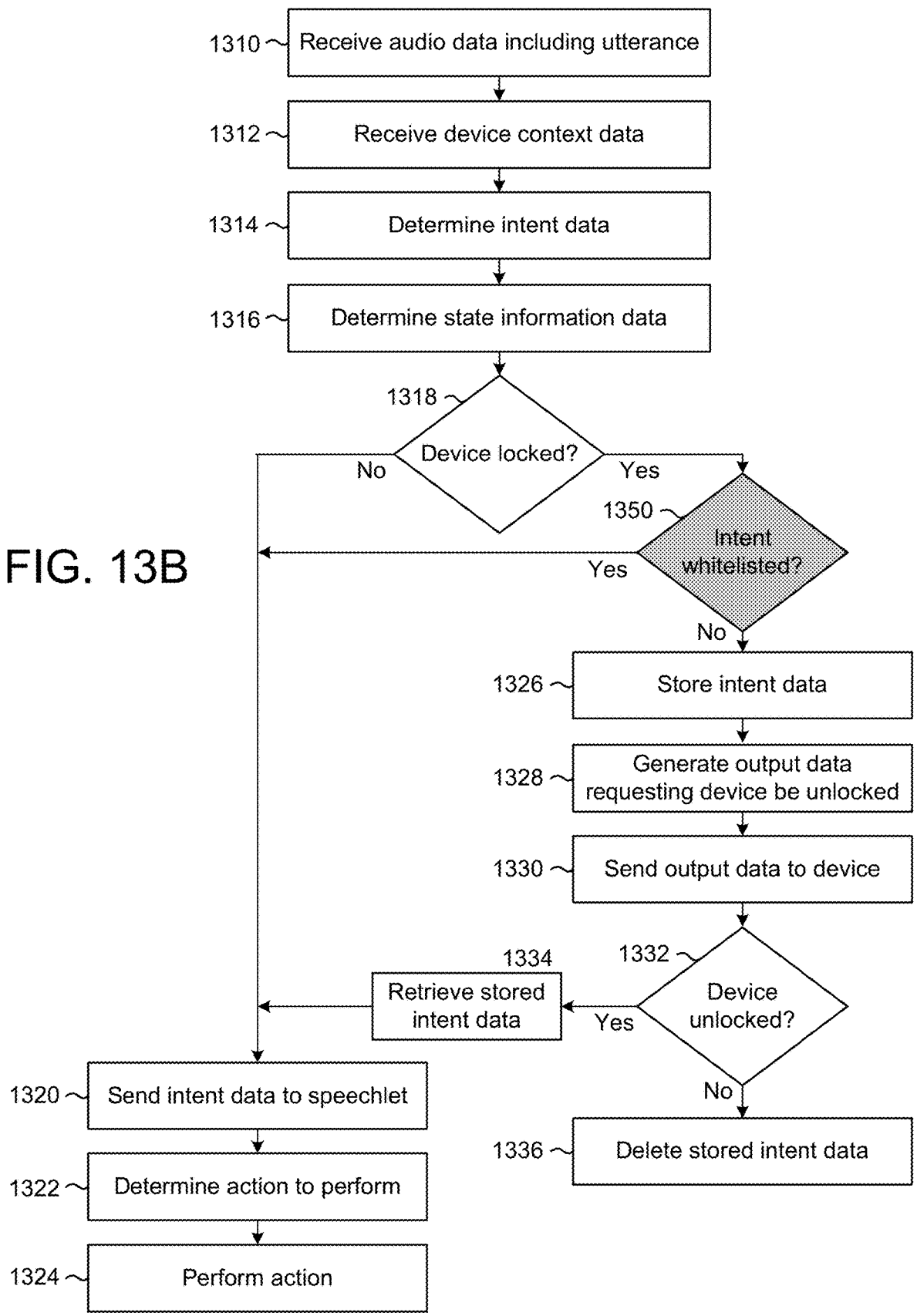

FIGS. 13A-13B are flowcharts conceptually illustrating example methods for caching an intent while processing an utterance received from a locked device according to embodiments of the present disclosure. As illustrated in FIG. 13A, the server(s) 120 may receive (1310) audio data including an utterance and may receive (1312) device context data that indicates a state of the device 110. The server(s) 120 may determine (1314) intent data based on the audio data, may determine (1316) state information data based on the device context data, and may determine (1318) whether the device 110 is locked (e.g., in a locked state) based on the state information data.

If the device 110 is not in a locked state (e.g., in an unlocked state), the server(s) 120 may send (1320) the intent data to a speechlet (or two or more speechlets), determine (1322) an action to perform, and perform (1324) the action. Thus, the server(s) 120 may process the intent data when the device 110 is in an unlocked state.

However, if the intent data is not included in the whitelist database, the server(s) 120 may store (11F26) the intent data (e.g., in a cache), may generate (1328) output data requesting that the device 110 be unlocked and may send (1330) the output data to the device 110. For example, the output data may include audio data (e.g., synthesized speech) and/or display data indicating that the device 110 must be unlocked to proceed with the voice command.

The server(s) 120 may determine (1332) whether the device 110 is unlocked within a desired period of time (e.g., 5 seconds, 10 seconds, etc.). For example, the server(s) 120 may receive a notification from the device 110 indicating that the device 110 is unlocked (e.g., receive device context data indicating that the device 110 is in an unlocked state) within the period of time. If the server(s) 120 determine that the device 110 is unlocked within the period of time, the server(s) 120 may retrieve (1334) the intent data, loop to step 1320, and perform steps 1320-1324 to process the retrieved intent data. If the server(s) 120 determine that the device 110 is not unlocked within the period of time, the server(s) 120 may delete (1336) the stored intent data and end processing.

While FIG. 13A illustrates the server(s) 120 sending a prompt to unlock the device 110 when the device 110 is in an unlocked state, FIG. 13B illustrates an example of caching the intent data while performing whitelist filtering to process certain intents even when the device 110 is in a locked state. As illustrated in FIG. 13B, the server(s) 120 may receive (1310) audio data including an utterance and may receive (1312) device context data that indicates a state of the device 110. The server(s) 120 may determine (1314) intent data based on the audio data, may determine (1316) state information data based on the device context data, and may determine (1318) whether the device 110 is locked (e.g., in a locked state) based on the state information data.

If the device 110 is not in a locked state (e.g., in an unlocked state), the server(s) 120 may send (1320) the intent data to a speechlet (or two or more speechlets), determine (1322) an action to perform, and perform (1324) the action. Thus, the server(s) 120 may process the intent data when the device 110 is in an unlocked state.

If the device 110 is in a locked state, the server(s) 120 may determine (1350) whether the intent data is whitelisted (e.g., included in a whitelist database). If the intent data is included in the whitelist database, the server(s) 120 may loop to step 1320 and perform steps 1320-1324 for the intent data.

However, if the intent data is not included in the whitelist database, the server(s) 120 may store (11F26) the intent data (e.g., in a cache), may generate (1328) output data requesting that the device 110 be unlocked and may send (1330) the output data to the device 110. For example, the output data may include audio data (e.g., synthesized speech) and/or display data indicating that the device 110 must be unlocked to proceed with the voice command.

The server(s) 120 may determine (1332) whether the device 110 is unlocked within a desired period of time (e.g., 5 seconds, 10 seconds, etc.). For example, the server(s) 120 may receive a notification from the device 110 indicating that the device 110 is unlocked (e.g., receive device context data indicating that the device 110 is in an unlocked state) within the period of time. If the server(s) 120 determine that the device 110 is unlocked within the period of time, the server(s) 120 may retrieve (1334) the intent data, loop to step 1320, and perform steps 1320-1324 to process the retrieved intent data. If the server(s) 120 determine that the device 110 is not unlocked within the period of time, the server(s) 120 may delete (1336) the stored intent data and end processing.

Figure 14A:
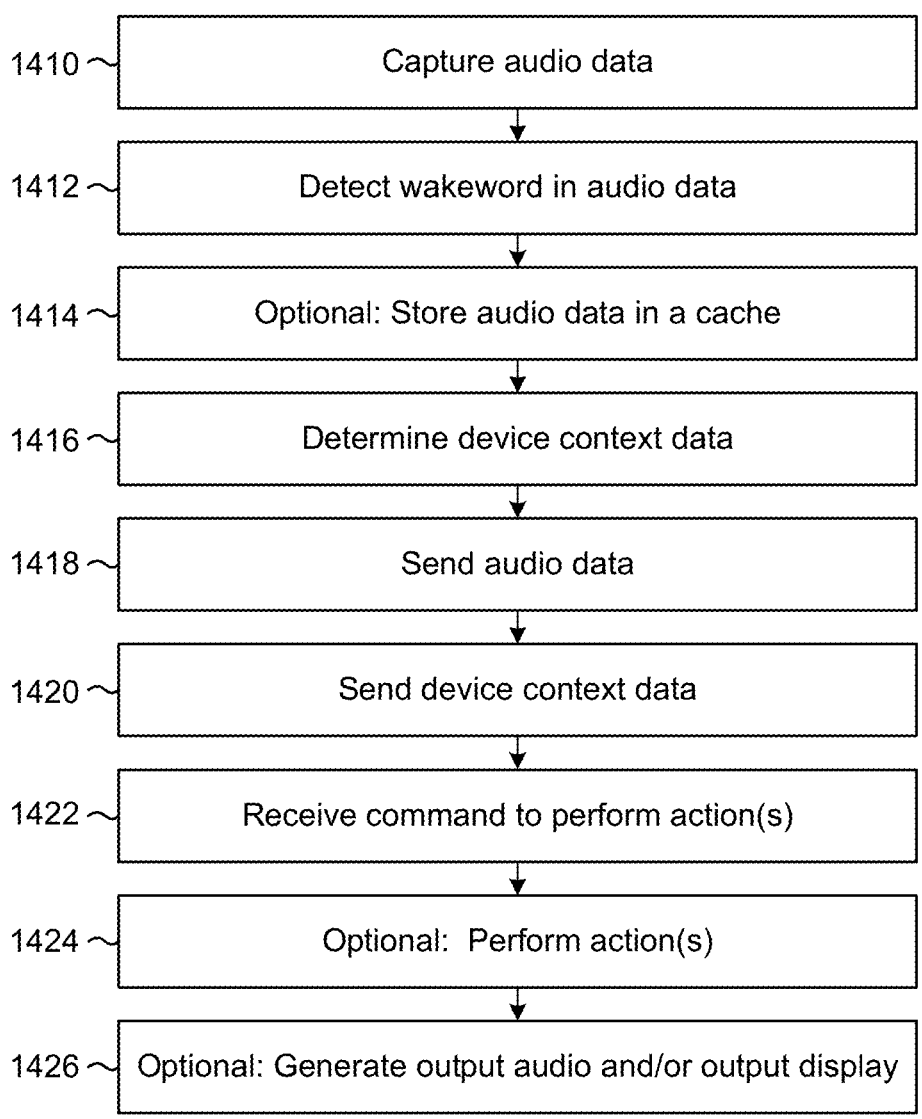
FIGS. 14A-14C are flowcharts conceptually illustrating example methods for unlocking a device to process a voice command according to embodiments of the present disclosure.
Figure 14B:
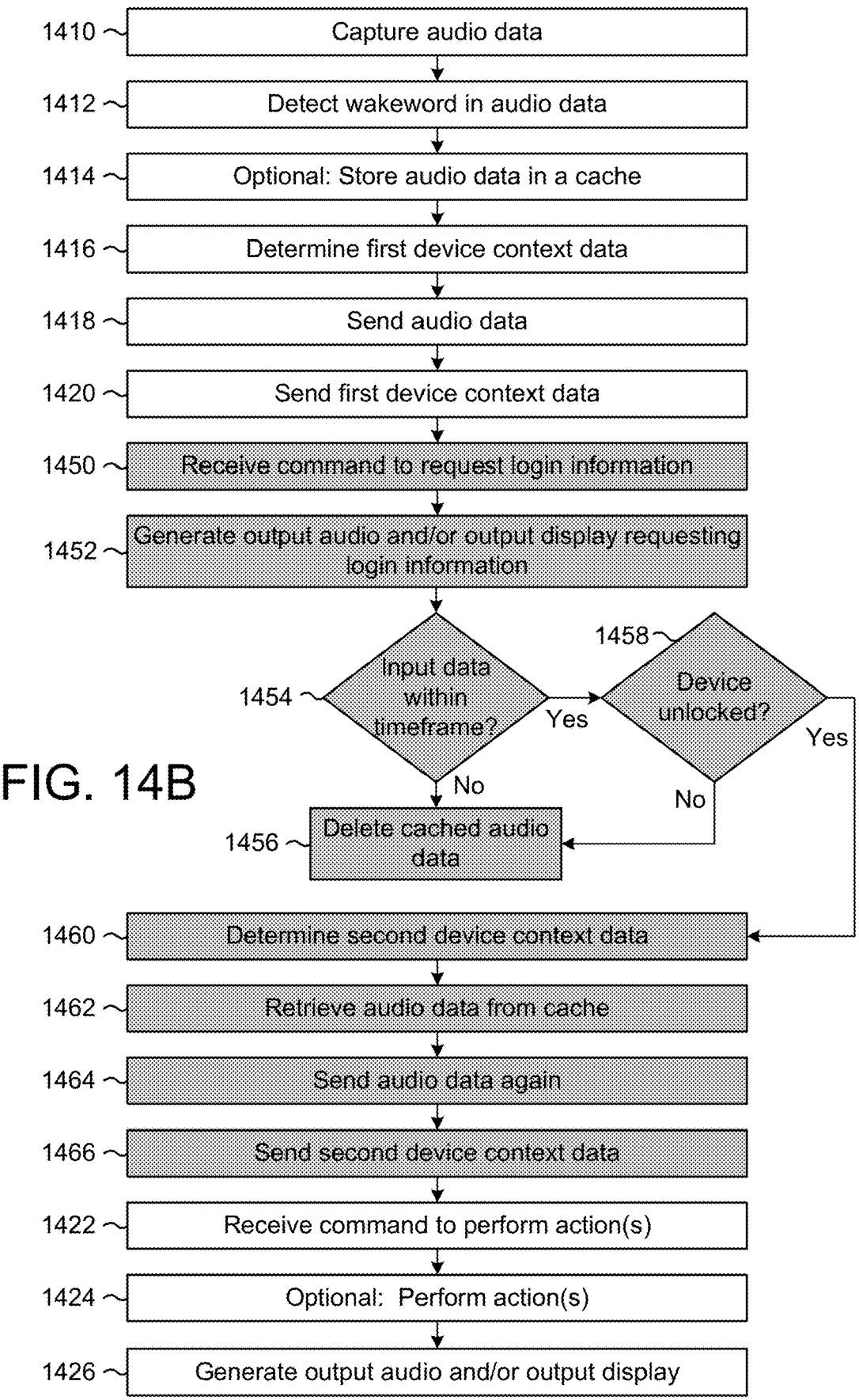
Figure 14C:
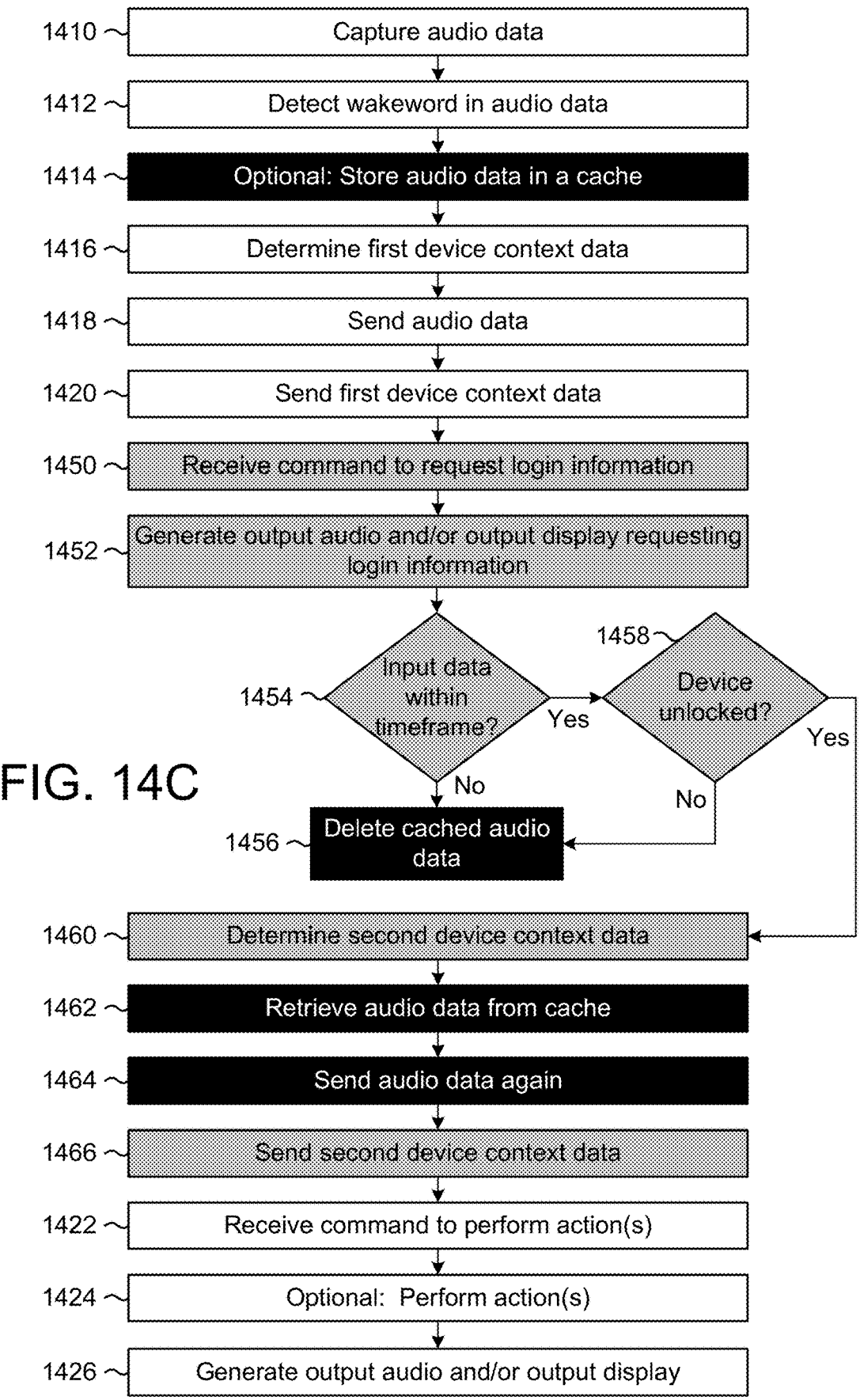

FIGS. 14A-14C are flowcharts conceptually illustrating example methods for unlocking a device to process a voice command according to embodiments of the present disclosure. As illustrated in FIG. 14A, the device 110 may capture (1410) audio data, detect (1412) that a wakeword is represented in the audio data, and may optionally store (1414) the audio data in a cache.

The device 110 may determine (1416) device context data corresponding to a current state of the device 110, may send (1418) the audio data to the server(s) 120 and may send (1420) the device context data to the server(s) 120.

After the server(s) 120 processes the audio data, the device 110 may receive (1422) from the server(s) 120 a command to perform one or more action(s), may optionally perform (1424) the action(s) (e.g., if an action is local to the device 110), and may optionally generate (1426) output audio and/or output display based on the command. For example, the command may correspond to one or more directive(s) received from the server(s) 120 and the directive(s) may include output audio data (e.g., synthesized speech) and/or display data that indicates the action that was performed.

In some examples, the server(s) 120 may only instruct the device 110 to generate the output audio and/or generate the output display. Thus, the action(s) to be performed are to generate the output audio based on output audio data and/or to generate the output display based on display data, and the device 110 does not need to perform step 1424 as there are no additional action(s) to perform. For example, the voice command may correspond to an action performed by the server(s) 120, such as getting information about music that is currently playing or streaming music from a new music station, and the device 110 may generate output audio including a notification of the action that was performed (e.g., "Playing music from custom playlist"). However, the disclosure is not limited thereto and in other examples, the server(s) 120 may instruct the device 110 to perform an action without generating output audio and/or output display. For example, the voice command may correspond to increasing or decreasing a volume of music being streamed by the device 110, and the device 110 may increase or decrease the volume (e.g., perform the action in step 1424) without an explicit notification of the action that was performed. Additionally or alternatively, the server(s) 120 may instruct the device 110 to perform an action as well as generate output audio and/or generate an output display. For example, the voice command may correspond to restarting a song that is currently playing, and the device 110 may restart the song (e.g., perform the action in step 1424) while also generating output audio and/or an output display including a notification of the action that was performed (e.g., "Playing Bohemian Rhapsody from the beginning").

FIG. 14A illustrates an example in which the server(s) 120 processes the voice command and sends a command to the device 110 to perform one or more action(s). This may occur when the device 110 is in an unlocked state and/or when the voice command corresponds to a whitelisted intent, as discussed above. However, in some examples the server(s) 120 may not process the voice command and may instead send a prompt to the device 110 to request login information to enter an unlocked state before the voice command may be processed by the server(s) 120. FIG. 14B illustrates an example in which the device 110 stores the audio data in a cache and retrieves the audio data after the device 110 is unlocked.

As illustrated in FIG. 14B, the device 110 may capture (1410) audio data, detect (1412) that a wakeword is represented in the audio data, and may optionally store (1414) the audio data in a cache. In the example illustrated in FIG. 14B, the device 110 must store the audio data in the cache in order to later retrieve the audio data in step 1462.

The device 110 may determine (1416) device context data corresponding to a current state of the device 110, may send (1418) the audio data to the server(s) 120 and may send (1420) the device context data to the server(s) 120.

The server(s) 120 may determine that the device 110 is in a locked state and/or that an intent associated with the audio data is not included in a whitelist database. Therefore, the server(s) 120 may send a prompt to the device 110 to request login information, such as requesting a personal identification number (PIN) or other information that enables the device 110 to enter the unlocked state.

The device 110 may receive (1450) from the server(s) 120 a command to request login information and may generate (1452) output audio and/or an output display requesting the login information from a user. For example, the command may correspond to one or more directive(s) received from the server(s) 120 and the directive(s) may include output audio data (e.g., synthesized speech) and/or display data that indicates that the device 110 must be unlocked in order for the voice command to be processed. The display data may correspond to a user interface that enables the user to input the login information, such as a number keypad (e.g., to enter a PIN) or the like.

The device 110 may determine (1454) whether input data is received within a desired timeframe (e.g., desired period of time) and, if not, may delete (1456) the cached audio data from the cache. If the device 110 determines that input data is received within the desired time frame, the device 110 may determine (1458) if the device 110 is unlocked (e.g., the login information is correct and the device 110 entered an unlocked state). If the device 110 determines that it is not unlocked within a desired period of time, the device 110 may loop to step 1456 and delete the cached audio data from the cache.

If the device 110 determines that it is unlocked within the desired period of time, the device 110 may determine (1460) second device context data indicating that the device 110 is in the unlocked state (e.g., the login attempt was successful), may retrieve (1462) the audio data from the cache, may send (1464) the audio data to the server(s) 120 again, and may send (1466) the second device context data to the server(s) 120 to indicate that the device 110 is in the unlocked state.

After the server(s) 120 processes the audio data a second time, the device 110 may receive (1422) from the server(s) 120 a command to perform one or more action(s), may optionally perform (1424) the action(s) (e.g., if an action is local to the device 110), and may optionally generate (1426) output audio and/or output display based on the command. For example, the command may correspond to one or more directive(s) received from the server(s) 120 and the directive(s) may include output audio data (e.g., synthesized speech) and/or display data that indicates the action that was performed.

In some examples, the server(s) 120 may only instruct the device 110 to generate the output audio and/or generate the output display. Thus, the action(s) to be performed are to generate the output audio based on output audio data and/or to generate the output display based on display data, and the device 110 does not need to perform step 1424 as there are no additional action(s) to perform. For example, the voice command may correspond to an action performed by the server(s) 120, such as getting information about music that is currently playing or streaming music from a new music station, and the device 110 may generate output audio including a notification of the action that was performed (e.g., "Playing music from custom playlist"). However, the disclosure is not limited thereto and in other examples, the server(s) 120 may instruct the device 110 to perform an action without generating output audio and/or output display. For example, the voice command may correspond to increasing or decreasing a volume of music being streamed by the device 110, and the device 110 may increase or decrease the volume (e.g., perform the action in step 1424) without an explicit notification of the action that was performed. Additionally or alternatively, the server(s) 120 may instruct the device 110 to perform an action as well as generate output audio and/or generate an output display. For example, the voice command may correspond to restarting a song that is currently playing, and the device 110 may restart the song (e.g., perform the action in step 1424) while also generating output audio and/or an output display including a notification of the action that was performed (e.g., "Playing Bohemian Rhapsody from the beginning").

While FIG. 14B illustrates an example of the device 110 storing the audio data in a cache on the device 110 and sending the audio data to the server(s) 120 a second time after the device 110 is unlocked, the disclosure is not limited thereto. As described above with regard to FIG. 10D, the server(s) 120 may instead store intent data corresponding to the audio data in a cache on the server(s) 120 and the device 110 may only send an indication that the device 110 is unlocked for the server(s) 120 to process the intent data. As illustrated in FIG. 14C, the steps performed by the device 110 are identical to those described above with regard to FIG. 14B, with the exception that the device 110 does not need to perform step 1414 (e.g., storing the audio data in a cache, although the device 110 may store the audio data in the cache for other reasons), step 1456 (e.g., delete the stored audio data from the cache), step 1462 (e.g., retrieve the audio data from the cache), and/or step 1464 (e.g., send the audio data to the server(s) 120 again).

Thus, the device 110 may determine (1458) that the login information is correct and that the device 110 entered the unlocked state, may determine (1460) second device context data indicating that the device 110 is in the unlocked state (e.g., the login attempt was successful), and may send (1466) the second device context data to the server(s) 120 to indicate that the device 110 is in the unlocked state.

After the server(s) 120 processes the audio data a second time, the device 110 may receive (1422) from the server(s) 120 a command to perform one or more action(s), may optionally perform (1424) the action(s) (e.g., if an action is local to the device 110), and may optionally generate (1426) output audio and/or output display based on the command. For example, the command may correspond to one or more directive(s) received from the server(s) 120 and the directive(s) may include output audio data (e.g., synthesized speech) and/or display data that indicates the action that was performed.

FIGS. 15A-15D illustrate examples of whitelist databases according to embodiments of the present disclosure. As discussed above, a whitelist database includes a list of a plurality of intents that may be processed while the device 110 is in the locked state. FIG. 15A illustrates an example of a whitelist database 1510 that provides contextual information for each of the intents. For example, the whitelist database 1510 includes a column corresponding to a domain, an intent, an action, and example utterance(s).

The domain corresponds to a general category associated with a plurality of intents, enabling the system 100 to group similar intents with a particular category. For example, the whitelist database 1510 includes a Notification domain (e.g., intents associated with alarms, timers, notifications, etc.), a ToDos domain (e.g., intents associated with creating and modifying lists of things to do or the like), a Music domain (e.g., intents associated with music playback, such as selecting a song/station, pausing or resuming a song, increasing or decreasing volume, skipping to a next or previous song, etc.), a LocalSearch domain (e.g., intents associated with finding information about local businesses, such as hours, phone numbers, addresses, directions, services, etc.), a Global domain (e.g., intents that are general, such as a current time or day, etc.). However, the disclosure is not limited thereto and any number of domains may be included in the whitelist database 1510.

In some examples, the domain may correspond to a particular speechlet 290 or process running on the server(s) 120. For example, a first domain may correspond to a first speechlet 290a, such that all intents associated with the first domain are processed by the first speechlet 290a. However, the disclosure is not limited thereto and the first domain may correspond to multiple speechlets 290 (e.g., first speechlet 290a and second speechlet 290b) without departing from the disclosure. For example, a first intent (e.g., PlayMusicIntent) may be associated with multiple different speechlets 290, such that the first intent may be processed using two or more speechlets 290 (e.g., PlayMusicIntent can play music using either a first music service or a second music service).

While not illustrated in the whitelist database 1510, some domains may be top-level domains whereas other domains may be non-top-level domains. For example, a top-level domain may be invoked by a voice command without specifying a particular domain, speechlet, process, etc. (e.g., "What is the weather" invokes a top-level weather domain) and/or may be invoked even when the device 110 is in the locked state. In contrast, a non-top-level domain may be invoked by a voice command that specifies the domain/speechlet/process (e.g., "What is the weather using WeatherApp" invokes a non-top-level domain named WeatherApp) and/or may not be invoked when the device 110 is in the locked state.

The intent column of the whitelist database 1510 indicates specific intents that are whitelisted (e.g., can be processed while the device 110 is in the locked state). For example, the whitelist database 1510 illustrates a list of intents corresponding to each of the domains (e.g., SetNotificationIntent, SilenceNotificationIntent, BrowseNotificationIntent, etc.). However, the disclosure is not limited thereto, and any intent known to one of skill in the art may be included in the whitelist database 1510. Additionally or alternatively, while the whitelist database 1510 illustrates a single intent associated with each entry, the disclosure is not limited thereto and multiple intents may be listed in a single entry.

For ease of illustration, the whitelist database 1510 includes a column indicating action(s) that correspond to the intent as well as example utterance(s) that invoke the intent and/or action(s). For example, a first intent (e.g., SetNotificationIntent) may correspond to a first action (e.g., set an alarm) and may be invoked by a first utterance (e.g., Set an alarm for 6 PM). While the whitelist database 1510 only illustrates a single example utterance for each intent, the disclosure is not limited thereto and the first intent may be invoked using any number of utterances without departing from the disclosure. For example, the user may say "set an alarm for six tomorrow night," "set an alarm for six PM," "set a timer for twenty minutes," "set five minute timer," etc. without departing from the disclosure. Additionally or alternatively, while the whitelist database 1510 illustrates a single action (e.g., set alarm) corresponding to the first intent, the disclosure is not limited thereto and additional actions (e.g., set timer, set notification, etc.) may correspond to the first intent without departing from the disclosure.

While the whitelist database 1510 illustrated in FIG. 15A includes contextual information associated with the intents, the disclosure is not limited thereto. As illustrated in FIG. 15B, whitelist database 15120 only includes a list of a plurality of intents that may be processed when the device 110 is in the locked state. Thus, the server(s) 120 may determine whether a specific intent is included in the whitelist database 1520 and, if so, may dispatch the specific intent to one or more speechlet(s) or other processes even when the device 110 is in the locked state. However, the server(s) 120 cannot differentiate between different speechlet(s) or other processes and any whitelisted intent is processed by any corresponding speechlet.

In some examples, the whitelist database may include additional contextual information to differentiate between speechlets, processes, and/or the like (e.g., perform whitelist filtering differently based on the speechlet). As illustrated in FIG. 15C, whitelist database 1530 may associate the intent with a corresponding domain, enabling the server(s) 120 to determine if a particular intent is whitelisted for a specific domain (e.g., category, speechlet, process, etc.). The domain indicated in the whitelist database 1530 may correspond to a general category (e.g., Music domain corresponds to multiple music services available to the system 100, such that the intent may be processed by multiple speechlets) and/or a specific service (e.g., StreamingMusic corresponds to a specific streaming music service, such that intents are processed only by a single speechlet).

In some examples, the whitelist database may include a list of a plurality of intents that may be processed and/or actions that may be performed. While a single intent may correspond to multiple actions that may be performed, the whitelist database may include a list of whitelisted actions (e.g., actions that may be performed while the device 110 is in the locked state) and the system 100 may perform whitelist filtering based on action to be performed instead of the intent to be processed.

As illustrated in FIG. 15D, whitelist database 1540 may include domain(s), intent(s) and/or action(s) without departing from the disclosure. While FIG. 15D illustrates the whitelist database 1540 including the domains corresponding to the intents and action(s), the disclosure is not limited thereto and the intents/actions may not be associated with any domains. Additionally or alternatively, while FIG. 15D illustrates the whitelist database 1540 including both the intents and corresponding action, the disclosure is not limited thereto and the whitelist database 1540 may only include a list of actions that can be performed while the device 110 is in the locked state without departing from the disclosure. Thus, the system 100 may perform whitelist filtering using the actions instead of the intents.

Figure 16:
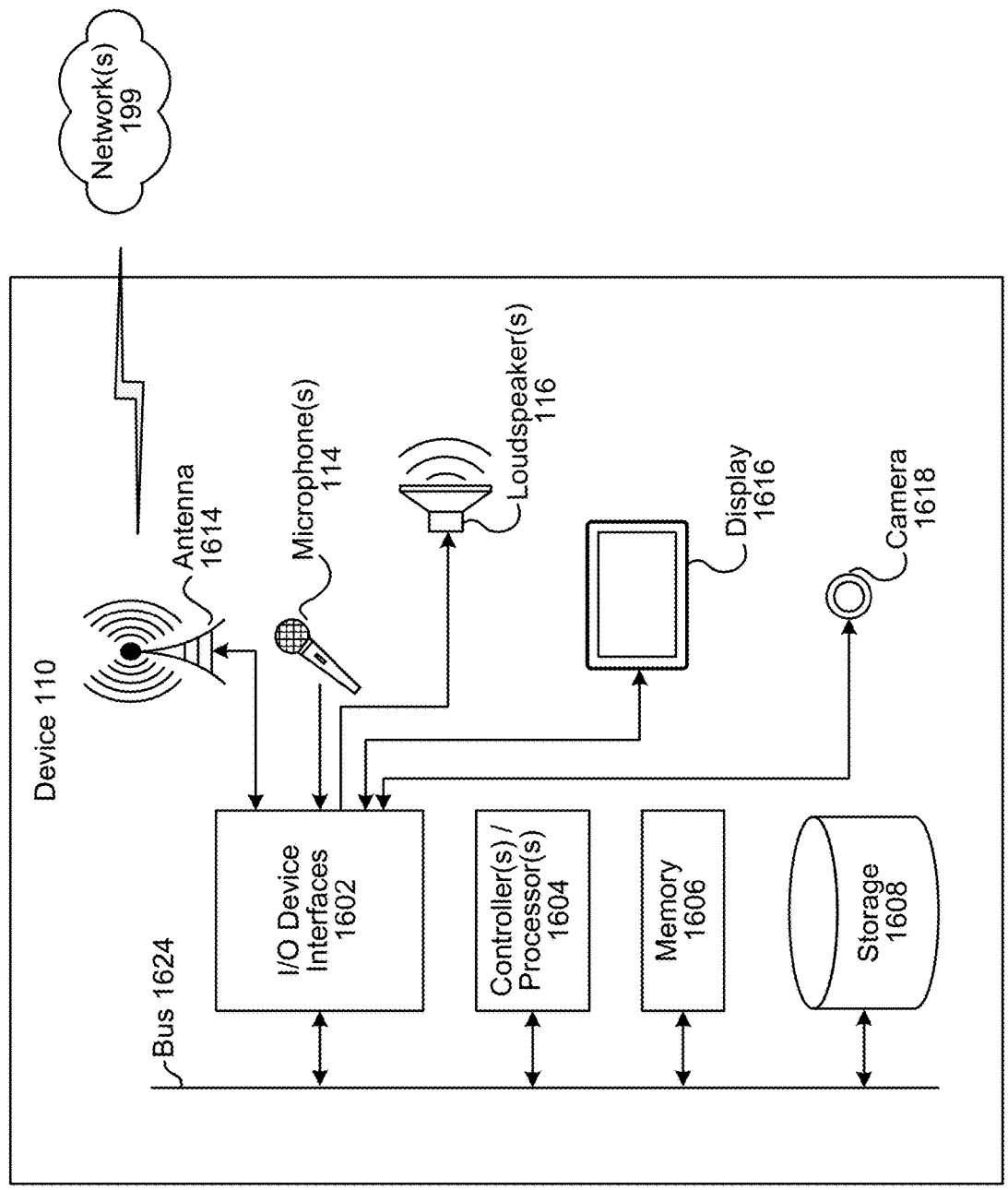
FIG. 16 is a block diagram conceptually illustrating example components of a device according to embodiments of the present disclosure.
Figure 17:
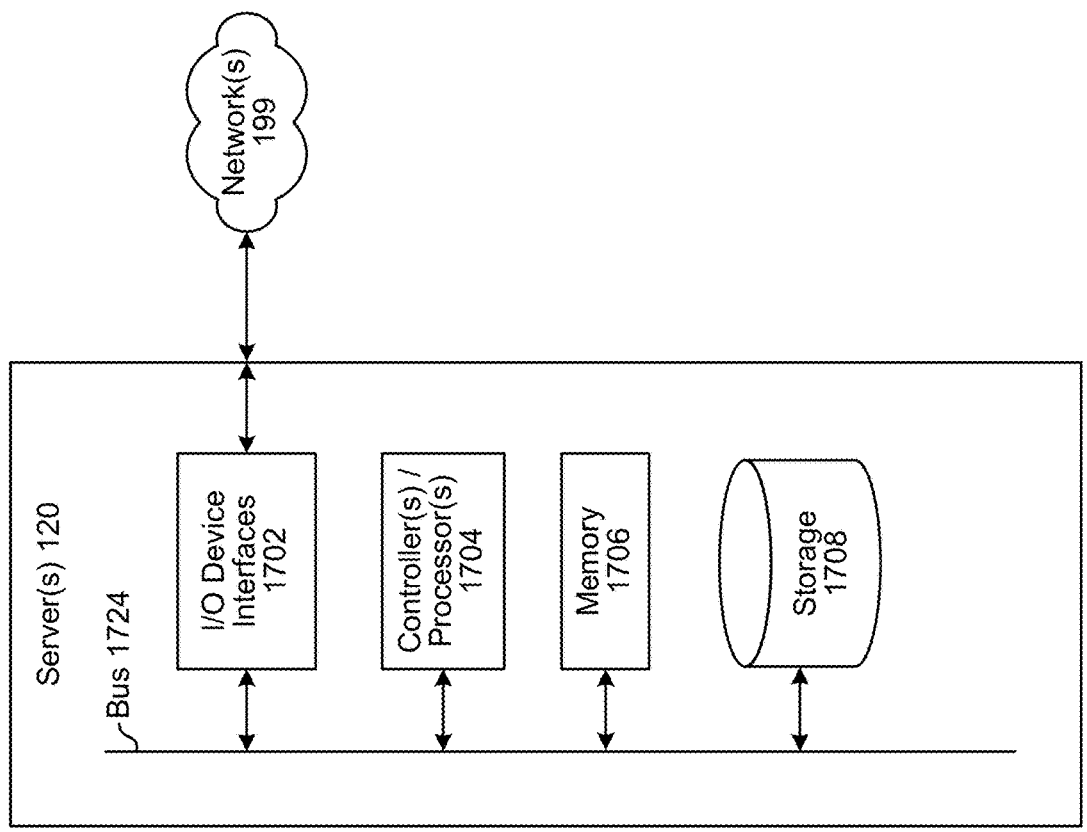
FIG. 17 is a block diagram conceptually illustrating example components of a server according to embodiments of the present disclosure.

FIG. 16 is a block diagram conceptually illustrating a device 110 that may be used with the system. FIG. 17 is a block diagram conceptually illustrating example components of a remote device, such as the server(s) 120, which may assist with ASR processing, NLU processing, etc. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers 120 may be included in the system, such as one or more servers 120 for performing ASR processing, one or more servers 120 for performing NLU processing, etc. In operation, each of these devices (or groups of devices) may include computer-readable and computer-executable instructions that reside on the respective device (110/120), as will be discussed further below.

Each of these devices (110/120) may include one or more controllers/processors (1604/1704), which may each include a central processing unit (CPU) for processing data and computer-readable instructions, and a memory (1606/1706) for storing data and instructions of the respective device. The memories (1606/1706) may individually include volatile random access memory (RAM), non-volatile read only memory (ROM), non-volatile magnetoresistive memory (MRAM), and/or other types of memory. Each device (110/120) may also include a data storage component (1608/1708) for storing data and controller/processor-executable instructions. Each data storage component (1608/1708) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1602/1702).

Computer instructions for operating each device (110/120) and its various components may be executed by the respective device's controller(s)/processor(s) (1604/1704), using the memory (1606/1706) as temporary "working" storage at runtime. A device's computer instructions may be stored in a non-transitory manner in non-volatile memory (1606/1706), storage (1608/1708), or an external device(s). Alternatively, some or all of the executable instructions may be embedded in hardware or firmware on the respective device in addition to or instead of software.

Each device (110/120) includes input/output device interfaces (1602/1702). A variety of components may be connected through the input/output device interfaces (1602/1702), as will be discussed further below. Additionally, each device (110/120) may include an address/data bus (1624/1724) for conveying data among components of the respective device. Each component within a device (110/120) may also be directly connected to other components in addition to (or instead of) being connected to other components across the bus (1624/1724).

Referring to FIG. 16, the device 110 may include input/output device interfaces 1602 that connect to a variety of components such as an audio output component such as a loudspeaker(s) 116, a wired headset or a wireless headset (not illustrated), or other component capable of outputting audio. The device 110 may also include an audio capture component. The audio capture component may be, for example, microphone(s) 114 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1616 for displaying content. The device 110 may further include a camera 1618.

Via antenna(s) 1614, the input/output device interfaces 1602 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1602/1702) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interfaces (1602/1702), processor(s) (1604/1704), memory (1606/1706), and/or storage (1608/1708) of the device(s) 110 and server(s) 120, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are illustrative, and may be located as a stand-alone device or may be included, in whole or in part, as a component of a larger device or system.

As illustrated in FIG. 18, multiple devices (110a-110g, 120) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, and/or smart television 110g may be connected to the network(s) 199 through a wireless service provider, over a WiFi or cellular network connection, via an adapter from a public switched telephone network (PSTN), and/or the like.

Other devices are included as network-connected support devices, such as the server(s) 120, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   capturing, by at least one microphone of a first device in a locked state, audio representing an utterance;
   sending, from the first device to a remote system while the first device is in the locked state, audio data representing the utterance;
   determining, by the remote system, that the first device is in the locked state;
   performing, by the remote system, speech processing on the audio data to determine speech processing results data, wherein the speech processing includes natural language understanding (NLU) processing and the speech processing results data includes first NLU results data, wherein the first NLU results data includes a plurality of potential intents associated with a respective confidence score;
   determining that a first potential intent of the plurality of potential intents corresponds to an action that is not permitted to be performed while the first device is in the locked state, the first potential intent being associated with a first confidence score representing a highest confidence among the plurality of potential intents;
   determining that a second potential intent of the plurality of potential intents corresponds to an action that is permitted to be performed while the first device is in the locked state, the second potential intent being associated with a second confidence score representing a lower confidence than the first confidence score;
   sending, from the remote system to a speechlet component, data indicating the second potential intent;
   receiving, by the remote system from the speechlet component, response data;
   and
   sending, from the remote system to the first device, data corresponding to execution of the action,
   wherein the data corresponding to execution of the action is based, at least in part, on the response data.

2. The computer-implemented method of claim 1, wherein the data corresponding to execution of the action includes a command for the first device to perform the action.

3. The computer-implemented method of claim 1, further comprising:
   sending, from the first device to the remote system, state data indicating the first device is in the locked state.

4. The computer-implemented method of claim 3, further comprising:
   sending, from the remote system to the speechlet component, the state data.

5. The computer-implemented method of claim 1, wherein determining that the second potential intent of the plurality of intents corresponds to an action that is permitted to be performed while the first device is in the locked state is based at least in part on user profile data.

6. The computer-implemented method of claim 1, further comprising:
determining, by the first device while in the locked state, that the audio comprises a wakeword.

7. The computer implemented method of claim 1, further comprising:
determining, by the remote system, whether the speech processing results data refers to the speechlet component,
wherein determining that the second potential intent of the plurality of intents corresponds to an action that is permitted to be performed while the first device is in the locked state is based on determining that the second potential intent refers to the speechlet component.

8. A system comprising:
at least one processor; and
memory comprising instructions that, when executed by the at least one processor, cause the system to:
capture, by at least one microphone of a first device in a locked state, audio representing an utterance;
send, from the first device to a remote system while the first device is in the locked state, audio data representing the utterance;
determine, by the remote system, that the first device is in the locked state;
perform, by the remote system, speech processing on the audio data to determine speech processing results data, wherein the speech processing includes natural language understanding (NLU) processing and the speech processing results data includes first NLU results data, wherein the first NLU results data includes a plurality of potential intents associated with a respective confidence score;
determine that a first potential intent of the plurality of potential intents corresponds to an action that is not permitted to be performed while the first device is in the locked state, the first potential intent being associated with a first confidence score representing a highest confidence among the plurality of potential intents;
determine that a second potential intent of the plurality of potential intents corresponds to an action that is permitted to be performed while the first device is in the locked state, the second potential intent being associated with a second confidence score representing a lower confidence than the first confidence score;
send, from the remote system to a speechlet component, data, indicating the second potential intent;
receive, by the remote system from the speechlet component, response data; and
send, from the remote system to the first device, data corresponding to execution of the action,
wherein the data corresponding to execution of the action is based, at least in part, on the response data.

9. The system of claim 8, wherein the data corresponding to execution of the action includes a command for the first device to perform the action.

10. The system of claim 8, wherein the memory further comprises instructions that, when executed by the at least one processor, further cause the system to:
send, from the first device to the remote system, state data indicating the first device is in the locked state.

11. The system of claim 8, wherein determination, that the second potential intent of the plurality of intents corresponds to an action that is permitted to be performed while the first device is in the locked state is based at least in part on user profile data.

12. The system of claim 8, wherein the memory further comprises instructions that, when executed by the at least one processor, further cause the system to:
determine, by the first device while in the locked state, that the audio comprises a wakeword.

13. A computer-implemented method comprising:
capturing, by at least one microphone of a first device in a locked state, audio representing an utterance;
sending, from the first device to a remote system while the first device is in the locked state, audio data representing the utterance;
determining, by the remote system, that the first device is in the locked state;
performing, by the remote system, speech processing on the audio data to determine speech processing results data, wherein the speech processing includes natural language understanding (NLU) processing and the speech processing results data includes first NLU results data, wherein the first NLU results data includes a plurality of potential intents associated with a respective confidence score;
determining that a first potential intent of the plurality of potential intents corresponds to an action that is not permitted to be performed while the first device is in the locked state, the first potential intent being associated with a first confidence score representing a highest confidence among the plurality of potential intents;
determining that a second potential intent of the plurality of potential intents corresponds to an action that is permitted to be performed while the first device is in the locked state, the second potential intent being associated with a second confidence score representing a lower confidence than the first confidence score;
sending, from the remote system to a speechlet component, data indicating the second potential intent;
receiving, by the remote system from the speechlet component, response data;
sending, by the remote system to the first device, data corresponding to a prompt to unlock the first device;
determining, by the remote system, that the first device is in an unlocked state; and
sending, from the remote system to the first device, data corresponding to execution of the action,
wherein the data corresponding to execution of the action is based, at least in part, on the response data.

14. The computer-implemented method of claim 13, further comprising:
outputting, by the first device, an indicator corresponding to the prompt;
receiving, by the first device, input data;
processing, by the first device, the input data to determine the input data corresponds to a command to unlock the first device; and
sending, from the first device to the remote system, state data indicating the first device is in the unlocked state.

* * * * *